US005707756A

United States Patent [19]
Inoue et al.

[11] Patent Number: 5,707,756
[45] Date of Patent: Jan. 13, 1998

[54] NON-AQUEOUS SECONDARY BATTERY

[75] Inventors: Noriyuki Inoue; Yukio Maekawa; Tsutomu Miyasaka; Yoshikatsu Kagawa; Akihiro Matsufuji; Hideki Naito; Kensuke Goda; Osamu Takahashi; Toshiharu Nagamachi; Chuzo Kobayashi; Shoichiro Yasunami, all of Kanagawa, Japan

[73] Assignee: Fuji Photo Film Co., Ltd., Kanagawa, Japan

[21] Appl. No.: 814,961

[22] Filed: Mar. 10, 1997

Related U.S. Application Data

[63] Continuation of Ser. No. 563,593, Nov. 28, 1995, abandoned.

[30] Foreign Application Priority Data

| Nov. 29, 1994 | [JP] | Japan | 6-294611 |
| Jan. 30, 1995 | [JP] | Japan | 7-012344 |
| Feb. 27, 1995 | [JP] | Japan | 7-038742 |
| Mar. 23, 1995 | [JP] | Japan | 7-063830 |
| Mar. 29, 1995 | [JP] | Japan | 7-071490 |

[51] Int. Cl.$^6$ .................. H01M 2/12
[52] U.S. Cl. .................. 429/57; 429/59
[58] Field of Search .................. 429/53, 54, 57, 429/56, 59, 194, 218

[56] References Cited

U.S. PATENT DOCUMENTS

| 5,352,547 | 10/1994 | Kita et al. | 429/194 |
| 5,418,082 | 5/1995 | Taki et al. | 429/53 |
| 5,427,874 | 6/1995 | Sugeno | 429/94 |
| 5,427,875 | 6/1995 | Yamamoto et al. | 429/223 |
| 5,455,128 | 10/1995 | Tanaka et al. | 429/218 |
| 5,567,539 | 10/1996 | Takahashi et al. | |

Primary Examiner—M. Nuzzolillo
Attorney, Agent, or Firm—Sughrue, Mion, Zinn, Macpeak & Seas, PLLC

[57] ABSTRACT

The present invention provides a non-aqueous secondary battery having an improved charge and discharge cycle property and high discharge voltage, high energy density, high capacity and increased stability as well as an excellent high electric current atitude by using a lithium-containing transition metal oxide as a positive electrode material and at least one of the specfified composite oxides as a negative electrode material. Accordingly, the feature of the present invention consists in that the negative electrode material mainly consists of at least one member selected from the group consisting of amorphous chalcogen compounds and amorphous oxides containing at least three atoms selected from the group consisting of Group 13, 14, 15 and 2 atoms of Periodic Table.

15 Claims, 11 Drawing Sheets

NON-AQUEOUS SECONDARY BATTERY

This is a Continuation of application Ser. No. 08/563,593 filed Nov. 28, 1995, now abandoned.

BACKGROUND OF THE INVENTION

1. Field of the Invention

This invention relates to a non-aqueous secondary battery having improved charge and discharge characteristics, for example, improved charge and discharge capacity, high charge potential, etc., as well as excellent cycle life, storage property and stability, and further, it is concerned with a non-aqueous secondary battery of closed type, capable of cutting off continuity in the interior of the battery when the inner pressure of the battery is abnormally increased.

2. Description of the Prior Art

In recent years, with the spread of portable personal computers or pocket telephones, it has eagerly been desired to increase the capacity of a secondary battery. Thus, development of a lithium secondary battery capable of being subjected to increase of the capacity has widely been carried out.

As a negative electrode material for a non-aqueous secondary battery, lithium metal and lithium alloys are typical, but when using them, lithium metal grows in the form of a dendrite during charging and discharging, resulting in such dangers that internal short-circuit takes place and fire tends to occur due to the high activity of the dendrite metal itself. On the contrary, calcined carbonaceous materials capable of incorporating and releasing lithium have lately been put to practical use. The disadvantage of this carbonaceous material is that lithium metal sometimes tends to deposit on the carbonaceous material during overcharging or rapid charging because of having electric conductivity in itself and consequently, a dendrite metal is deposited. In order to avoid this phenomenon, a method of preventing overcharging comprising improving charging means or decreasing the quantity of a positive electrode active material has been proposed, but in the latter proposal, the quantity of the active material is limited, so that the diacharge capacity is also limited. Since carbonaceous materials have relatively small densities, furthermore, the discharge capacity is also limited intrinsically from the standpoint of the low capacity per unit volume.

In addition, it is disclosed to use SnO in Japanese Patent Laid-Open Publication No. 275268/1994, silicon oxides, in particular, oxides of silicon whose valency is at most 4 in Japanese Patent Laid-Open Publication No. 325765/1994 and composite oxides of Sn and other elements in Japanese Patent Laid-Open Publication No. 338325/1994, as a negative electrode material. These negative electrode materials, some of which have high discharge potentials and high capacities, are generally insufficient in properties as a secondary battery, since it has been impossible to develop a negative electrode material having an excellent cycle life as well as high current aptitude.

It has been proposed to use oxides of V, Si, B, Zr, Sn, etc. and composite oxides thereof as a negative electrode material suitable for a non-aqueous secondary battery having a high discharge potential, for example, 3 to 8.6 V or the like (Japanese Patent Laid-Open Publication Nos. 174818/1993, 60867/1994, 275267/1994, 325765/1994 and 338824/1994 and EP-615296). These oxides of V, Si, B, Zr, Sn, etc. and composite oxides thereof can provide non-aqueous secondary batteries of 3 to 3.6 V grade by combining with some positive electrodes and show very high stability without substantial formation of dendrite, but have the drawbacks that the charge and discharge cycle life is not sifficient and the charge and discharge efficiency at the initial cycle is low.

Moreover, non-aqueous secondary batteries using oxides of Group 13 and 14 elements of Periodic Table as a negative electrode material are described in Japanese Patent Laid-Open Publication Nos. 275273/1994 and 338325/1994, and EP 0582173 A1. However, these non-aqueous secondary batteries do not show good charging and discharging cycle properties.

As described above, of late, a secondary battery with a high energy density has been required as a battery for a power source in electronic instruments having been upgraded, miniaturized and rendered portable, in place of the nickel-cadmium cells and lead-acid batteries of the prior art. Thus, research and development of a nickel-hydrogen cell using a hydrogen-absorbing alloy as a negative electrode or a non-aqueous secondary battery using a material capable of incorporating and releasing a light metal as a positive electrode and negative electrode have lately been carried out and they have practically been used in a part of electronic instruments. Particularly, a non-aqueous secondary battery of closed type utilizing the intercalation and deintercalation of lithium and having a high cell voltage, i.e. 3.6 V and high energy density, which serves to realization of a small-sized battery with a light weight, decreased self-discharge and excellent cycle property, is expected to widely be used as a power source in portable instruments of compact type in future.

In a secondary battery of closed type, in general, the temperature of the battery itself rises during short-circuiting or overcharging, so that an electrolyte enclosed therein is evaporated to raise the inner pressure in the battery. If this state is continued, therefore, the inner pressure in the battery is continuously increased to finally cause explosion of the battery and surrounding instruments are thus damaged. Accordingly, the battery of this type is provided with an explosion-proof valve capable of exhausting the gas in the battery when the inner pressure in the battery reaches a predetermined value.

A non-aqueous secondary battery of closed type is also provided with an explosion-proof valve, but it has lately been found that during overcharging, in particular, the battery meets still with rising of the temperature and sometimes burst at last in spite of that the explosion-proof valve operates at the predetermined inner pressure in the battery to exhaust the gas out of the battery. This is probably due to that electric current continuously flows even after exhausting the gas, so the battery pressure is continued to increase with the battery temperature to cause abnormal reactions such as rapid decomposition of an electrolyte or active material and the battery temperature rapidly rises. In order to prevent the above described phenomenon, therefore, it is effective to completely cut off charging current by detecting the inner pressure and temperature of the battery. To this end, various proposals have already been made.

In a battery shown in Japanese Patent Laid-Open Publication No. 112151/1990, as shown in FIG. 15, there are arranged, at a sealing part, an explosion-proof valve 11 having a projection toward the side of a current collector 2 at the central part, an insulating stripper 24 having, at the central part thereof, a through hole, through which the projection of the explosion-proof valve is penetrated, arranged to be contacted with the lower surface of the explosion-proof valve and a lead plate 8 led out of one electrode plate of the current collector and welded to the lower surface of the above described projection to bridge the lower surface of the stripper and the lower surface of the projection of the explosion-proof valve. In this case, when the inner pressure of the battery begins to increase by overcharging or short-circuiting, the explosion-proof valve is deformed toward the opposite side to the current collector and the lead plate welded to the projection of the explosion-proof valve is stripped and/or broken at the joint part 19 with the deformation of the explosion-proof valve, whereby the electric current passage is cut off and the worst, e.g. explosion of the battery can previously be prevented. Furthermore, some improved methods have been proposed, for example, comprising fitting the above described stripper to the explosion-proof valve through convex-to-concave engagement by using an intermediate fitting member made of a resin and thus proving the assembling work efficiency (Japanese Patent Laid-Open Publication No. 288063/1990, U.S. Pat. No. 4,943,497), providing the above described stripper with a plurality of holes and the above described explosion-proof valve with thin-walled portions in the form of a groove on the surface thereof and thus improving the safety (Utility Model Laid-Open Publication No. 24262/1992), allowing a metallic thin plate to be present between the lower surface of the projection of the above described explosion-proof valve and the above described lead plate, or using, in place of the above described stripper, a metallic disc 25 having a gas through hole, fixing the disc to the explosion-proof valve by means of a disc holder 26 made of a resin, welding the lower surface of the projection of the above described explosion-proof valve to the metallic disc and simultaneously connecting the above described lead plate to the generating member side of the metallic disc, as shown in FIG. 16, whereby to improve the security (Japanese Patent Laid-Open Publication No. 343043/1993).

According to the above described publications, however, the precision for cutting off the passage of electric current depends on the relationship between the breakage or stripping strength of the welded portion and the tensile strength of the explosion-proof valve and is largely affected by the welding strength. If the surface shape or surface oxidized state of the welded portion differs, therefore, the welding strength is changed and the inner pressure in the battery, when electric current is cut off, is not constant. When, after welding, the lead plate is bent and a sealing structure, as a whole, is inserted in the opening part of an armoring can 1, furthermore, a bending stress occurring in the lead plate reacts with the welded portion as a tensile or compressing force to lower the welding strength, while sometimes the inner pressure in the battery at the time of cutting off electric current is fluctuated and the welded portion is separated by vibrating or falling away. In addition, the welded portion is exposed to the atmosphere in the battery, so in the case of a non-aqueous battery using an organic solvent as an electrolyte, spark generated when the welded portion is broken or separated to cut off the electric current ignites vapor of the organic solvent, sometimes resulting in explosion of the battery.

Under the situation, it has been proposed to provide a current cutoff means at the opposite side to the current collector of the explosion-proof valve, being not exposed to the atmosphere in the battery. In a battery shown in Japanese Patent Laid-Open Publication No. 215760/1994, as shown in FIG. 17, an internal lid 28 having a through hole at the central part, an explosion-proof valve 11 on the internal lid, an inside insulating packing 27 having a through hole at the central part and a terminal cap 13 are in order arranged at the sealing part and the peripheral parts of the internal lid and packing are respectively bent inside to hold the explosion-proof valve and terminal cap therebetween. Furthermore, an electric current cutoff lead 29 is arranged in such a manner that one end thereof is held between the above described internal lid and packing and the other end is elongated through the through hole of the packing and held between the above described packing and terminal cap. In this case, when the inner pressure in the battery begins to increase, the explosion-proof valve is deformed toward the opposite side to the current collector and simultaneously, the electric current cutoff lead is pushed up in the same direction, during which the lead, exceeding its stress limit, is broken to cut off the current passage.

According to the above described publications, however, one end of the current cutoff lead is pressed on the explosion-proof valve and accordingly, a part of the explosion-proof valve is sometimes cracked at the end of the current cutoff lead during assembling or deforming of the explosion-proof valve when the inner pressure in the battery is increased. In this case, the gas in the battery is exhausted from the cracked portion of the explosion-proof valve before cutting-off of the current passage and the electric current lead cannot be pushed up, thus resulting in a danger of explosion of the battery. Even if the electric current cutting-off mechanism operates in normal manner, the broken current cutoff lead is brought into floated state and the broken lead pieces are contacted again with each other to restore the electric current passage.

Further, it has also been proposed to cut off the electric current passage by detecting the temperature of a battery. In a battery disclosed in Japanese Patent Laid-Open Publication No. 205727/1993, as shown in FIG. 18, a bimetal 30 fitted to the outer circumference of a terminal cap 13 functioning as a positive electrode or negative electrode, a sealing internal lid 28 electrically connected with the above described bimetal in normal state and a lead plate 8 led out of one electrode of the current collector and connected with the above described sealing internal lid at the current collector side are arranged. In this case, when the temperature of the battery begins to rise by short-circuiting, etc., the bimetal operates to cut off the electric current pasage and abnormal heating of the battery can be prevented. When the battery temperature is returned to normal state, the bimetal is also returned to restore the current passage, whereby the battery can normally be used again.

In the case of the above described publication, safety can be maintained during rising of the battery temperature by short circuiting, but it is not always possible to say that safety is maintained during overcharging. Namely, this battery is of a returning type such that the voltage of the battery is gradually continued to rise during repetition of the operating and returning cycle and consequenty, the battery is often subject to explosion, as described above.

SUMMARY OF THE INVENTION

It is a first object of the present invention to provide a non-aqueous secondary battery having an improved charge and discharge cycle property and high discharge voltage, high energy density, high capacity and increased stability as well as a non-aqueous secondary battery having an excellent electric current atitude.

It is a second object of the present invention to provide a non-aqueous secondary battery having an improved capacity loss based on a negative electrode active material.

It is a third object of the present invention to provide a non-aqueous secondary battery of closed type, capable of completely cutting off continuity in the interior of the battery at the initial period even if the inner pressure of the battery is abnormally increased by overcharging or short-circuiting.

These objects can be attained by a non-aqueous secondary battery comprising a positive electrode material, negative electrode material and non-aqueous electrolyte containing a light metal salt, characterized in that the negative electrode material predominantly consists of at least one member selected from the group consisting of amorphous chalcogen compounds and amorphous oxides containing at least three atoms selected from the group consisting of Group 13, 14, 15 and 2 atoms of Periodic Table.

BRIEF DESCRIPTION OF THE DRAWINGS

The accompanying drawings are to illustrate the principle and merits of the invention in detail.

DETAILED DESCRIPTION OF THE INVENTION

Figure 1:
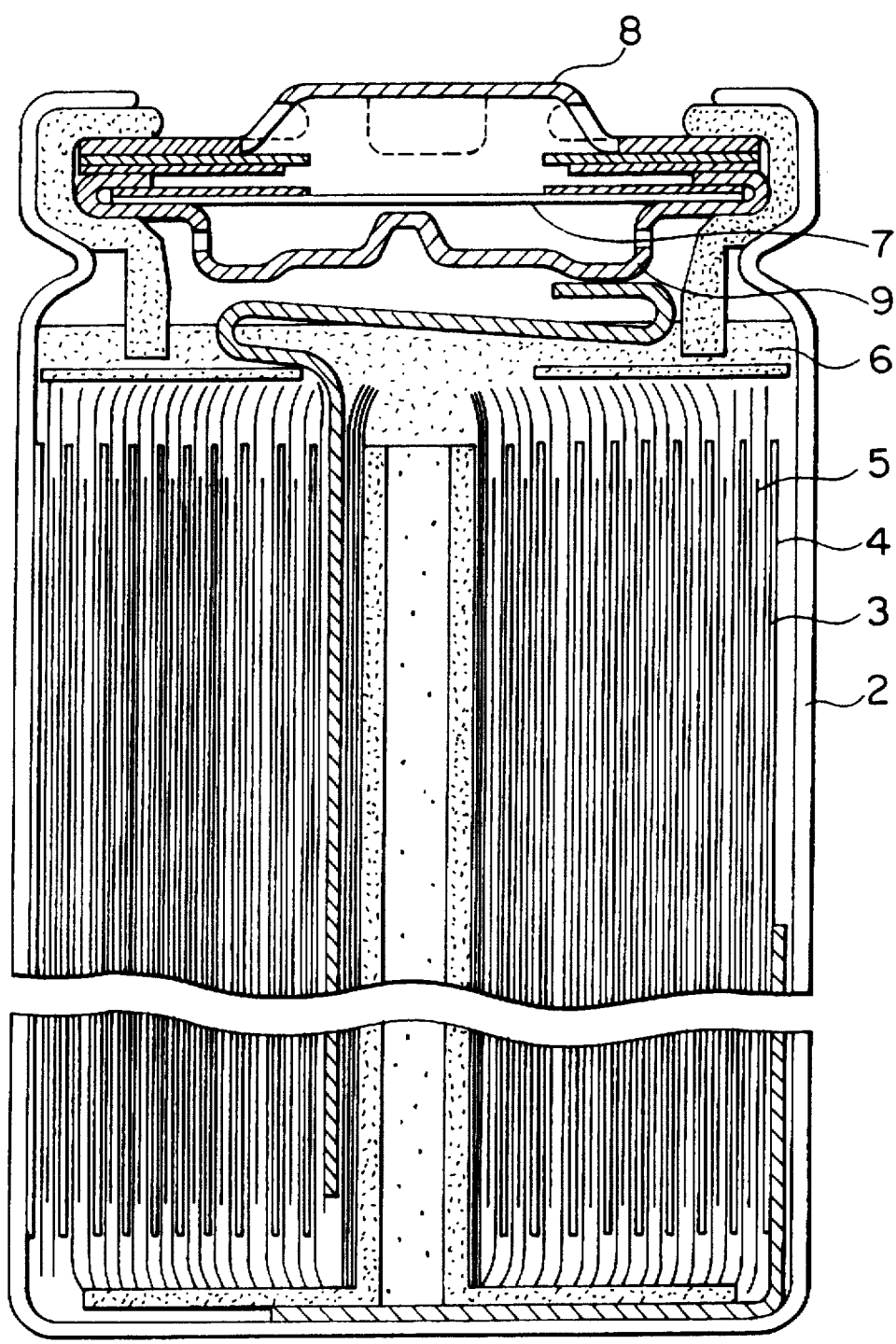
FIG. 1 is a vertically sectional view of a battery of a cylindrical type, used in Example 1.

The inventors have made various studies to provide a non-aqueous secondary battery with improved charge and discharge properties and increased stability and consequently, have found that in a non-aqueous secondary battery comprising a positive electrode material, negative electrode material and non-aqueous electrolyte containing a light metal salt, it is effective that the negative electrode material predominantly consists of amorphous chalcogen compounds and/or amorphous oxides each containing at least three atoms selected from Group 13, 14, 15 and 2 atoms of Periodic Table.

Accordingly, the present invention provides a non-aqueous secondary battery comprising a positive electrode material, a negative electrode material, a non-aqueous electrolyte containing a light metal salt, preferably lithium salt and optionally a separator, in which said negative electrode material mainly comprises an amorphous chalcogen compound or an amorphous oxide containing at least three atoms selected from the elements of Group 13, 14, 15 and 2 of Periodic Table.

The present invention includes the following preferred embodiments:

(1) A non-aqueous secondary battery comprising a positive electrode material, in particular, positive electrode active material, a negative electrode material and a non-aqueous electrolyte containing a light metal salt, preferably lithium salt, in which said negative electrode material is an amorphous negative electrode material capable of intercalating and deintercalating a light metal ion, which is subjected to a heat treatment in a reducing atmosphere.

(2) A non-aqueous secondary battery comprising a positive electrode material, in particular, positive electrode active material, negative electrode material, non-aqueous electrolyte containing a light metal salt, preferably lithium salt, and optionally a separator, in which the negative electrode material is obtained by mixing and calcining an oxide or chalcogenide and silicon dioxide.

(3) A non-aqueous secondary battery comprising a positive electrode material, in particular, positive electrode active material, a negative electrode material and a non-aqueous electrolyte containing a light metal salt, preferably lithium salt, in which said negative electrode material contains at least one member selected from the group consisting of chalcogen compounds and oxides containing at least one atom selected from the group consisting of Group 13, 14, 15 and 2 metals of Periodic Table, which are capable of intercalating and deintercalating a light metal, preferably lithium, and have a true density $\rho$ in the range of $2.5<\rho<7.5$.

(4) A sealed non-aqueous secondary battery, comprising an assembly composed of a positive electrode and a negative electrode, capable of intercalating and deintercalating a light metal, and a separator, the assembly being held by a bottomed battery can with a non-aqueous electrolyte, an insulating gasket provided on an inner circumference of an opening part of the can and a sealing structure fitted to and supported by the gasket wherein the can, additionally functions as a positive electrode or negative electrode terminal cap, the opening part of the can being sealed, and wherein the sealing structure comprises an explosion-proof valve being deformable in the opposite direction to the assembly with an increase in inner pressure of the battery, a terminal cap having formed thereon a vent hole arranged at the opposite side to the assembly collector and an electric current cutoff element arranged between the explosion-proof valve and the terminal cap, the explosion-proof valve being a dish-shaped body having a flat area projected toward the assembly from the vicinity of the outer circumference thereof, having groove-shaped thin wall parts and provided with, at the central part thereof, a projection part projected toward the opposite side to the assembly, in the form of one integrated unit.

The present invention and the preferred embodiments (1) to (4) of the present invention will now be illustrated in detail. In this specification, the light metal includes lithium and other light metals such as sodium or potassium, but the following illustration is mainly made as to lithium.

In the present invention, Group 13, 14, 15 and 2 atoms of Periodic Table are B, Al, Ga, In, Tl, Si, Ge, Sn, Pb, P, As, Sb, Bi, Be, Mg, Ca, Sr and Ba, preferably B, Al, Ga, In, Tl, Si, Ge, Sn, Pb, P, Sb, Bi, Mg, Ca, Sr and Ba, more preferably B, Al, Si, Ge, Sn, P, Mg and Ca, and most preferably B, Al, Si, Sn, P and Mg.

The amorphous chalcogen compounds and amorphous oxides specified in the present invention are preferably mainly or substantially amorphous. The "mainly or substantially amorphous" material defined herein means a material having a broad sctattering band with peaks in a range of 20° to 40° by 2 θ in an X-ray diffraction method using CuKα line, which can have a crystalline diffraction line. It is preferable that the strongest intensity of crystaline lines found in a range of, preferably 20° to 70° by 2 θ value is at most 500 times, preferably at most 100 times, more preferably at most 5 times as large as that of the diffraction patterns of the peaks in the broad sctattering band found in a range of 20° to 40° by 2 θ value. Most preferably, there is found no crystalline diffraction pattern.

The amorphous chalcogen compounds and amorphous oxides are preferably those represented by the following General Formula (1):

General Formula (1)

$M^1 M^2_p M^4_q M^6_r$ . . . (1)

wherein $M^1$ and $M^2$ are different and respectively at least one member selected from the group consisting of Si, Ge, Sn, Pb, P, B, Al, As and Sb, preferably Si, Ge, Sn, P, B and Al, more preferably Si, Sn, P, B and Al, $M^4$ is at least one member selected from the group consisting of Be, Mg, Ca, Sr and Ba, preferably Mg and Ca, more preferably Mg, $M^6$ is at least one member selected from the group consisting of O, S, Se and Te, preferably O and S, more preferably O, p and q are respectively 0.001 to 10, preferably 0.01 to 5, more preferably 0.01 to 2 and r is 1.00 to 50, preferably 1.00 to 26, more preferably 1.02 to 6.

The valency of $M^1$ and $M^2$ is not particularly limited, but may be either a single valency or a mixed valency. The ratio of $M^1$, $M^2$ and $M^4$ are such that $M^2$ and $M^4$ can continuously be changed in a range of 0.001 to 10 mol equivalent to $M^1$. Correspondingly, the quantity of $M^6$ [value of r in General Formula (1)] is continuously changed.

Among the above described compounds, in the present invention, the case where $M^1$ is Sn is preferable, as represented by the following General Formula (2), General Formula (2)

$SnM^3_p M^5_q M^7_r$ . . . (2)

wherein $M^3$ is at least one member selected from the group consisting of Si, Ge, Pb, P, B, Al and As, preferably Si, Ge, P, B and Al, more preferably Si, P, B, and Al, $M^5$ is at least one member selected from the group consisting of Be, Mg, Ca, Sr and Ba, preferably Mg and Ca, more preferably Mg, $M^7$ is at least one member selected from the group consisting of O and S, preferably O, p and q are respectively 0.001 to 10, preferably 0.01 to 5, more preferably 0.01 to 1.5, most preferably 0.7 to 1.5 and r is 1.00 to 50, preferably 1.00 to 26, more preferably 1.02 to 6.

General Formula (2) is preferably represented by the following General Formula (3), General Formula (3)

$SnSi_s M^3_p M^5_q O_t$ . . . (3)

wherein $M^3$ is at least one member selected from the group consisting of Ge, Pb, P, B, Al and As, preferably Ge, P, B and Al, more preferably P, B and Al, $M^5$ has the same meaning as in General Formula (2), p, q and s are respectively 0.01 to 5.0 and t is 1.0 to 26, p and q being preferably 0.01 to 1.5, more preferably 0.7 to 1.5 and t being preferably 1.02 to 6.

More preferable compounds of General Formula (3) can be represented by the following General Formula (4), General Formula (4)

$SnSi_p M^8_q Mg_r O_s$ . . . (4)

wherein $M^8$ is at least one member selected from the group consisting of Ge, P, B and Al, preferably P, B and Al, p, q and r are respectively 0.01 to 5.0, preferably 0.01 to 1.5, more preferably 0.7 to 1.5 and s is 1.0 to 26, preferably 1.02 to 6.

As composite oxides predominantly consisting of oxides, represented by General Formulas (1), (2), (3) and (4), there are given specifically the following compounds without limiting the present invention:

$SnSi_{0.8}Mg_{0.2}O_{2.8}$, $SnB_{0.5}P_{0.2}Mg_{0.3}O_{2.55}$,
$SnSi_{0.6}Al_{0.2}Mg_{0.2}O_{2.7}$,
$SnSi_{0.6}Al_{0.1}B_{0.1}P_{0.1}Mg_{0.2}O_{2.95}$, $SnSi_{0.8}Ca_{0.2}O_{2.8}$,
$SnB_{0.5}P_{0.2}Ca_{0.3}O_{2.55}$, $SnSi_{0.6}Al_{0.2}Ca_{0.2}O_{0.7}$,
$SnSi_{0.8}Al_{0.1}B_{0.1}P_{0.1}Ca_{0.2}O_{2.95}$,
$SnSi_{0.5}Al_{0.2}B_{0.1}P_{0.1}Mg_{0.1}O_{2.8}$,
$SnSi_{0.5}Al_{0.1}B_{0.2}P_{0.1}Mg_{0.4}O_{3.1}$,
$SnSi_{0.5}Al_{0.2}B_{0.2}Mg_{0.2}O_{2.8}$,
$SnSi_{0.5}Al_{0.2}B_{0.1}P_{0.1}Ca_{0.1}O_{2.8}$,
$SnSi_{0.5}Al_{0.1}B_{0.2}P_{0.1}Ca_{0.4}O_{3.1}$,
$SnSi_{0.5}Al_{0.2}B_{0.2}Ca_{0.2}O_{2.8}$, $SnSi_{0.8}Ba_{0.2}O_{2.8}$,
$SnB_{0.5}P_{0.2}Ba_{0.3}O_{2.55}$, $SnSi_{0.6}Al_{0.2}Ba_{0.2}O_{2.7}$,
$SnSi_{0.8}Al_{0.1}B_{0.1}P_{0.1}Ba_{0.2}O_{2.95}$

The valency of Sn and Si in General Formulas (2), (3) and (4), $M^3$ in General Formulas (2) and (3) and $M^8$ in General Formula (4) is not particularly limited, but may be either a single valency or a mixed valency. The quantities of $M^3$ and $M^5$ in the compounds represented by General Formula (2) can continuously be changed in a range of 0.01 to 10 mol equivalent to Sn and correspondingly, the quantity of $M^7$ [value of r in General Formula (3)] is also continuously changed. The quantities of Si, $M^3$ and $M^5$ in the compounds represented by General Formula (3) can continuously be changed in a range of 0.01 to 5.0 mol equivalent to Sn and correspondingly, the quantity of oxygen [value of t in General Formula (3)] is also continuously changed. The quantities of Si, $M^8$ and Mg in the compounds represented by General Formula (4) can continuously be changed in a range of 0.01 to 5.0 mol equivalent to Sn and correspondingly, the quantity of oxygen [value of s in General Formula (4)] is also continuously changed.

In the present invention, there can be provided a non-aqueous secondary battery having excellent charge and discharge cycle property as well as high discharge voltage, high capacity, high stability and good high electric current properties by the use of the compounds represented by General Formulas (1) to (4), as described above, mainly as a negative electrode material. In the present invention, in particular, it is required for obtaining most excellent benefits to use, as a negative electrode material, a compound containing Sn which is present with a valency of two. The valency of Sn can be obtained by a chemical titration procedure, for example, by a method described in "Physics and Chemistry of Glasses", Vol. 8, No. 4 (1967), page 165. Furthermore, it can also be determined from the Knight shift by measurement of the solid nuclear magnetic resonance spectrum (NMR) of Sn. For example, in the broad-line NMR measurement, metallic Sn (Sn of 0 valency), whereas the peak of SnO (divalent) appears around 100 ppm and that of $SnO_2$ (tetravalent) appears around 600 ppm, shows a peak in an extremely low magnetic field, i.e. near 7000 ppm with reference to $Sn(CH_3)_4$. In the case of having a same ligand as dedescribed above, the Knight shift is largely dependent on the valency of Sn as a central metal and accordingly, it is possible to determine the valency by the peak position obtained by the $^{118}$Sn-NMR analysis.

In the present invention, various compounds can be incorporated in the negative electrode material, for example, compounds of Group 1 elements of Periodic Table (Li, Na, K, Rb, Cs), transition metals (Sc, Ti, V, Cr, Mn, Fe, Co, Ni, Cu, Zn, Y, Zr, Nb, Mo, Tc, Ru, Rh, Pd, Ag, Cd, lanthanoids, Hf, Ta, W, Re, Os, Ir, Pt, Au, Hg) and Group 17 elements of Periodic Table (F, Cl, Br, I). Various compounds to increase the electroconductivity, for example, compounds of Sb, In and Nb can be incorporated as a dopant, preferably in a proportion of 0 to 20 mole %.

Synthesis of the composite oxides predominantly consisting of oxides, represented by General Formulas (1), (2), (3) and (4) can be carried out by any one of calcining methods and solution methods.

For example, to illustrate the calcining method in detail, an $M^1$ compound, $M^2$ compound and $M^4$ compound wherein $M^1$ and $M^2$ are different and selected from Si, Ge, Sn, Pb, P, B, Al, As and Sb and $M^4$ is selected from Be, Mg, Ca, Sr and Ba are mixed and calcined.

The Sn compound includes, for example, SnO, $SnO_2$, $Sn_2O_3$, $Sn_3O_4$, $Sn_7O_{13} \cdot H_2O$, $Sn_8O_{15}$, stannous hydroxide, stannic oxyhydroxide, stannous acid, stannous oxalate, stannous phosphate, orthostannic acid, metastannic acid, parastannic acid, stannous fluoride, stannic fluoride, stannous chloride, stannic chloride, stannous bromide, stannic bromide, stannous iodide, stannic iodide, tin selenide, tin telluride, stannous pyrophosphate, tin phosphide, stannous sulfide, stannic sulfide and the like.

The Si compound includes, for example, $SiO_2$, SiO, silicon tetrachloride, silicon tetrabromide, halogenated organo silicon compounds such as trichloromethylsilane, dimethyldichlorosilane, trimethylchlorosilane, etc., organo silicon compounds such as tetramethylsilane, tetraethylsilane, etc., alkoxy silane compounds such as tetramethoxysilane, tetraethoxysilane, etc., hydrosilane compounds such as trichlorohydrosilane, etc.

The Ge compound includes, for example, $GeO_2$, GeO, germanium tetrachloride, germanium tetrabromide and alkoxy germanium compounds such as germanium tetramethoxide, germanium tetraethoxide, etc.

The Pb compound includes, for example, $PbO_2$, PbO, $Pb_2O_3$, $Pb_3O_4$, $PbCl_2$, lead chlorate, lead perchlorate, lead nitrate, lead carbonate, lead formate, lead acetate, lead tetraacetate, lead tartrate, lead diethoxide, lead di(isopropoxide), etc.

The P compound includes, for example, phosphorus pentaoxide, phosphorus oxychloride, phosphorus pentachloride, phosphorus trichloride, phosphorus tribromide, trimethylphosphoric acid, triethylphosphoric acid, tripropylphosphoric acid, stannous pyrophosphate, boron phosphate, etc.

The B compound includes, for example, boron sesquioxide, boron trichloride, boron tribromide, boron carbide, boric acid, trimethyl borate, triethyl borate, tripropyl borate, tributyl borate, boron phosphide, boron phosphate, etc.

The Al compound includes, for example, aluminum oxide (α-alumina, β-alumina), aluminum silicate, aluminum tri-iso-propoxide, aluminum tellulite, aluminum chloride, aluminum boride, aluminum phosphide, aluminum phosphate, aluminum lactate, aluminum borate, aluminum sulfide, aluminum sulfate, aluminum boride, etc.

The Sb compound includes, for example, antimony tribromide, antimony trichloride, antimony sesquioxide, triphenylantimony, etc.

The As compound includes, for example, arsenic trichloride, arsenic trioxide, etc.

As Be, Mg, Ca, Sr and Ba compounds, there are used corresponding oxides, hydroxides, carbonates, phosphates, nitrates, halides, sulfides, nitrides, carbides, aluminate compounds, etc.

The calcination is generally carried out at a temperature raising rate of 4° to 2000° C./min, preferably 6° to 2000° C./min, more preferably 10° to 2000° C./min, at a calcination temperature of 250° to 1500° C., preferably 350° to 1500° C., more preferably 500° to 1500° C., for a calcination time of 0.01 to 100 hours, preferably 0.5 to 70 hours, more preferably 1 to 20 hours, at a temperature lowering rate of 2° to $10^{7°}$ C./min, preferably 4° to $10^{7°}$ C./min, more preferably 6° to $10^{7°}$ C./min, most preferably 10° to $10^{7°}$ C./min.

In this specification, the temperature raising rate means an average rate of temperature rising from "50% of the calcination temperature (°C.)" to "80% of the calcination temperature (°C.)" and the temperature lowering rate means an average rate of temperature lowering from "80% of the calcination temperature (°C.)" to "50% of the calcination temperature (°C.)".

Lowering of the temperature can be carried out by allowing an object to stand in a calcination furnace or by taking it out of the calcination furnace and charging in water. The ultra-quenching methods such as gun method, Hammer-Anvil method, slap method, gas atomizing method, plasma spray method, centrifugalquenching method, melt drag method, etc., described in "Ceramics Processing" (published by Gihodo KK, 1987), page 217, can be used. Moreover, the cooling can be carried out by the use of a single roller method or double roller method described in "New Glass Handbook", page 172 (published by Maruzen KK, 1991). When using a material melting during calcining, the calcined product can continuouslybe withdrawn while feeding a raw material during calcining. In such a material as melting during calcining, the melted liquid is preferably stirred.

The calcining gas atmosphere is preferably an atmosphere having an oxygen content of at most 5 volume %, more preferably an inert gas atmosphere. As the inert gas, there can be used, for example, nitrogen, argon, helium, krypton, xenon, etc.

The compounds of General Formulas (1) to (4) used in the present invention have preferably an average grain size of 0.1 to 60 μm, more preferably 1.0 to 30 μm, particularly preferably 2.0 to 20 μm. For obtaining a predetermined grain size can be used well known grinders, pulverizers or classifiers, for example, mortars, ball mills, sand mills, vibration ball mills, satellite ball mills, planet ball mills, swirling gas stream type jet mills, sieves, etc. For pulverizing, a wet process pulverizing method allowing to be present water or an organic solvent such as methanol, etc. can optionally be applied. Classification is preferably carried out to obtain a desired grain diameter. This classifying method is not limited, but sieves or wind classifiers can also be used as occasion demands. The classification can be carried out by either dry process or wet process.

The positive electrode active material which can be used in the present invention may be a transition metal oxide capable of reversibly intercalating and deintercalating lithium ion but is preferably a lithium-containing transition metal oxide. Lithium-containing transition metal oxides which can be used as a positive electrode active material include, for example, lithium-containing oxides of Ti, V, Cr, Mn, Fe, Co, Ni, Cu, Mo and W. The oxide may contain other alkali metals (Group 1 and 2 elements) in addition to Li and/or other elements such as Al, Ga, In, Ge, Sn, Pb, Sb, Bi, Si, P, B, etc. The ratio of these additional elements is preferably up to 30 mol %, still preferably up to 10 mol %, based on the transition metal. Preferred examples of the lithium-containing transition metal oxides as a positive electrode active material are those prepared from a mixture of a lithium compound and at least one compound of a transition metal selected from Ti, V, Cr, Mn, Fe, Co, Ni, Mo and W at a lithium compound/tottal transition metal compounds molar ratio of 0.3 to 2.2.

The particularly preferable positive electrode material of a lithium-containing transition metal oxide, used in the present invention, is preferably one represented by $Li_xQO_y$, wherein Q is mainly transition metals containing at least one of Co, Mn, Ni, V and Fe, x=0.2 to 1.2 and y=1.4 to 3. In particular, the case of Q=Co is preferable. Q can contain Al, Ga, In, Ge, Sn, Pb, Sb, Bi, Si, P, B, Zn, etc. in addition to the transition metals. In this case, a proportion of 0 to 30 mole % to the transition metal is preferable.

In the present invention, as a preferable example of the positive electrode material of a lithium-containing transition metal oxide, there are used $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$ and $Li_xMn_cFe_{2-c}O_4$, wherein x=0.2 to 1.2, a=0.1 to 0.9, b=0.8 to 0.98, c=1.6 to 1.96 and z=2.01 to 2.3.

In the present invention, as a particularly preferable example of the positive electrode material of a lithium-containing transition metal oxide, there are used $Li_xCoO_2$, $Li_xNiO_2$, $Li_xMnO_2$, $Li_xCo_aNi_{1-a}O_2$, $Li_xMn_2O_4$ and $Li_xCo_bV_{1-b}O_z$, wherein x=0.7 to 1.2, a=0.1 to 0.9, b=0.9 to 0.98, and z=2.01 to 2.3.

The value of x is one of before start of charging or discharging, which is increased or decreased by charging or discharging.

The positive electrode and negative electrode used in the non-aqueous secondary battery of the present invention can be prepared by coating a positive electrode composition or negative electrode composition onto a current collector or shaping in a pellet. In the positive electrode composition or negative electrode composition can respectively be incorporated various additives such as conductive agents, binders, dispersing agents, fillers, ionic conductors, pressure intensifiers, etc. in addition to the positive electrode material or negative electrode material.

The negative electrode material of the present invention can be used in such a form having a light metal, in particular, lithium intercalated. The intercalation can be carried out by an electrochemical, chemical or thermal method. The quantity of lithium to be intercalated in the negative electrode material in the present invention can be approximated to the deposition potential of lithium, but in general, it is present in a proportion of preferably 50 to 700 mole %, more preferably 100 to 600 mole %.

Examples of the conductive agent in the positive electrode and negative electrode used in the present invention are graphite, acetylene black, carbon black, Ketchen black, carbon fibers, metallic powders, metallic fibers, polyphenylene derivatives, etc. In particular, graphite and acetylene black are preferable.

Examples of the binder in the positive electrode and negative electrode used in the present invention include polyacrylic acid, carboxymethyl cellulose, polytetrafluoroethylene, polyvinylidene fluoride, polyvinyl alcohol, starch, regenerated cellulose, diacetyl cellulose, hydroxypropyl cellulose, polyvinyl chloride, polyvinyl pyrrolidone, polyethylene, polypropylene, SBR, EPDM, sulfonated EPDM, fluorinated rubbers, polybutadine, polyethylene oxide, etc. In particular, polyacrylic acid, carboxymethyl cellulose, polytetrafluoroethylene and polyvinylidene fluoride are preferably used.

As a material for a support or current collector of the positive electrode and negative electrode used in the present invention, there are used, for example, aluminum, stainless steels, nickel, titanium or alloys thereof, for the positive electrode, and copper, stainless steels, nickel, titanium or alloys thereof, for the negative electrode. These materials are generally used in the form of foils, expanded metals, punching metals, metallic nets, etc. In particular, there are preferably used aluminum foils for the positive electrode and copper foils for the negative electrode.

The separator used in the present invention can be of any insulating thin film having a large ionic permeability and a predetermined mechanical strength, for example, each consisting of a material selected from olefinic polymers, fluoro type polymers, cellulose type polymers, polyimides, nylons, glass fibers, alumina fibers, etc. These materials are generally used in the form of unwovnen cloths, woven cloths, microporous films and the like. Particularly, as the material, there are preferably used polypropylene, polyethylene, mixtures of polypropylene and polyethylene, mixtures of polypropylene and tetrafluoroethylene, etc., preferably in the form of microporous films of 0.01 to 1 µm in pore diameter and 5 to 50 µm in thickness.

The electrolyte used in the present invention can preferably be composed of at least one organic solvent selected from propylene carbonate, ethylene carbonate, butylene carbonate, dimethyl carbonate, diethyl carbonate, 1,2-dimethoxyethane, γ-butyrolactone, tetrahydrofuran, 2-methyltetrahydrofuran, dimethyl sulfoxide, dioxorane, 1,3-dioxorane, formamide, dimethylformamide, nitromethane, acetonitrile, methyl formate, methyl acetate, methyl propionate, phosphric acid triesters, trimethoxymethane, dioxorane derivatives, sulfolane, 3-methyl-2-oxazolidinone, propylene carbonate derivatives, tetrahydrofuran derivatives, diethyl ether and 1,3-propanesultone, and an electrolyte consisting of a solution of at least one salt selected from $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium lower aliphatic carboxylate, $LiAlCl_4$, LiCl, LiBr, LiI, chloroboranelithium and lithium tetraphenylborate. In particular, it is preferable to use an electrolyte prepared by dissolving at least one of $LiCF_3SO_3$, $LiClO_4$, $LiBF_4$ and $LiPF_6$ in a mixed solvent of propylene carbonate or ethylene carbonate with at least one of 1,2-dimethoxyethane and diethyl carbonate.

In the first embodiment of the present invention, the positive electrode and negative electrode used in the non-aqueous secondary battery can be prepared by coating a positive electrode composition or negative electrode composition onto a current collector. The feature of this embodiment consists in a non-aqueous secondary battery comprising a positive electrode material, in particular, positive electrode active material, negative electrode material and non-aqueous electrolyte containing a light metal salt, preferably lithium salt, in which the negative electrode material is an amorphous negative electrode material capable of intercalating and deintercalating a light metal ion, which is subjected to a heat treatment in a reducing atmosphere.

Preferably, the amorphous negative electrode material is one represented by MZ.pGO.qX wherein MZ is an oxide or chalcogenide consisting of at least one member selected from the group consisting of Group 13 to 15 submetals or transition metals of Periodic Table, which is related with intercalation and deintercalation of lithium ion, GO is a so-called amorphous network-forming agent or network modifying agent for rendering stable and amorphous, X is fluorine, p is a mole ratio of the inorganic oxide or chalcogenide related with intercalation and deintercalation of lithium ion and the amorphous network-forming agent or network modifying agent in a range of 0.25 to 5.0, q is a mole ratio of the inorganic oxide or chalcogenide related with intercalation and deintercalation of lithium ion and the fluorine atom in a range of 0 to 1.0.

The inventors have made various studies to improve the charge and discharge cycle life and capacity loss of oxides of V, Si, B, Zr, Sn, etc. or composite oxides thereof, which can be used as a negative electrode material, and to obtain a lithium secondary battery with a good charge and discharge cycle life as well as high capacity, and consequently, have found that the capacity loss can surprisingly be improved to impart high capacity thereto by preparing the negative electrode by mixing and melting the oxide or chalcogenide with the amorphous network-forming agent to be amorphous and then subjecting to a heat treatment in a reducing atmosphere containing at least one of hydrogen and carbon monoxide.

In greater detail, MZ is considered to effect an oxidation and reduction reaction and simultaneously provide intercalation and deintercalation sites during charge and discharge reaction of the battery. For the purpose of stabilizing the charge and discharge cycle, it is required that the intercalation and deintercalation sites are stably dispersed in a medium and pGO.qF is considered to play a role as a dispersing medium of the intercalation and deintercalation sites.

As the compound of MZ, there are used, for example, SiO, GeO, $GeO_2$, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $VO_2$, $V_2O_5$, MnO, $Fe_2O_3$, $Co_2O_3$, NiO, ZnO, NbO, $MoO_2$, $MoO_3$, $WO_2$, $WO_3$, GeS, $GeS_2$, SnS, $SnS_2$, PbS, $PbS_2$, $Sb_2S_3$, $Sb_2S_5$ and $SnSiS_3$, individually or in combination. These compounds can be composite oxides with lithium oxide, such as $Li_2SnO_2$, $Li_2GeO_3$, etc. As MZ, there are preferably used SnO, $SnO_2$, PbO, SiO and GeO, individually or in combination. More preferably, SnO is selectively used.

The amorphous network forming agent or network modifier GO can be any material capabe of forming amorphous network with MZ, specifically, at least one oxide selected from the group consisting of Si, Al, B, Ca, Mg, P, Li, Na, K and V. Examples of the amorphous network forming agent are $SiO_2$, $Al_2O_3$, $B_2O_3$, $P_2O_5$ and the like, which are individually or in combination mixed with MZ and then calcined to obtain an amorphous negative electrode material. The amorphous network forming agent can be mixed with MZ in such an arbitrary proportion as causing vitrification, preferably in a proportion by mole of 0 to 1 of $SiO_2$, 0 to 0.5 of $Al_2O_3$, 0 to 1 of $B_2O_3$ and 0 to 1 of $P_2O_5$ to MZ.

The network modifier includes, for example, CaO, MgO, $Li_2O$, $Na_2O$, $K_2O$, etc., which can also be added to MZ, followed by calcining. Furthermore, it is effective to incorporate F into the amorphous negative electrode material, for example, by adding $SnF_2$, $CaF_2$, $MgF_2$, $ZrF_2$, etc. thereto, followed by calcining.

p represents a mole ratio of the inorganic oxide or chalcogenide related with intercalation and deintercalation of lithium and the amorphous network forming agent, generally in a range of 0.25 to 5, preferably 0.33 to 3, more preferably 0.35 to 2.

q represents a mole ratio of the inorganic oxide or chalcogenide related with intercalation and deintercalation of lithium and the halogen, generally in a range of 0 to 1, preferably 0 to 0.5, more preferably 0 to 0.3.

Preferable examples of compounds represented by the general formula SnO.pGO.qX include $SnO.SiO_2$, $SnO.0.7SiO_2.0.2P_2O_5.0.1B_2O_3$ $SnO.0.4SiO_2.0.1Al_2O_3.0.1B_2O_3.0.3P_2O_5$, $SnO.0.3B_2O_3.0.1CaO.0.6P_2O_5$, $SnO.0.1Al_2O_3.0.3B_2O_3.0.1MgO.0.3P_2O_5.0.1F$, etc.

More preferable compounds are those representd by the general formula, $SnO.rSiO_2.sGO'$, wherein GO' is a compound corresponding to exclusion of silicon oxide from the amorphous network-forming agent or network modifying agent represented by the foregoing GO, r and s represent mole ratios of the inorganic oxides or chalcogenides, which are related with intercalation or deintercalation of lithium, and fluorine atom, respectively in a range of preferably 0.1 to 2, more preferably 0.2 to 1.2, most preferably 0.3 to 1.

Examples of these compounds include $SnO.0.7SiO_2.0.3P_2O_5$, $SnO.0.7SiO_2.0.1Al_2O_3.0.2B_2O_3$, $SnO.0.6SiO_2.0.1Al_2O_3.0.1B_2O_3.0.2P_2O_5$, $SnO.0.9SiO_2.0.1Al_2O_3.0.1B_2O_3.0.1P_2O_5$, $SnO.0.4SiO_2.0.1Al_2O_3.0.2B_2O_3.0.3P_2O_5.0.1MgO$, $SnO.0.7SiO_2.0.1Al_2O_3.0.2B_2O_3.0.2P_2O_5.0.1Li_2O$, etc.

The negative electrode material of this embodiment is preferably amorphous when assembling into the battery, as described above, and the amorphous negative electrode material can be synthesized by any one of calcination methods and solution methods under the same conditions as those in the general process for the production thereof.

The chemical formula of the compound obtained by the above described calcination can be determined by inductively coupled plasma (ICP) spectrometry as a measurement method or by weight difference of a powder after and before the calcination as a simplified method.

In this embodiment, the amorphous negative electrode material obtained as described above is heat-treated in a reducing atmosphere. The shape of the amorphous negative electrode active material to be treated is not particularly limited and is preferably a powder with a grain size of at most about 50 μm. This powder grain has preferably a surface area of at least 0.01 $m^2/g$, more preferably at least 0.5 $m^2/g$.

The reducing treatment of the amorphous negative electrode material is preferably carried out in a reducing atmosphere containing at least one of hydrogen and carbon monoxide and preferably in hydrogen atmosphere. The reducing treatment is generally carried out at a 1 to 300 atm. In the case of normal pressure, it is carried out in a stream of hydrogen or carbon monoxide and in the case of a high pressure, it is carried out in a pressure vessel such as autoclave while compresssing at about 300 atm or lower by hydrogen, carbon monoxide, etc. The treatment temperature is not particularly limited, but it is preferably 50° to 800° C., more preferably 400° to 500° C. The treatment time is preferably at least 10 minutes, more preferably at least 30 minutes. During the heat treatment, the amorphous negative electrode material can be maintained under static state or stirred state.

In this embodiment, the quantity of a light metal such as lithium intercalated into the amorphous negative electrode material can be approximated to the deposition potential of the light metal, but in general, it is present in a proportion of preferably 50 to 700 mole %, more preferably 400 to 600 mole %. The intercalation can preferably be carried out by an electrochemical method or chemical method. The electrochemical method preferably comprises electrochemically intercalating the light metal contained in a positive electrode active material in the amorphous negative electrode material or electrochemically intercalating directly from the light metal or its alloy. The chemical method comprises mixing or contacting with the light metal or reacting with an organo metal such as butyllithium. As the light metal, lithium or lithium ion is particularly preferable.

For the amorphous negative electrode material used in this embodiment, there are given compounds capable of intercalating and deintercalating a light metal ion, light metals, light metal alloys, carbonaceous copounds, inorganic oxides, inorganic chalcogenides, metallic complexs, organic high molecular compounds, etc. For example, joint use of the amorphous negative electrode active material with a carbonaceous compound, inorganic chalcogenide, organic high molecular compound, etc. is preferable.

The carbonaceous compound to be jointly used is selected from natural graphite, artificial graphite, gaseous phase-grown carbons, calcined organo material carbons, etc. This carbonaceous compound preferably contains graphite structure even if little. Examples of the carbonaceous compound are natural graphite, petroleum coke, pitch coke, coal, cresol resin calcined carbon, furan resin calcined carbon, polyacrylonitrile fiber calcined carbon, gaseous phase grown graphite, gaseous phase grown carbon, mesophase pitch calcined carbon, etc. In addition, the carbonaceous compound can contain 0 to 10 weight % of other materials than carbon, for example, B, P, N, S, etc. and SiC or $B_4C$ can be incorporated.

The inorganic chalcogenide to be jointly used includes preferably sulfides such as $TiS_2$, GeS, $GeS_2$, SnS, $SnS_2$, PbS, $PbS_2$, $Sb_2S_3$, $Sb_2S_5$, $SnSiS_3$ and the like.

The positive electrode active material used in this embodiment is a compound capable of intercalating and deintercalating a light metal ion, for example, selected from transition metal oxides and transition metal chalcogenides. The transition metal oxides, in particular, transition metal oxides containing lithium are preferably used.

Transition metals preferably used in this embodiment are Ti, V, Cr, Mn, Fe, Co, Ni, Cu, Nb, Mo and W. Among compounds of these transition metals, there are preferably used manganese dioxides, vanadium pentoxide, iron oxides, molybdenum oxides, molybdenum sulfides, cobalt oxides, iron sulfides, titanium sulfides, etc, individually or in combination. Furthermore, these compounds can be used jointly with lithium-containing transition metal oxides.

The lithium-containing transition metal oxide can be synthesized, for example, by mixing a lithium compound and transition metal compound and then calcining the mixture. The lithium compound and transition metal compound will be illustrated in detail.

Examples of the lithium compound preferably used in this embodiment are lithium hydroxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethanesulfonate, lithium tatraborate, lithium hexafluorophosphate, lithium fluoride, lithium chloride, lithium bromide, lithium iodide, etc.

As the transition metal compound, there can be used oxides, salts and complex salts of monovalent to hexavalent transition metals. The transition metals are Ti, V, Mn, Fe, Co, Ni, Cu, Nb, Mo and W. As the transition metal compound, there are preferably used compounds described in Paragraphs 8 and 9 of Japanese Patent Laid-Open Publication No. 243897/1994, $VO_d$ (d=2 to 2.5), lithium compounds of $VO_d$, ammonium metavanadate, $MnO_2$, $M_2O_3$, manganese hydroxide, manganese carbonate, manganese nitrate, iron oxides (di- and trivalent), triiron tetraoxide, iron hydroxides (di- and trivalent), iron acetates (di- and trivalent), iron citrates (di- and trivalent), iron ammonium citrates (di- and trivalent), iron oxalates (di- and trivalent), iron ammonium oxalates (di- and trivalent), CoO, $Co_2O_3$, $Co_3O_4$, $LiCoO_2$, cobalt carbonate, cobalt basic carbonate, cobalt hydroxide, cobalt sulfate, cobalt nitrate, nickel oxide, nickel hydroxide, nickel carbonate, nickel basic carbonate, nickel sulfate, nickel nitrate, nickel acetate, niobium oxychloride, niobium pentachloride, niobium pentaiodide, niobium monoxide, niobium dioxide, niobium trioxide, niobium pentaoxide, niobium oxalate, niobium methoxide, niobium ethoxide, niobium propoxide, niobium butoxide, lithium niobate, $MoO_3$, $MoO_2$, $LiMo_2O_4$, molybdenum pentachloride, ammonium molybdate, lithiumm molybdate, ammonium molybdophosphate, molybdenum oxide acetylacetonate, $WO_2$, $WO_3$, tungstic acid, ammonium tungstate, ammonium tungstophosphate, etc., individually or in combination.

The transition metal compound particularly preferably used in this embodiment includes, for example, compounds described in Paragraphs 10 and 11 of Japanese Patent Laid-Open Publication No. 243897/1994, $MoO_3$, $MoO_2$, $LiMo_2O_4$, $WO_2$ and $WO_3$.

The positive electrode active material preferably used in this embodiment is a lithium-containing transition metal oxide represented by $Li_xM_yO_z$, wherein M is mainly at least one metal selected from the group consisting of V, Mn, Fe, Co and Ni, x=0.05 to 1.2, y=1 or 2 and z=1.5 to 5. This compound can contain at least one of alkali metals and alkaline earth metals in addition to lithium, other transition metals than the above described metals M or Group 13 to 15 elements of Periodic Table (Al, Ga, In, Si, Ge, Sn, Pb, Sb and Bi).

Furthermore, it is preferable to use $LiCoO_2$ in which a part of Co is replaced by B as described in Japanese Patent Laid-Open Publication No. 253162/1992, $LiB_xCo_{(1-x)}O_2$ (0.01≦x≦0.25) described in Japanese Patent Laid-Open Publication No. 325971/1993 or $Li_xM_yL_zO_2$ wherein M is a transition metal, L is B, P or Si, 0<x≦1.15, 0.85<y≦1.3 and 0<z, as described in Japanese Patent Laid-Open Publication No. 54889/1993, each containing P or B.

Examples of the positive electrode active material of lithium-containing metal oxide more preferably used in this embodiment are $Li_xCoO_2$, $Li_xNiO_2$, $Li_xCo_aNi_{(1-a)}O_2$, $Li_xCO_bV_{(1-b)}O_z$, $Li_xCo_bFe_{(1-b)}O_z$, $Li_xMn_2O_4$, $Li_xMnO_2$, $Li_xMn_2O_3$, $Li_xMn_bCo_{(2-b)}O_z$, $Li_xMn_bNi_{(2-b)}O_z$, $Li_xMn_bV_{(2-b)}O_z$, and $Li_xMn_bFe_{(1-b)}O_z$, wherein x=0.05 to 1.2, a=0.1 to 0.9, b=0.8 to 0.98 and z=1.5 to 5.

Examples of the positive electrode active material of lithium-containing transition metal oxide most preferably used in this embodiment are $Li_xCoO_2$, $Li_xNiO_2$, $Li_xCo_yNi_{(1-y)}O_2$, $Li_xMn_2O_4$ and $Li_xCo_bV_{(1-b)}O_z$, wherein x=0.05 to 1.2, a=0.1 to 0.9, b=0.9 to 0.98 and z=2.02 to 2.3.

The positive electrode active material used in this embodiment can be synthesized by a method comprising mixing and calcining a lithium compound and transition metal compound or by a solution method, but the calcination method is preferable.

The calcination temperature employed in this embodiment can be selected from any temperature at which a part of mixed compounds, used in this embodiment, is decomposed and melted, and it is preferably 250° to 2000° C., more preferably 350° to 1500° C. It is particularly preferable to effect the calcination at 250° to 900° C. The calcination time is preferably 1 to 72 hours, more preferably 2 to 20 hours. Mixing of the raw materials can be carried out by dry process or wet process. The positive electrode active material can be subjected to annealing at 200° to 900° C.

The calcining atmosphere is not particularly limited, but can be any one of inert gases, oxidizing atmospheres and reducing atmospheres, for example, air, gases whose oxygen concentration is controlled in a suitable proportion, hydrogen, carbon monoxide, nitrogen, argon, helium, krypton, xenon, carbon dioxide, etc.

For synthesis of the positive electrode active material in this embodiment, a transition metal oxide can be reacted with lithium metal, a lithium alloy or butyllithium to intercalate lithium ion.

The average grain size of the positive electrode active material used in this embodiment is not particularly limited, but it is preferably 0.1 to 50 µm. It is desired that the volume of grains of 0.5 to 30 µm in diameter is present in a proportion of at least 95%. The specific surface area is not particularly limited, but it is preferably in the range of 0.01 to 50 $m^2/g$ measured by the BET method. For obtaining a predetermined grain size can be used well known grinders, pulverizers or classifiers, for example, mortars, ball mills, vibration ball mills, vibration mills, satellite ball mills, epicyclic ball mills, swirling gas stream type jet mills, etc. The positive electrode active material obtained by the calcination can be washed with water, acidic aqueous solutions, alkaline aqueous solutions, organic solvents, and used, preferably under such a state that when 5 g of the positive electrode active material is charged in 100 ml of distilled water, the supernatant shows a pH of about 6 to 11.

The surface of the positive electrode active material or negative electrode active material of the oxide used in this embodiment can be coated with an oxide having a different chemical formula from that of the positive electrode active material or negative electrode active material used herein. This surface oxide is preferably one containing a compound soluble in an acidic or alkaline solution. Further, a metal oxide with a high electric conductivity is preferable. To this end, for example, it is preferable to incorporate a dopant such as a metal with a different valency as oxide or halogen element in $PbO_2$, $Fe_2O_3$, $SnO_2$, $In_2O_3$ or $ZnO$. $SiO_2$, $SnO_2$, $Fe_2O_3$, $ZnO$ and $PbO_2$ are particularly preferable. The quanity of the metal oxide used for this surface treatment is preferably 0.1 to 10 weight %, more preferably 0.2 to 5 weight %, most preferably 0.3 to 3 weight % based on the positive electrode active material or negative electrode material.

Furthermore, the surface of the positive electrode active material or negative electrode material can be modified. For example, the surface of the metal oxide is treated with an esterification agent, chelating agent, electroconductive high molecular material or polyethylene oxide.

To the electrode compositions can be added conductive agents, binders, fillers, dispersing agents, ionic conductors, pressure intensifiers, and other various additives.

The conductive agent of the negative electrode material can be selected from any electroconductive materials causing no chemical change in an assembled battery. In the conductive agent can ordinarily be incorporated conductive materials such as natural graphite (crystalline graphite, scale-shaped graphite, etc.), artificial graphite, carbon black, acetylene black, Ketchen black, carbon fibers, metallic powders (copper, nickel, aluminum, silver, etc.), metallic fibers and polyphenylene derivatives, individually or in combination. Particularly, joint use of graphite and acetylene black is preferable. The amount of graphite and acetylene black is not particularly limited, but it is preferably 1 to 50 weight %, more preferably 1 to 30 weight %. In the case of carbon or graphite, the amount is preferably in a range of 1 to 15 weight %, more preferably 1 to less than 5 weight %. The ratio by weight of graphite and carbon balck is preferably 10/1 to 1/1, more preferably 5/1 to 2/1.

As the binder for supporting the electrode composition used in this embodiment, there can be used polysaccharides, thermoplastic resins and polymers having rubber elasticity and the like, individually or in combination. Preferable examples of the binder are starch, carboxymethyl cellulose, cellulose, diacetyl cellulose, methyl cellulose, hydroxyethyl cellulose, hydroxypropyl cellulose, sodium alginate, polyacrylic acid, polyvinyl phenol, polyvinyl methyl ether, water-soluble polymers such as polyvinyl alcohol, polyvinyl pyrrolidone, polyacrylamide, polyhydroxy(meth)acrylate and styrene-maleic acid copolymers, etc., polyvinyl chloride, polytetrafluoroethylene, polyvinylidene fluoride, tetrafluoroethylene-hexafluoropropylene copolymers, vinylidene fluoride-tetrafluoroethylene-hexafluoropropylene copolymers, polyethylene, polypropylene, ethylene-propylene-dieneterpolymers (EPDM), sulfonated EPDM, polyvinyl acetal resins, (meth) acrylic acid ester copolymers containing (meth)acrylic acid ester such as methyl methacrylate, 2-ethylhexyl acrylate, etc., (meth)acrylic acid ester-acrylonitrile copolymers, polyvinyl ester copolymers containing vinyl esters such as vinyl acetate, etc., styrene-butadiene copolymers, acrylonitrilebutadiene copolymers, polybutadiene, neoprene rubbers, fluorine rubbers, polyethylene oxide, polyesterpolyurethane resins, polyetherpolyurethane resins, polycarbonatepolyurethane resins, polyester resins, phenol resins, or emulsions (latex) or suspensions of epoxy resins, etc.

These binders can be used individually or in combination. The amount of the binder to be added is not particularly limited, but it is preferably 1 to 50 weight %, more preferably 1 to 30 weight %, most preferably 2 to 10 weight %. If the amount of the binder is too small, the retension force or cohesive force of the electrode composition is decreased and the cycle property is deteriorated, while if too excessive, the electrode volume is increased to decrease the capacity per unit volume or unit weight of the electrode and the electric conductivity and capacity are lowered. Distribution of the binder in the composition can either be uniform or ununiform.

As the filler, there can be used any fibrous materials causing no chemical change in an assembled battery, for example, fibers of olefinic polymers such as polypropylene, polyethylene, etc., glass, carbon, etc. The amount of the filler to be added is not particularly limited, but it is preferably 0 to 30 weight %.

As the electrolyte, any one of known materials as inorganic and organic solid electrolyte can be used, details of which will be illustrated in the following item of the electrolyte. The pressure intensifier is selected from compounds capable of increasing the inner pressure, for example, carbonates.

The electrolyte is generally composed of a solvent and a lithium salt (anion and lithium cation) soluble therein. Examples of the solvent include aprotic organic solvent such as propylene carbonate, ethylene carbonate, butylene carbonate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, ethylmonoglime, phosphoric acid triesters, trimethoxymethane, dioxolan derivatives, sulforan, 3-methyl-2-oxazolidinone, propylene carbonate derivatives, tetrahydrofuran derivatives, ethyl ether, 1,3-propanesultone, etc. They can be used individually or in combination. Examples of the anion of the lithium salt soluble in these solvents are $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}CL_{10}^-$, (1,2-dimethoxyethane)$_2ClO_4^-$, lower aliphatic carboxylate ions, $AlCl_4^-$, $Cl^-$, $Br^-$, $I^-$, anion of chlorobarane compounds, tetrafluorophenylborate ion, etc., which can be used individually or in combination. Above all, it is preferable to incorporate therein cyclic carbonates and/or noncyclic varbonates, for example, diethyl carbonate, dimethyl carbonate, methylethyl carbonate, etc. In addition, ethylene carbonate or propylene carbonate is preferably added. Further, it is preferable to use an electrolyte comprising an electrolytic solution of a suitable mixture of ethylene carbonate with propylene carbonate, 1,2-dimethoxyethane, dimethyl carbonate or diethyl carbonate, in which at least one of $LiCF_3SO_3$, $LiClO_4$, $LiBF_4$ and $LiPF_6$ is incorporated as a support salt. Among these support salts, $LiPF_6$ is particularly preferable.

The quantity of the electrolyte added to a battery is not particularly limited, but it can suitably be used depending on the quantities of a positive electrode active material or negative electrode material and the size of the battery. The concentration of the supporting electrolyte is not particularly limited, but it is preferably in a range of 0.2 to 3 moles/liter of electrolyte.

Furthermore, a solid electrolyte can jointly be used with the electrolytic solution. The solid electrolyte can be classified into an inorganic solid electrolyte and organic solid electrolyte. As the inorganic solid electrolyte, lithium nitride, halide and oxyacid salt are well known. Examples of the electrolyte are $Li_3N$, $LiI$, $Li_5NI_2$, $Li_3N-LiI-LiOH$, $Li_4SiO_4$, $Li_4SiO_4-LiI-LiOH$, $xLi_3PO_4(1-x)Li_4SiO_4$, $Li_2SiS_3$ and phosphorus sulfide compounds.

The organic solid electrolyte includes, for example, polyethylene oxide derivatives or polymers containing the derivatives, polypropylene oxide derivatives or polymers containing the derivatives, polymers containing ion dissociative groups, mixtures of polymers containing ion dissociative groups and the above described aprotic electrolytic solutions, phosphoric acid ester polymers, high molecular matrixes containing aprotic polar solvents and the like. Furthermore, a method comprising adding polyacrylonitrile to an electrolyte solution (Japanese Patent Laid-Open Publication No. 278774/1987) and a method comprising jointly using inorganic and organic solid electrolytes (Japanese Patent Laid-Open Publication No. 1768/1985) are known.

Furthermore, other compounds can be added to electrolytes for the purpose of improving the discharge property and the charge and discharge property, ilustrative of which are pyridine, triethyl phosphite, triethanolamine, cyclic ethers, ethylenediamine, n-glime, hexaphosphoric acid triamide, nitrobenzene derivatives, sulfur, quinone imine dyes, N-substituted oxazolidinones, N,N'-substituted imidazolidinones, ethylene glycol dialkyl ethers, quaternary ammonium salts, polyethylene glycol, pyrrole, 2-methoxyethanol, $AlCl_3$, monomers of electroconductive polymer electrode active materials, triethylenephosphoramide, trialkylphosphines, morpholine, aryl compounds having carbonyl group, crown ethers such as 12-crown-4, hexamethylphosphoric triamide, 4-alkylmorpholines, bicyclic tertiary amines, oils, quaternary phosphonium salts, tertiary phosphonium salts, etc.

In order to render an electrolytic solution noncombustible, a halogen-containing solvent such as carbon tatrachloride, trifluorochloroethylene, etc. can be added thereto (Japanese Patent Laid-Open Publication No. 36632/1973). Moreover, carbon dioxide can be contained in an electrolytic solution to impart an aptitude for high temperature storage thereto. It is known that to a composition for a positive electrode or negative electrode can be addd an electroltic solution or electrolyte, for example, the foregoing ion conductive polymers, nitromethane, etc.

As the separator, there can be used, for example, an insulating microporous thin film having a large ion permeability and a predetermined mechanical strength. This film preferably has a function of sealing the micropores at 80° C. or higher to increase the resistance. From the standpoint of organic solvent resistance and hydrophobic property, it is preferable to use a sheet or nonwoven cloth formed of an olefinic polymer such as polypropylene and/or polyethylene or glass fibers. The pore diameter of the separator can be in the..commonly used range as a separator for a battery, for example, 0.01 to 10 μm. The thickness of the separator can also be in the commonly used range as a separator for a battery, for example, 5 to 300 μm. Production of the separator can generally be carried out by synthesizing a polymer and rendering it porous by a dry process stretching method or a solution or solvent removal method or by combination thereof.

The current collector consisting of a positive electrode, negative electrode can be formed of any electroconductive material causing no chemical change in a constituted battery. For example, as the positive electrode material, there can be used stainless steels, nickel, aluminum, titanium and calcined carbon, and further, aluminum or stainless steel, the surface of which is treated with carbon, nickel, titanium or silver. In particular, aluminum or aluminum alloys are preferable. As the negative electrode material, there can be used stainless steels, nickel, copper, titanium, aluminum and calcined carbon, and further, copper or stainless steel, the surface of which is treated with carbon, nickel, titanium or silver, and Al—Cd alloys. In particular, copper or copper alloys are preferable. These materials can be subjected to surface oxidation. In addition, the surface of the current collector is preferably roughened by a suitable surface treatment. The shape thereof can be chosen from any one of foils, films, sheets, nets, punched ones, laths, porous ones, foamed ones, fibrous ones and the like. The thickness thereof is not particularly limited, but it is generally in a range of 1 to 500 μm.

In the second embodiment of the present invention, the negative electrode material is an amorphous oxide or chalcogenide, which is preferably amorphous, mainly during assembling a battery. "Amorphous" specified herein has the same meaning as defined hereinbefore.

A further preferable negative electrode material is an amorphous composite oxide obtained by mixing and calcining silicon dioxide with at least one oxide of an element selected from the group consisting of Sn, Ge, Pb, Sb and Bi or by calcining a mixture having a composition represented by MZ.pGO, wherein MZ is at least one oxide of an element selected from the group consisting of Sn, Ge, Pb, Sb and Bi and GO is an amorphous network-forming agent containing at least silicon dioxide. The compound obtained by the calcination includes also non-stoichiometric compounds whose ratios with oxygen are not stoichiometric, compounds having a plurality of valencies, unhomogeneous compounds, etc. p is a mole ratio of intercalation and deintercalation sites of lithium ion and the dispersing medium, generally in a range of 0.25 to 5, more preferably 0.33 to 2.

MZ is an inorganic oxide related with intercalation and deintercalation of lithium ion and is considered to effect an oxidation and reduction reaction and simultaneously provide intercalation and deintercalation sites during charge and discharge reaction of the battery. For the purpose of stabilizing the charge and discharge cycle, it is required that the intercalation and deintercalation sites are stably dispersed in a medium and the amorphous network-forming agent GO is considered to play a role as a dispersing medium of the intercalation and deintercalation sites.

As the compound of MZ, there are preferably used, for example, GeO, $GeO_2$, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, etc. These compounds can be composite oxides with lithium oxide, such as $Li_2GeO_3$, $Li_2SnO_2$, etc. Among them, there are more preferably used SnO, $SnO_2$, and GeO, individually or in combination.

The amorphous network forming agent GO can be any material capable of forming amorphous network with MZ, specifically, B, P and Al compounds in addition to the silicon compounds. Above all, it is preferred to form the amorphous network structure by calcining with MZ to give the oxide.

The negative electrode material in this embodiment can be obtained by calcining a mixture of the composition MZ.pGO and the following compounds, individually or in combination, can be used as MZ and GO.

The Si compound includes, for example, $SiO_2$, silicon tetrachloride, silicon tetrabromide, halogenated organo silicon compounds such as trichloromethylsilane, dimethyldichlorosilane, trimethylchlorosilane, etc., organo silicon compounds such as tetramethylsilane, tetraethylsilane, etc., alkoxy silane compounds such as tetramethoxysilane, tetraethoxysilane, etc., hydrosilane compounds such as trichlorohydrosilane, etc.

The Sn compound includes, for example, SnO, $SnO_2$, $Sn_2O_3$, $Sn_3O_4$, $Sn_7O_{13}.H_2O$, $Sn_8O_{15}$, stannous hydroxide, stannic oxyhydroxide, stannic acid, stannous oxalate, stannous phosphate, orthostannic acid, metastannic acid, parastannic acid, stannous fluoride, stannic fluoride, stannous chloride, stannic chloride, stannous bromide, stannic bromide, stannous iodide, stannic iodide, tin selenide, tin telluride, stannous pyrophosphate, tin phosphide, stannous sulfide, stannic sulfide and the like.

The Ge compound includes, for example, $GeO_2$, GeO, germanium tetrachloride, germanium tetrabromide and alkoxy germanium compounds such as germanium tetramethoxide, germanium tetraethoxide, etc.

The Pb compound includes, for example, $PbO_2$, PbO, $Pb_2O_3$, $Pb_3O_4$, $PbCl_2$, lead chlorate, lead perchlorate, lead nitrate, lead carbonate, lead formate, lead acetate, lead tetraacetate, lead tartrate, lead diethoxide, lead di(isopropoxide), etc.

The P compound includes, for example, phosphorus pentaoxide, phosphorus oxychloride, phosphorus pentachloride, phosphorus trichloride, phosphorus tribromide, trimethylphosphoric acid, triethylphosphoric acid, tripropylphosphoric acid, stannous pyrophosphate, boron phosphate, etc.

The B compound includes, for example, boron sesquioxide, boron trichloride, boron tribromide, boron carbide, boric acid, trimethyl borate, triethyl borate, tripropyl borate, tributyl borate, boron phosphide, boron phosphate, etc.

The Al compound includes, for example, aluminum oxide ($\alpha$-alumina, $\beta$-alumina), aluminum silicate, aluminum tri-iso-propoxide, aluminum tellulite, aluminum chloride, aluminum boride, aluminum phosphide, aluminum phosphate, aluminum lactate, aluminum borate, aluminum sulfide, aluminum sulfate, etc.

The Sb compound includes, for example, antimony tribromide, antimony trichloride, antimony sesquioxide, triphenylantimony, etc.

Among the above described compounds, particularly preferable compounds are those obtained by calcining a mixture having the composition $SnO.qSiO_2.rGO'$, wherein GO' is a compound corresponding to the exclusion of tin compounds and silicon compounds from the above described amorphous network-forming agent, which may be a single compound or a plurality of compounds, and q and r are in the range of 0.1 to 2.0 and r/q=0.05 to 10, preferably 0.2 to 1.2 and r/q=0.1 to 5.

Examples of these compounds include $SnB_{0.5}P_{0.5}O_3$, $SnAl_{0.3}B_{0.5}P_{0.2}O_{2.7}$, $SnAl_{0.3}B_{0.7}O_{2.5}$, $SnSi_{0.8}P_{0.2}O_{3.1}$, $SnSi_{0.8}B_{0.2}O_{2.9}$, $SnSi_{0.8}Al_{0.2}O_{2.9}$, $SnSi_{0.6}Al_{0.2}B_{0.2}O_{2.8}$, $SnSi_{0.2}Al_{0.2}P_{0.2}O_3$, $SnSi_{0.6}B_{0.2}P_{0.2}O_3$, $SnSi_{0.4}Al_{0.2}B_{0.4}O_{2.7}$, $SnSi_{0.6}Al_{0.1}B_{0.1}P_{0.3}O_{3.25}$, $SnSi_{0.6}Al_{0.1}B_{0.3}P_{0.1}O_{3.06}$, $SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.8}Al_{0.3}B_{0.2}P_{0.2}O_{3.85}$, etc., which are not intended to limit this embodiment.

In this embodiment, there can be provided a non-aqueous secondary battery having excellent charge and discharge cycle property as well as high discharge voltage, high capacity, high stability and excellent rapid charging properties by the use of the compounds described above, mainly as a negative electrode material. In this embodiment, in particular, it is required for obtaining most excellent benefits to use, as a negative electrode material, a compound containing Sn which is present with a valency of two. The valency of Sn can be obtained by a chemical titration procedure, for example, by the method illustrated hereinbefore.

In this embodiment, various compounds can be incorporated in the negative electrode material, for example, compounds of Group 1 elements of Periodic Table (Li, Na, K, Rb, Cs), Group 2 elements of Periodic Table (Be, Mg, Ca, Sr, Ba), transition metals (So, Ti, V, Cr, Mn, Fe, Co, Ni, Cu, Zn, Y, Zr, Nb, Mo, Tc, Ru, Rh, Pd, Ag, Cd, lanthanoids, Hf, Ta, W, Re, Os, Ir, Pt, Au, Hg) and Group 17 elements of Periodic Table (F, Cl, Br, I). Various compounds to increase the electroconductivity, for example, compounds of Sb In and Nb can be incorporated as a dopant, preferably in a proportion of 0 to 20 mole %.

Synthesis of the composite chalcogen compounds and composite oxides in this embodiment can preferably be carried out by a calcining method. To illustrate the calcining method, at least three compounds of Si, Ge, Sn, Pb, P, B, Al, As and Sb are mixed in a predetermined quantity and calcined under the following calcination conditions. The compounds of this embodiment contain indefinite proportion compounds formed during the calcination or valency-differing elements formed by disproportionation.

For the calcination can be used the same conditions as the general calcination conditions of the present invention.

The compounds used in this embodiment have preferably an average grain size of 0.1 to 60 µm, more preferably 1.0 to 30 µm, particularly preferably 2.0 to 20 µm. For obtaining a predetermined grain size can be used well known grinders, pulverizers or classifiers, for example, mortars, ball mills, sand mills, vibration ball mills, satellite ball mills, planet ball mills, jet mills of swirling gas stream type, sieves, etc. For pulverizing, a wet process pulverizing method allowing to be present water or an organic solvent such as methanol, etc. can optionally be applied. Classification is preferably carried out to obtain a desired grain diameter. This classifying method is not limited, but sieves or wind classifiers can also be used as occasion demands. The classification can be carried out by either dry process or wet process.

As shown in Examples, a battery having a high capacity as well as good cycle property can be prepared by using the negative electrode material of this embodiment, containing silicon dioxide with amorphous network structure. However, the battery having such a high capacity tends to meet with troubles, for example, rapid rising of the inner temperature, blowing-out of the contents and breaking of the battery can, since abnormal electric current is flowed by outer short-circuiting due to misuse, e.g. forced discharging, etc. In order to prevent this phenomenon, it has been proposed to fit a safety valve or electric current cutoff element such as PCT to the battery, but substantial resolution of the problem on the heat generation cannot be achieved. In this embodiment, it is preferable for improving the safety to use the above described negative electrode material and a separator described below in combination.

As the separator, there can be used, for example, an insulating microporous or microgaped material having a large ion permeability and a predetermined mechanical strength. For the purpose of further improving the safety, it is neccesary to impart thereto a function of sealing the microgaps at 80° C. or higher to increase the resistance and cutting off electric current. The sealing temperature of these gaps is generally in a range of 90° to 180° C., preferably 110° to 170° C.

Preparation of the gaps, depending on materials employed, can be carried out by any known method. In the case of a porous film, the shape of the pore is ordinarily a circule or oval with a size of 0.05 to 30 µm, preferably 0.1 to 20 µm or may be rod-like or indefinite as in the case of preparing the film by a stretching method or phase separation method. In the case of a cloth, microgaps are those between fibers, depending on how to prepare a woven cloth or non-woven cloth. The ratio of these gaps based on the cloth, i.e. porosity is generally in a range of 20 to 90%, prefrably 35 to 80%.

The separator in this embodiment is generally a microporous film, woven cloth or non-woven cloth with a pore size of 5 to 100 µm, preferably 10 to 80 µm. The separator in this embodiment is generally formed of a polymer containing preferably at least 20 weight %, more preferably at least 30 weight of ethylene component. Other components than ethylene include preferably propylene, butene, hexene, fluoroethylene, vinyl chloride, vinyl acetate, acetalated vinyl alcohol, etc. and above all, propylene and ethylene fluoride are more preferable.

The microporous film preferably consists of polyethylene, ethylene-propylene copolymer or ethylene-butene copolymer. Polymers obtained by mixing and melting polyethylene and polypropylene, or polyethylene and polytetrafluoroethylene are also preferable.

The woven cloth or non-woven cloth is preferably formed of fibrous yarns of polyethylene, ethylene-propylene copolymer, ethylene-butene-1 copolymer, ethylene-methylbutene copolymer, ethylene-methylpentene copolymer, polypropylene or polytetrafluoroethylene, each of the yarns having a diameter of 0.1 to 5 µm.

Each of the separators can be of a single material or composite material, in particular, a laminate of two or more microporous films varying in pore diameter, porosity and sealing temperature of pores, or a composite of materials differing in shape, for example, a microporous film and non-woven cloth, a microporous film and woven cloth, and a non-woven cloth and paper, in combination.

The separator in this embodiment can conatain inorganic fibers such as glass fibers, carbon fibers, etc. and inorganic grains such as silicon dioxide, zeolite, alumina, talc, etc. Furthermore, the gaps or surface can be treated with a surfactant to render it hydrophilic.

The positive electrode and negative electrode used in the non-aqueous secondary battery of this embodiment can be prepared by coating a positive electrode composition or negative electrode composition onto a current collector, i.e. generating member. In the positive electrode composition or negative electrode composition can respectively be incorporated various additives such as conductive agents, binders, dispersing agents, fillers, ionic conductor, pressure intensifiers, etc. in addition to the positive electrode active material or negative electrode material.

The positive electrode active material of this embodiment can be any compound capable of intercalating and deintercalating a light metal ion and particularly can be selected from transition metal oxides and transition metal chalcogenides. In particular, the transition metal oxides are preferably used and those containing lithium are more preferable.

Examples of the transition metal preferably used in this embodiment are Ti, V, Cr, Mn, Fe, Co, Ni, Cu, Nb, Mo and W. Among these transition metal compounds, manganese dioxide, vanadium pentaoxide, iron oxides, molybdenum oxides, molybdenum sulfides, cobalt oxides, iron sulfides, titanium sulfides etc. are preferable. These compounds can be used individually or in combination, and further can also be used as transition metal oxides containing lithium.

Generally, the lithium compound or transition metal compound can be calcined in admixture with a compound capable of increasing the ionic conductivity like $Ca^{2+}$ or an amorphous network-forming agent containing P, B or Si, such as $P_2O_5$, $Li_3P_4$, $H_3BO_3$, $B_2O_3$, $SiO_2$, etc., or with a compound containing at least one of alkali metal ions and alkaline earth metal ions such as Na, K and Mg ions, and Si, Sn, Al, Ga, Ge, Ce, In and Bi. For example, a transition metal oxide containing lithium can be synthesized by calcining a mixture of a lithium compound and transition metal compound.

Specific examples of the positive electrode active material preferably used in this embodiment are described in Japanese Patent Laid-Open Publication No. 5262/1986, U.S. Pat. No. 4,302,518, Japanese Patent Laid-Open Publication Nos. 299056/1988 and 294364/1989, Japanese Patent Publication No. 30146/1992, U.S. Pat. Nos. 5,240,794 and 5,153,081, and Japanese Patent Laid-Open Publication Nos. 328258/1992 and 54889/1993. Typical compounds will be given in the following without limiting the present invention.

$Li_xCoO_2$, $Li_xNiO_2$, $Li_xCO_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$, $Li_xMn_bFe_{1-b}O_z$, $Li_xCo_xB_{1-c}O_2$ wherein x=0.05 to 1.2, a=0.1 to 0.9, b=0.8 to 0.98, c=0.85 to 0.99 and z=1.5 to 5.

The positive electrode active material used in this embodiment can be synthesized by mixing and calcining a lithium compound and transition metal compound or by solution reaction. In particular, the calcination method is preferable.

Details of the calcination method to be employed are described in Japanese Patent Laid-Open Publication No. 60867/1994, Paragraph 0035 and Japanese Patent Laid-Open Publication No. 14579/1995. The positive electrode active material obtained by the calcination is washed with water, acidic aqueous solutions, alkaline aqueous solutions or organic solvents and then used.

Chemical intercalation of lithium ion in a transition metal oxide can be carried out by reacting the transition metal oxide with lithium metal, lithium alloy or butyllithium.

The average grain size of the positive electrode active material used in this embodiment is not particularly limited, but it is preferably 0.1 to 50 μm. It is desired that the volume of grains of 0.5 to 30 μm in diameter is present in a proportion of at least 95%. The specific surface area is not particularly limited, but it is preferably in the range of 0.01 to 50 m²/g measured by the BET method. Herein, it is preferable that when 5 g of the positive electrode active material is charged in 100 ml of distilled water, the supernatant shows a pH of about 7 to 12.

The surface of the positive electrode active material or the negative electrode material can be modified, for example, by treating the surface of a metal oxide with an esterification agent, chelating agent, conductive polymer or polyethylene oxide.

In addition, the surface of the negative electrode material can be modified, for example, by providing it with an ionic conductive polymer or a polyacetylene layer. The positive electrode active material or negative electrode material can be passed through suitable purification steps, e.g. water washing.

To the electrode compositions in this embodiment can be added conductive agents, binders, fillers, dispersing agents, ionic conductor, pressure intensifiers and other various additives, in the similar manner to the first embodiment of the present invention.

The negative electrode material in the third embodiment of the present invention consists of at least one compound selected from chalcogen compounds and oxides containing at least one atom selected from Group 13, 14, 15 and 2 atoms of Periodic Table, which are capable of intercalating and deintercalating lithium and are preferably amorphous, mainly during assembling a battery. "Amorphous" specified herein has the same meaning as defined hereinbefore.

Specific examples of the negative electrode material used in this embodiment include GeO, GeO₂, SnO, SnO₂, PbO, PbO₂, Pb₂O₃, Pb₃O₄, Sb₂O₃, Sb₂O₄, Sb₂O₅, Bi₂O₃, Bi₂O₄, 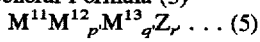, etc. and nonstoichiometric compounds of these oxides. Among them, there are preferably used SnO, SnO₂, GeO and GeO₂ and more preferably SnO and SnO₂. α-PbO structure SnO, rutile structure SnO₂, GeO and rutile structure GeO₂ are most preferably used and α-PbO structure SnO and rutile structure SnO₂ are particularly preferably used.

The above described composite chalcogen compounds and composite oxides are those preferably represented by the following General Formula (5):

General Formula (5)
$M^{11}M^{12}_pM^{13}_qZ_r$ ... (5)

wherein $M^{11}$, $M^{12}$ and $M^{13}$ are different and represent B, Al, Ga, In, Tl, Si, Ge, Sn, Pb, P, As, Sb, Bi and Mg, preferably B, Al, Ga, In, Tl, Si, Ge, Sn, Pb, P, Sb, Bi and Mg, more preferably B, Al, Si, Ge, Sn, P and Mg, most preferably B, Al, Si, Sn, P and Mg, Z is at least one element selected from O, S, Se and Te, preferably O or S, more preferably O, p' and q' are respectively 0 to 3, preferably 0.05 to 2.5, more preferably 0.1 to 2, and r' is 1.00 to 26, preferably 1.1 to 12, more preferably 1.2 to 6.

The valencies of $M^{11}$, $M^{12}$ and $M^{13}$ are not particularly limited, but they may respectively be either a single valency or mixed valency. The ratio of $M^{11}$, $M^{12}$ and $M^{13}$ can continuously be changed in such a manner that $M^{12}$ and $M^{13}$ to $M^{11}$ ratio is in the range of 0.001 to 3 mole equivalents and correspondingly, the quantity of Z [value of r' in General Formula (5)] is continuously changed.

Of the above described compounds, it is particularly preferable in this embodiment where $M^{11}$ is Sn and $M^{12}$ is Si, as represented by the following General Formula (6), General Formula (6)
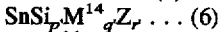

wherein $M^{14}$ is at least one element selected from B, Al, Ga, In, Tl, Ge, Pb, P, As, Sb, Bi and Mg, preferably B, Al, Ga, In, Tl, Ge, Pb, P, Sb, Bi and Mg, more preferably B, Al, Ga, P and Mg, Z is at least one element selected from O, S, Se and Te, preferably O and p', q' and r' represent the same numbers as in General Formula (5).

Preferred compounds in General Formula (6) are those where $M^{14}$ is at least two elements selected from B, Al, Ga, In, Tl, Ge, Pb, P, Sb and Bi, preferably B, Al, Ge and P.

General Formula (6) can more preferably be represented by General Formula (7),

General Formula (7)
$SnSi_pAl_rM^{15}_sO_r$ ... (7)

wherein $M^{15}$ is at least one element selected from B, Ga, In, Tl, Be, Pb, P, Sb, Bi and Mg, preferably B, Al, Ga, P and Mg, s'+t'=q' and p', q' and r' represent the same numerals as in General Formula (5). Particularly preferable compounds in General Formula (7) are as follows:

General Formula (8)
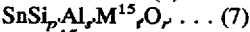

General Formula (9)

General Formula (10)

wherein s'+t'=q', s'+u'+v'=q', s', t', u' and v' respectively represent a numeral of at least 5% of q' and p', q' and r' represent the same numerals as in General Formula (5).

As composite oxides predominantly consisting of oxides, represented by General Formulas (5) to (10), there are given specifically the following compounds without limiting the present invention:

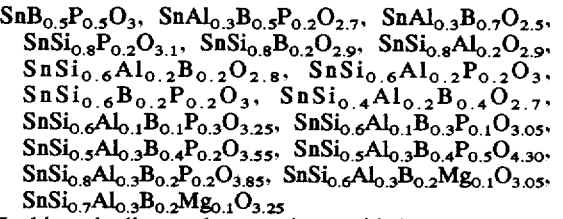

In this embodiment, there can be provided a non-aqueous secondary battery having excellent charge and discharge cycle property as well as high discharge voltage, high capacity, high stability and excellent rapid charging properties by the use of the compounds described above, represented by the General Formula (5) to (10), mainly as a negative electrode material.

In this embodiment, in particular, it is required for obtaining most excellent benefits to use, as a negative electrode material, a compound containing Sn which is present with a valency of two. The valency of Sn can be obtained by a chemical titration procedure, for example, by the method illustrated hereinbefore.

In this embodiment, various compounds can be incorporated in the negative electrode material, for example, compounds of Group 1 elements of Periodic Table (Li, Na, K, Rb, Cs), Group 2 elements of Periodic Table (Be, Mg, Ca, Sr, Ba), transition metals (Sc, Ti, V, Cr, Mn, Fe, Co, Ni, Cu, Zn, Y, Zr, Nb, Mo, Tc, Ru, Rh, Pd, Ag, Cd, lanthanoids, Hf, Ta, W, Re, Os, Ir, Pt, Au, Hg) and Group 17 elements of Periodic Table (F, Cl, Br, I). Various compounds to increase the electroconductivity, for example, compounds of Sb, In and Nb can be incorporated as a dopant, preferably in a proportion of 0 to 20 mole %.

Synthesis of the composite chalcogen compounds and composite oxides represented by General Formulas (5) to (10) in this embodiment can preferably be carried out by any one of calcining methods and solution methods. To illustrate the calcining method in detail, for example, $M^{11}$, $M^{12}$ and $M^{13}$ compounds ($M^{11}$, $M^{12}$ and $M^{13}$ are different and represent Si, Ga, Sn, Pb, P, B, Al, As, Sb, Ga, In, Tl, Bi and Mg) are mixed in predetermined amounts and calcined under the calcination conditions as described hereinafter. The compound in this embodiment further includes indefinite proportion compounds formed during the calcination and valency-differing elements formed by disproportionation.

The Sn compound includes, for example, SnO, $SnO_2$, $Sn_2O_3$, $Sn_3O_4$, $Sn_7O_{13} \cdot H_2O$, $Sn_8O_{15}$, stannous hydroxide, stannic oxyhydroxide, stannic acid, stannous oxalate, stannous phosphate, orthostannic acid, metastannic acid, parastannic acid, stannous fluoride, stannic fluoride, stannous chloride, stannic chloride, stannous bromide, stannic bromide, stannous iodide, stannic iodide, tin selenide, tin telluride, stannous pyrophosphate, tin phosphide, stannous sulfide, stannic sulfide and the like.

The Si compound includes, for example, $SiO_2$, SiO, silicon tetrachloride, silicon tetrabromide, halogenated organo silicon compounds such as trichloromethylsilane, dimethyldichlorosilane, trimethylchlorosilane, etc., organo silicon compounds such as tetramethylsilane, tetraethylsilane, etc., alkoxy silane compounds such as tetramethoxysilane, tetraethoxysilane, etc., hydrosilane compounds such as trichlorohydrosilane, etc.

The Ge compound includes, for example, $GeO_2$, GeO, germanium tetrachloride, germanium tetrabromide and alkoxy germanium compounds such as germanium tetramethoxide, germanium tetraethoxide, etc.

The Pb compound includes, for example, $PbO_2$, PbO, $Pb_2O_3$, $Pb_3O_4$, $PbCl_2$, lead chlorate, lead perchlorate, lead nitrate, lead carbonate, lead formate, lead acetate, lead tetraacetate, lead tartrate, lead diethoxide, lead di(isopropoxide), etc.

The P compound includes, for example, phosphorus pentaoxide, phosphorus oxychloride, phosphorus pentachloride, phosphorus trichloride, phosphorus tribromide, trimethylphosphoric acid, triethylphosphoric acid, tripropylphosphoric acid, stannous pyrophosphate, boron phosphate, etc.

The B compound includes, for example, boron sesquioxide, boron trichloride, boron tribromide, boron carbide, boric acid, trimethyl borate, triethyl borate, tripropyl borate, tributyl borate, boron phosphide, boron phosphate, etc.

The Al compound includes, for example, aluminum oxide (α-alumina, β-alumina), aluminum silicate, aluminum tri-iso-propoxide, aluminum tellulite, aluminum chloride, aluminum boride, aluminum phosphide, aluminum phosphate, aluminum lactate, aluminum borate, aluminum sulfide, aluminum sulfate, aluminum boride, etc.

The Sb compound includes, for example, antimony tribromide, antimony trichloride, antimony sesquioxide, triphenylantimony, etc.

The As compound includes, for example, $AsCl_3$, $As_2O_3$, etc.

The Ga compound includes, for example, $GaCl_3$, $Ga(NO_3)_3$, $Ga_2O_3$, etc.

The In compound includes, for example, $InCl_3$, $In_2O_3$, etc.

The Bi compound includes, for example, $BiCl_3$, $Bi_2O_3$, $Bi(NO_3)_3$, etc.

The Mg compound includes, for example, $MgBr_2$, $MgCl_2$, $Mg(OC_2H_5)_2$, MgO, $MgSO_4$, $Mg(PO_4)_2$, $Mg(NO_3)_2$, etc.

As compounds of other elements, there are given oxides, hydroxides, carbonates, phosphates, sulfates, nitrates, halides, sulfides, nitrides, carbides, aluminum compounds thereof, etc.

For the calcination can be used the same conditions as the general calcination conditions of the present invention. The negative electrode material of this embodiment can be of a crystalline material, amorphous material or mixture thereof, but the amorphous material is desirable from the standpoint of improving the cycle property.

The compounds represented by General Formulas (5) to (10), used in this embodiment, have preferably an average grain size of 0.1 to 60 μm, more preferably 1.0 to 30 μm, particularly preferably 2.0 to 20 μm. For obtaining a predetermined grain size can be used well known grinders, pulverizers or classifiers, for example, mortars, ball mills, sand mills, vibration ball mills, satellite ball mills, planet ball mills, jet mills of swirling gas stream type, sieves, etc. For pulverizing, a wet process pulverizing method allowing to be present water or an organic solvent such as methanol, etc. can optionally be applied. Classification is preferably carried out to obtain a desired grain diameter. This classifying method is not limited, but sieves or wind classifiers can also be used as occasion demands. The classification can be carried out by either dry process or wet process.

The true density of the negative electrode material of this embodiment is preferably in a range of $2.5<\rho<7.5$, more preferably $2.8<\rho<7.0$, most preferably $3.0<\rho<6.0$. Measurement of the true density is preferably carried out by an ordinary pressure reducing method (solvent water). As the measurement method of the true density, there are two methods, i.e. (1) liquid phase replacement method and (2) gaseous phase replacement method. The liquid phase replacement method includes a picnometry method, buoyancy method, Le Chatelier picnometry method, Beckmann method, etc.

The value ρ of the negative electrode material of this embodiment can be controlled by selecting the atomic composition of Group 13, 14, 15 and 2 elements of Periodic Table. If the value ρ is smaller than 2.5, the energy density per volume is decreased, which should be avoided, while if larger than 7.5, the cycle property is deteriorated.

It is preferable from the standpoint of improving the battery capacity to subject the negative electrode material of this embodiment to a heat treatment at a temperature of ranging from 100° to 600° C. before composing it as an electrode composition. The atmosphere for this heat treatment can be chosen from the air, inert gas atmospheres (e.g.

argon gas, nitrogen gas, helium gas, etc.), active gas atmospheres such as oxygen gas, hydrogen gas, etc. and pressure or reduced pressure atmospheres. Preferably, the air, inert gas atmospheres and reduced pressure atmospheres are used. "Before composing as an electrode composition" specified herein means "before mixing with, for example, binders or electroconductive agents," namely, the heat treatment with only a negative electrode active material.

In this embodiment, it is possible to employ a method of intercalating lithium in chemical or electrochemical manner before charging the negative electrode material in a battery can. The method of intercalating lithium in chemical manner comprises directly reacting a negative electrode material with lithium metal, lithium alloy (lithium-aluminum alloy, etc.) or lithium compound (n-butyllithium, lithium hydride, lithium aluminum hydride, etc.). In this case, the negative electrode material and lithium-incorporating material can be reacted by directly reacting only the both or by reacting them in the presence of an anhydrous solvent such as dimethoxyethane, tetrahydrofuran, ethylene carbonate, diethyl carbonate, etc. or an electrotic solution having a supporting salt such as $LiPF_6$, etc. dissolved in the above described anhydrous solvent. As a preferable embodiment in this case, for example, a negative electrode material powder and lithium metal powder are blended directly or in the presence of an electrotic solution to intercalate lithium in the negative electrode material or shaping a negative electrode material in a sheet and then pressure-bonding it with a lithium metal sheet in the presence of an electrotic solution. Furthermore, another method comprising immersing a negative electrode material powder or sheet in a solution of n-butyllithium and thus intercalating lithium can also preferably be used. In the chemical method, it is preferred to intercalate lithium more effectively by effecting the lithium-intercalating reaction at a temperature of about 25° to 80° C., preferably 30° to 75° C., more preferably 30° to 70° C.

As a method of intercalating lithium in electrochemical manner, it is most preferable to subject to discharging an oxidation and reduction system comprising an object oxide (i.e. referred to negative electrode material in this embodiment) as a positive electrode material, lithium metal or lithium alloy (lithium-aluminum alloys, etc.) as a negative electrode material and a non-aqueous electrolyte containing a lithium salt, in opened system. In this case, it is preferable to pass 0.02 to 0.2 A of electric current per 1 g of the oxide as a precursor, more preferably 0.03 to 0.15 A, particularly preferably 0.04 to 0.12 A. Another embodiment in the method of intercalating lithium in electrochemical manner comprises charging an oxidation and reduction system comprising a lithium-containing transition metal oxide as a positive electrode active material, negative electrode material and non-aqueous electrolyte containing a lithium salt.

The intercalating amount of lithium is dependent on the variety of a negative electrode material used and it is preferably in a range of 0.5 to 7 equivalents to the negative electrode material, more preferably 1 to 6.5 equivalents, most preferably 2 to 6 equivalents. "Before charging the negative electrode material in a battery can" specified in the present embodiment means a range of directly before charging to about 30 days before charging, preferably directly before to ten days before, most preferably directly before to five days before. By "charging" in this case is meant assembling a battery by charging battery constituting elements in a battery can, followed by caulking.

As the positive electrode active material used in this embodiment, there can be given transition metal oxides capable of reversibly intercalating and deintercalating lithium ion, preferably lithium-containing transition metal oxides.

Examples of the positive electrode active material of a lithium-free transition metal oxide used in this embodiment are $V_2O_5$, $V_6O_{13}$, $MnO_2$, $TiS_2$, $MoS_2$, $MoS_3$, $MoV_2O_8$, $NbSe_3$, etc. Preferable examples of the positive electrode active material of a lithium-containing transition metal oxide used in this embodiment are lithium-containing oxides of Ti, V, Cr, Mn, Fe, Co, Ni, Cu, Mo and W. Alkali metals other than lithium (Group 1 and 2 metals of Periodic Taqble) or submetals such as Al, Ga, In, Ge, Sn, Pb, Sb and Bi can be added in a proportion of 0 to 10 mole %.

More preferable examples of the positive electrode active material of a lithium-containing transition metal oxide used in this embodiment can preferably be synthesized by mixing the raw materials to give a lithium compound/sum of transition metal oxides (where the transition metal is at least one metal selected from Ti, V, Cr, Mn, Fe, Co, Ni, Mo and W) mole ratio of 0.3 to 2.2.

Particularly preferable examples of the positive electrode active material of a lithium-containing transition metal oxide used in this embodiment can prepreferably be synthesized by mixing the raw materials to give a lithium compound/sum of transition metal oxides (where the transition metal is at least one metal selected from V, Cr, Mn, Fe, Co and Ni) mole ratio of 0.3 to 2.2.

Particularly preferable examples of the positive electrode active material of a lithium-containing transition metal oxide used in this embodiment are preferably those represented by $Li_xMO_z$ wherein M=transition metal containing at least one metal selected from Co, Mn, Ni, V and Fe, x=0.3 to 1.2 and z=1.4 to 3.

Further preferable examples of the positive electrode active material of a lithium-containing metal oxide used in this embodiment are preferably those represented by $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xMn_cFe_{2-c}O_4$, mixtures of $Li_xMn_2O_4$ and $MnO_2$, mixtures of $Li_{2x}MnO_3$ and $MnO_2$ and mixtures of $Li_xMn_2O_4$, $Li_{2x}MnO_3$ and $MnO_2$, wherein x=0.6 to 1.2, a=0.1 to 0.9, b=0.8 to 0.98, c=1.6 to 1.96 and z=2.01 to 5.

Further preferable examples of the positive electrode active material of a lithium-containing metal oxide used in this embodiment are preferably those represented by $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$ and $Li_xMn_cFe_{2-c}O_4$, wherein x=0.7 to 1.04, a=0.1 to 0.9, b=0.8 to 0.98, c=1.6 to 1.96 and z=2.01 to 2.3.

Most preferable examples of the positive electrode active material of a lithium-containing transition metal oxide used in this embodiment are preferably those represented by $Li_xCoO_2$, $Li_xNiO_2$, $Li_xCo_aNi_{1-a}O_2$, $Li_xMn_2O_4$ and $Li_xCo_bV_{1-b}O_z$, wherein x=0.7 to 1.1, a=0.1 to 0.9, b=0.9 to 0.98, and z=2.01 to 2.3.

Most preferable examples of the positive electrode active material of a lithium-containing transition metal oxide used in this embodiment are preferably those represented by $Li_xCoO_2$, $Li_xNiO_2$, $Li_xCo_aNi_{1-a}O_2$, $Li_xMn_2O_4$ and $Li_xCo_bV_{1-b}O_z$, wherein x=0.7 to 1.04, a=0.1 to 0.9, b=0.9 to 0.98, and z=2.02 to 2.3.

Herein, the above described value of x is one before start of charging and discharging and is increased or decreased by chargeing and discharging.

For the synthesis of the positive electrode active material of this embodiment, chemical intercalation of lithium ion in a transition metal oxide is preferably carried out by reacting lithium metal, lithium alloy or butyllithium with a transition metal oxide.

The positive electrode active material can be synthesized by mixing and calcining a lithium compound and transition metal compound or subjecting them to solution reaction and in particularly, the calcination method is preferable. The calcination temperature employed in this embodiment can suitably be adjusted to a temperature at which a part of the mixed compounds, used in this embodiment, is decomposed and melted, for example, 250° to 2000° C., preferably 350° to 1500° C.

The atmosphere for the calcination in this embodiment is not particularly limited, but the calcination is preferably carried out in the air or an oxygen-enriched gas (e.g. at least about 30%), in the case of the positive electrode active material, while it is preferably carried out in the air, an oxygen-lean gas (e.g. at most about 10%) or an inert gas (nitrogen gas, argon gas) in the case of the negative electrode active material.

The average grain size of the positive electrode active material used in this embodiment is not particularly limited, but it is preferably 0.1 to 50 µm. For obtaining a predetermined grain size can be used the foregoing grinders or classifiers, for example, mortars, ball mills, vibration ball mills, satellite ball mills and jet mills of swirling gas stream type, as the grinder, and cyclones and sieves, as the classifier.

The negative electrode active material which can jointly be used in this embodiment includes, for example, lithium metal, lithium alloys (Al, AL—Mn, Al—Mg, Al—Sn, Al—In, Al—Cd) and calcined carbonaceous materials capable of intercalating and deintercalating lithium metal or lithium ion. The purpose of jointly using lithium metal or lithium alloy, as described above, is to effect the intercalation of lithium in a battery and not to utilize a dissolving-depositing reaction of lithium metal, as the battery reaction.

To the electrode composition can be added electroconductive agents, binders, fillers, etc.

The electroconductive agent can be selected from electroconductive materials causing no chemical change in an assemled battery, for example, natural graphites (crystalline graphite, scale-shaped graphite, etc.), artificial graphites, carbon black, acetylene black, Ketchen black, carbon fibers, metallic powders (copper, nickel, aluminum, silver, etc.), metallic fibers and polypheny lene derivatives, individually or in combination. Particularly, joint use of graphite and acetylene black is preferable.

The amount of the conductive agent is not particularly limited, but it is preferably 1 to 50 weight %, more preferably 2 to 30 weight %. Carbons or graphites are preferably used in a proportion of 2 to 15 weight %.

As the binder in this embodiment, there can generally be used polysaccharides, thermoplastic resins and polymers having rubber elasticity such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene-terpolymers (EPDM), sulfonated EPDM, styrenebutadiene rubbers, polybutadiene, fluorine rubbers, polyethylene oxide, etc, individually or in combination. When using a compound having a functional group reactive with lithium, such as polysaccharides, it is preferable to add, for example, a compound having isocyanate group to inactivate the functional group. The amount of the binder to be added is not particularly limited, but it is preferably 1 to 50 weight %, more preferably 2 to 30 weight %.

As the filler, there can be used any fibrous materials causing no chemical change in an assembled battery, for example, fibers of olefinic polymers such as polypropylene, polyethylene, etc., glass, carbon, etc. The amount of the filler to be added is not particularly limited, but it is preferably 0 to 30 weight %.

The electrolyte is generally composed of a solvent and a lithium salt (anion and lithium cation) soluble therein. Examples of the solvent include aprotic organic solvents such as propylene carbonate, ethylene carbonate, butylene carbonate, dimethyl carbonate, diethyl carbonate, methylethyl carbonate, γ-butyrolactone, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, methyl formate, methyl acetate, methyl propionate, ethyl propionate, phosphoric acid triesters, trimethoxymethane, dioxolan derivatives, sulforan, 3-methyl-2-oxazolidinone, propylene carbonate derivatives, tetrahydrofuran derivatives, diethyl ether, 1,3-propanesultone, etc. They can be used individually or in combination. Examples of the lithium salt soluble in these solvents are $LiClO_4$, $LiBF_4$, $LiPF_6$, $LiCF_3SO_3$, $LiCF_3CO_2$, $LiAsF_6$, $LiSbF_8$, $LiB_{10}CL_{10}$, lithium lower aliphatic carboxylate, $LiAlCl_4$, LiCl, LiBr, LiI, chloroborane lithium, lithium tetraphenylborate, etc., which can be used individually or in combination. Above all, it is preferable to use an electrolyte comprising an electrolytic solution of a mixture of at least one of propylene carbonate, ethylene carbonate and butylene carbonate with at least one of 1,2-dimethoxyethane, diethyl carbonate and methyl propionate, in which at least one of $LiCF_3SO_3$, $LiClO_4$, $LiBF_4$ and $LiPF_6$ is incorporated. In particular, it is preferable to incorporate at least ethylene carbonate and $LiPF_6$.

The quantity of the electrolyte added to a battery is not particularly limited, but it can suitably be used depending on the quantities of a positive electrode active material or negative electrode material and the size of the battery.

The volume ratio of the solvent is not particularly limited, but preferably, at least one of propylene carbonate, ethylene carbonate and butylene carbonate is mixed with 1,2-dimethoxyethane and/or diethyl carbonate in a proption of 0.4/0.6 to 0.6/0.4 (the former/the latter).

The concentration of the supporting electrolyte is not limited, but it is preferably 0.2 to 3 moles per 1 liter of the electrolyte.

In addition to the electrolytic solution, a solid electrolyte can also be used, specific examples of which are described in the first embodiment.

As the separator, there can be used, for example, an insulating thin film having a large ion permeability and a predetermined mechanical strength. From the standpoint of organic solvent resistance and hydrophobic property, it is preferable to use a sheet or nonwoven cloth formed of an olefinic polymer such as polypropylene or polyethylene or glass fibers. The pore diameter of the separator can be in the commonly used range as a separator for a battery, for example, 0.01 to 10 µm. The thickness of the separator can also be in the commonly used range as a separator for a battery, for example, 5 to 300 µm, preferably 5 to 150 µm, more preferably 10 to 100 µm, most preferably 15 to 60 µm.

It is known that other compounds are added to an electrolyte in a battery so as to improve the discharge property or the charge and discharge property, illustrative of which are those mentioned in the first embodiment.

In order to render an electrolytic solution noncombustible, various materials can be added thereto in the same manner as mentioned in the first embodiment.

In this embodiment, the surface of the positive electrode active material can be modified, for example, by treating the surface of a metal oxide with an esterification agent, chelating agent, electroconductive polymer, polyethylene oxide, etc. The surface of the negative electrode active material can also be modified, for example, by providing it with a layer of ionic conductive polymer or polyacetylene or by treating it with LiCl.

As the generating member or current collector of the electrode active materials, there can be used an electroconductive material causing no chemical change in an assembled battery. Specific examples thereof are shown in the first embodiment.

In the present invention, in general, the shape of the battery can be any one of coins, buttons, sheets, cyclinders, flat or squared bodies. When the shape of the battery is of a coin or button, a composition for the positive active material or negative electrode material is mainly used after compacted in a pellet shape. The thickness and diameter of the pellet is determined depending on the size of the battery. When the shape of the battery is of a sheet, cylinder or square, a composition for the positive active material or negative electrode material is mainly used after coating it onto the current collector, followed by drying and compacting. For the coating, general methods can be used, for example, reverse roll method, direct roll method, blade method, knife method, extrusion method, curtain method, gravure method, bar method, dipping method and squeezing method. Above all, the blade method, knife method and extrusion method are preferable. The coating is preferably carried out at a rate of 0.1 to 100 m/min, during which a suitable method is chosen from the above described coating methods in line with the solution property and drying property of the electrode composition to obtain a good surface state on the coating layer.

Both the surfaces of the current collector can be coated simultaneously or one by one. The coating is carried out continuously or intermittently, or can be carried out in such a manner as to give stripes. The thickness, length and width of the coating layer are determined according to the size of the battery and the thickness of coating layer, on one side, is particularly preferably in a range of 1 to 2000 µm on dried and compacted state.

Drying or dehydrating of the pellet or sheet can be carried out by any one of the commonly used methods, in particular, by the use of hot air, vacuum, infrared rays, far-infrared rays, electron beam and low humidity winds, individually or in combination. The temperature is preferably in a range of 80° to 350° C., more preferably 100° to 250° C. The water content is preferably at most 2000 ppm based on the whole of the battery and preferably at most 500 ppmm respectively based on each of the positive electrode composition, negative electrode composition and electrolyte, from the standpoint of the cycle property. Compacting of the pellet or sheet can be carried out by the commonly used method, preferably using a metallic mold or calender. The compressing pressure is not particularly limited, but it is preferably 0.2 to 3 tons/cm$^2$. It is preferable to adjust the compressing rate and temperature in the calender press method respectively to 0.1 to 50 m/min and room temperature to 200° C. The ratio of the negative electrode sheet to positive electrode sheet is in a range of preferably 0.9 to 1.1, more preferably 0.95 to 1.0. The ratio of the contents of the positive electrode active material and negative electrode material, depending on the varieties of the compounds and formulations of the compositions, cannot be limited, but can be optimized in view of the capacity, cycle life ans safety of the battery.

In the present invention, for example, composition sheets are superimposed one upon the other through a separator, wound or bent and charged in a can. After electrically connecting the can and sheet, an electrolytic solution is poured therein and a battery is formed using a sealing plate. During the same time, a safety valve can be used as the sealing plate. In addition to the safety valve, various safety elements known in the art can be fitted to the battery. For example, as overcurrent-proof elements, there can be used a fuse, bimetal, PTC element, etc. In addition to the use of the safety valve, it is possible to utilize a method of providing the battery can with cuts, method of cracking a gasket, method of cracking a sealing plate or method of cutting a lead plate, as a countermeasure for rising of the inner pressure in the battery can. Furthermore, it is proposed to provide charge means with a protective circuit having a countermeasure for overcharge or overdischarge incorporated therein or to connect them independently. As a counter measure for overcharge, a system for cutting off electric current with rising of the inner pressure in the battery can be provided, during which a compound capable of increasing the inner pressure can be incorporated in the composition or electrolyte. Examples of the compound used for raising the inner pressure include carbonates such as $Li_2CO_3$, $LiHCO_3$, $Na_2CO_3$, $NaHCO_3$, $CaCO_3$, $MgCO_3$, etc.

The can or lead plate can be formed of a metal or alloy with electroconductivity, for example, iron, nieckel, titanium, chromium, molybdenum, copper, aluminum or alloys thereof. Welding of a cap, can, sheet and lead plate can be conducted using a known method (e.g. electric welding of direct current or alternating current, laser welding, ultrasonic wave welding). As a sealing agent for closing, there can be used known compounds or mixtures in the art, for example, asphalt.

Uses of the non-aqueous secondary battery according to the present invention are not particularly limited, but these uses can be exemplified by articles for electronic instruments, e.g. color note personal computers, white and black note personal computers, subnote personal computers, pen input personal computers, pocket (palm top) personal computers, note type word processors, pocket word processors, electronic book players, pocket telephones, cordless phone receivers, pagers, handy terminals, portable facsimile, portable copiers, portable printers, stereo headphones, video movies, liquid crystal televisions, handy cleaners, portable CD, minidisks, electric shavers, electronic translators, car telephones, transceivers, electric tools, electronic notes, pocket computers, memory cards, tape recorders, radios, backup electric sources, etc. Uses thereof for people's livelihood are cars, electric cars, motors, illuminating devices, toys, game machines, road conditioners, irons, clocks, stroboscopes, cameras, medical instruments (pace makers, hearing aids, shoulder massagers), etc. Moreover, it can be applied to various war supplies, space materials, etc., and can further be used in combination with other secondary batteries, solar cells, primary cells, etc.

In preferred combinations of the present invention, the foregoing chemical materials or battery-assembling parts are preferably combined and in particular, it is preferable to use, as an amorphous negative electrode material, $SnO.SiO_2$, $SnO.0.6SiO_2.0.1Al_2O_3.0.4B_2O_3.0.3P_2O_5$, $SnO.0.5SiO_2.0.3P_2O_5.0.2B_2O_3$, $SnO.0.5P_2O_5.0.2Al_2O_3.0.2B_2O_3.0.1MgO$, $SnO.0.5P_2O_5.0.2Al_{2o3}.0.2B_2O_3.0.1F$, etc., which has been subjected to a heat treatment in a hydrogen atmosphere. The positive electrode active material includes at least one compound selected from the group consisting of $Li_xCoO_2$, $Li_xNiO_2$, $Li_xMnO_2$ and $Li_xMn_2O_4$, wherein x=0.05 to 1.2, with acetylene black as a conductive agent. The positive current collector has a shape of net, sheet, foil, lath, etc. of stainless steel or aluminum and the negative electrode current collector has a shape of net, sheet, foil, lath, etc. of stainless steel or copper. To a composition to be used with the positive electrode active material or negative electrode material can be added carbonaceous materials such as acetylene black, graphite, etc. as an electroconductive agent. As the binder, there can be used fluorine-containing plastic compounds such as polyvinylidene fluoride, polyfluoroethylene, etc., polymers containing acrylic acid, elastomers such as styrene-butadiene rubbers, ethylenepropylene terpolymers, individually or in combination.

As the electrolyte, there are preferably used combinations of ethylene carbonate with cyclic carbonates, non-cyclic carbonates such as diethyl carbonate, dimethyl carbonates and ester compounds such as ethyl acetate, to which $LiPF_6$ is added as a supporting electrolyte further with a lithium salt such as $LiBF_4$, $LiCF_3SO_3$, etc.

In the present invention, the electrolytic solution can all be poured by one batch, but it is preferable to pour separately it in at least two stages. When separately pouring in at least two stages, the electrolytic solutions to be poured can have a same composition or different compositions. In the latter case, for example, a non-aqueous solvent or a solution of a lithium salt dissolved in a non-aqueous solvent is poured and then, another non-aqueous solvent having a higher viscosity than the above described solvent or a solution of a lithium salt dissolved in a non-aqueous solvent is poured. In order to shorten the time for pouring the electrolytic solution, the battery can is evacuated to a pressure of preferably 500 to 1 Torr, more preferably 400 to 10 Torr or a centrifugal force or ultrasonic wave is applied thereto.

The cutoff voltage of a charge and discharge cycle is dependent on the varieties or combinations of the positive electrode active material and the negative electrode material used and cannot specifically be defined, but it is preferably adjusted to such a voltage that the discharge voltage can be raised and the cycle life can substantially be maintained.

The bottomed battery armoring can used in the present invention is generally formed of a material, for example, nickel-plated iron or steel plate, stainless steel plate (SUS 304, SUS 304L, SUS 304N, SUS 316, SUS 316L, SUS 430, SUS 444, etc.), nickel-plated stainless steel plate (same as described above) aluminum or its alloy, nickel, titanium or copper in the form of a true circular case, oval case, square case or rectangular case. In particular, when the armoring can additionally acts as a negative electrode terminal, stainless steel plate or nickel-plated iron or steel plate is preferable, and when the armoring can additionally acts as a positive electrode terminal, stainless steel plate or aluminum or its alloy is preferable.

The gasket used in the present invention is generally formed of a material, for example, olefinic polymer, fluoro type polymer, cellulose type polymer, polyimide or polyamide and the olefinic polymer, in particular, a polymer predominantly consisting of propylene is preferred in view of the organic solvent resistance and low moisture permeability. Moreover, block copolymers of propylene and ethylene are preferably used.

In the present invention, the battery is optionally coated with an armoring material. This armoring material includes, for example, heat-shrinkable tubes, adhesive tapes, metallic films, papers, cloths, paints, plastic cases, etc., a part of which can be provided with a thermally-discolorable area to indicate a thermal hysteresis during using.

One or more of the battery of the present invention are assembled in series and/or in parallel in a battery pack. This battery pack can be provided with safety elements such as a positive temperature coefficient resistor, temperature fuse, fuse and/or current cutoff element, and further with a safety circuit (e.g. having a function of monitoring the voltage, temperature and electric current of each battery and/or assembled batteries and optionally cutting off electric current). In addition, the battery pack can be provided with, in addition to the positive and negative terminals of whole of the assembled batteries, positive and negative terminals of each battery, temperature detecting elements of whole of the assembled batteries and each battery and current detecting terminals of whole of the assembled batteries, as outer terminals. A voltage converting circuit (DC—DC converter, etc) can also be built-in the battery pack. Connection of each of the batteries can be carried out by welding a lead plate or by fixing removably using a socket. Further, the battery pack can be provided with an indication means of residual capacity, presence or absence of charging, number of uses, etc.

In the fourth embodiment of the present invention, there is provided a closed type non-aqueous secondary battery in which when the inner pressure of a battery is increased, the central projection part of an explosion-proof valve reacts with an electric current cutoff element to cutoff the electric connection of a terminal cap and positive electrode or negative electrode and when the inner pressure of the battery is further increased, the groove-shaped thin wall parts of the explosion-proof valve are broken to release the inner gas. In this non-aqueous secondary battery having the specified structure, in particular, the specified negative electrode material can preferably be used according to the present invention including the first to third preferable embodiments.

The explosion-proof valve used in this embodiment consists of a material, for example, selected from stainless steels, aluminum or alloys thereof, in particular, aluminum of JIS No. 1000 series, 3000 series or 5000 series, when the closing member additionally acts as a positive electrode terminal. Preferably, the valve has a thickness of 0.2 to 1 mm, in particular, the thickness of the outer circumference and projected flat area being 0.2 to 0.5 mm.

The projection quantity and projection outer diameter of the projected flat area are varied with the size of the battery, but generally has such a dimension that the ratio of the projection quantity to the projection outer diameter is preferably 0.03 to 0.3, more preferably 0.05 to 0.15. The central projection part of the projected flat area has preferably such a dimension that the ratio of the height thereof to the projection quantity of the the projected flat area is preferably 0.5 to 1.2, more preferably 0.7 to 1, the outer diameter being preferably 1 to 4 mm, more preferably 1.5 to 2.5 mm.

Figure 21:
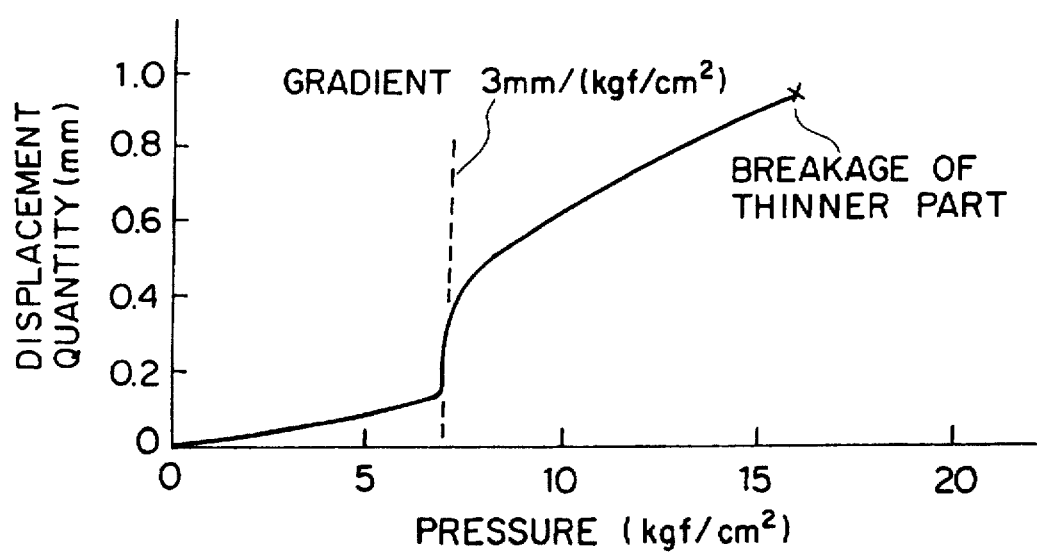
FIG. 21 is a characteristic curve of a displacement quantity vs a pressure, of one embodiment of an explosion-proof valve in a non-aqueous secondary battery of a closed type (Battery 9-B) according to the present invention.

The explosion-proof valve used in this embodiment is preferably one showing a characteristic curve of displacement change for rising of the inner pressure, approximately, in the form of S type. At the initial period of rising of the inner pressure, in particular, the gradient is preferably 0.005 to 0.05 mm/($kgf/cm^2$), more preferably 0.01 to 0.03 mm/($kgf/cm^2$). In a zone in which after the above described deformation, the displacement quantity is increased for rising of the inner pressure, the gradient is preferably at least 1 mm/($kgf/cm^2$), more preferably at least 2 mm/($kgf/cm^2$), while in another zone in which after the above described deformation, the gradient is decreased, the gradient is preferably 0.02 to 0.15 mm/($kgf/cm^2$), more preferably 0.03 to 0.08 mm/($kgf/cm^2$), as shown in FIG. 21.

The thickness of thin wall part formed in the flat area of the projection part is preferably in a range of at least 0.05 mm to at most ⅔ of that of the projected flat area, in particular, ½ of the thickness of the projected flat area. The width thereof is preferably at most 2 mm, more particularly at most 0.5 mm. Furthermore, groove-shaped thin wall parts are preferably formed at least in circumferential form. In this case, the diameter of central circumference of the groove width is preferably 1/10 to 2/3, more preferably 1/5 to 1/2 of the outer diameter of the projectd flat area.

The explosion-proof valve used in this embodiment is preferably worked in such a manner that the side wall of the recess part between the outer circumference of the dish-shaped valve and projected flat area is hardly deformed, and in particular, the side wall of the recess part is worked to give a cross-section of substantial Z type and to give a larger thickness than that of the outer circumference and projected flat area by a forging working. In the case of the above described forging working, the thickness of the side wall of the recess part is at least 1.5 times as large as that of the projected flat area.

The electric current cutoff element used in this embodiment can be formed of such a structure that the element is physically connected under normal state to give continuity, physically separated under operation state to cutoff the electric connection and not returned to the original state. Specifically, the electric current cutoff element is (1) of a contact type as a continuity form such that the contacted part is separated during operating, (2) of a welded type as a continuity form such that the welded part is broken or separated, (3) of a caulking type as a continuity form such that the caulked part is broken during operating or (4) composed of a plate-shaped, rod-shaped or foamed body as a continuity part so that the continuity part is broken during operating. In particular, a pressure contact type using a plate spring or normal spring, a welded or caulked type using a plate spring aaprt of which is connected by welding or caulking or a thin thickness lead type to readily be cut are preferably used. In addition to the above described devices, a positive temperature coefficient resistance element (hereinafter referred to as PTC) is preferably arranged by laminating.

In this embodiment, the light metal means an element belonging to Group 1 (except hydrogen) and Group 2 of Periodic Table, preferably lithium, sodium or potassium, more preferably lithium.

The active material in a positive electrode used in this embodiment can be selected from materials capable of intercalating and deintercalating a light metal, preferably lithium-containing transition metal oxides, more preferably $Li_xCoO_2$, $Li_xNiO_2$, $Li_xCo_aNi_{1-a}O_z$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$ and $Li_xMn_bFe_{1-b}O_z$,
wherein x=0.05 to 1.2, a=0.1 to 0.9, b=0.8 to 0.98 and z=1.5 to 5.

The active material in a negative electrode used in this embodiment can be selected from materials capable of intercalating and deintercalating a light metal, preferably graphite (natural graphite, artificial graphite, gaseous phase grown graphite), coke (coal type or petroleum type), organo polymer calcined products (resins or fibers of polyacrylonitrile, furan resins, cresol resins, phenol resins), mesophase pitch calcined products, metal oxides, lithium-containing transition metal oxides, more preferably GeO, $GeO_2$, SnO, $SnO_2$, $SnSiO_3$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, $Bi_2O_5$, $Li_2SiO_3$, $Li_4Si_2O_7$, $Li_2Si_3O_7$, $Li_2Si_2O_5$, $LiSiO_6$, $Li_6Si_2O_7$, $Li_2GeO_3$, $Li_4GeO_4$, $Li_8GeO_8$, $Li_2SnO_3$, $Li_8SnO_8$, $LiPbO_3$, $Li_2PbO_3$, $Li_4PbO_4$, $LiBiO_2$, $Li_3BiO_4$, $Li_5BiO_5$, $LiSbO_4$, $Li_3SbO_4$, $Li_2ZnO_2$, $Li_3InO_3$, $Li_2ZnSn_2O_6$, $Li_{0.1}SnO_{2.05}$, $Li_{0.5}SnO_{2.25}$, $Li_4SnO_4$, $Li_6SnO_5$, $Li_8SnO_6$, $Li_2SnO_2$, $Li_{0.1}SnO_{1.05}$, $Li_{0.5}SnO_{1.25}$, $LiSnO_{2.5}$, $Li_8SnO_5$, $LiMgSn_2O_7$, $Li_2MgSn_2O_5$, $SnSi_{0.01}O_{1.02}$, $SnP_{0.01}O_{1.03}$, $SnB_{0.3}O_{1.45}$, $SnSi_{0.7}P_{0.3}O_{2.75}$, $SnSi_{0.7}Ge_{0.1}P_{0.2}O_{3.1}$, $SnSi_{0.3}Al_{0.1}P_{0.3}O_{3.1}$ and $SnSi_{0.3}Al_{0.1}B_{0.2}P_{0.3}O_{3.2}$.

The conductive agent in the positive electrode and negative electrode used in this embodiment includes, for example, graphite, acetylene black, carbon black, Ketchen black, carbon fibers, metallic powders, metallic fibers and polyphenylene derivatives. In particular, graphite and acetylene black are more preferable.

The binder in the positive electrode and negative electrode used in this embodiment includes, for example, polyacrylic acid, carboxymethyl cellulose, polytetrafluoroethylene, polyvinylidene fluoride, polyvinyl alcohol, starch, regenerated cellulose, diacetyl cellulose, hydroxypropyl cellulose, polyvinyl chloride, polyvinyl pyrrolidone, polyethylene, polypropylene, SBR, EPDN, sulfonated EPDN, polybutadiene, fluorine rubbers, polyethylene oxide, etc, individually or in combination. Particularly, polyacrylic acid, carboxymethyl cellulose, polytetrafluoroethylene and polyvinylidene fluoride are preferable.

As the material for the support of the positive electrode and negative electrode used in this embodiment, there are given aluminum, stainless steels, nickel, titanium and alloys thereof for the positive electrode, and copper, stainless ateels, nickel, titanium and alloys thereof for the negative electrode, the support being in the form of foils, expanded metals, punching metals and wire gauzes. In particular, an aluminum foil is preferable for the positive electrode and a copper foil is preferable for the negative electrode.

As the separator, there can be used, for example, an insulating microporous thin film having a large ion permeability and a predetermined mechanical strength and consisting of a material preferably selected from olefinic polymers, fluoro type polymers, cellulose type polymers, polyimides, nylons, glass fibers and alumina fibers, in the form of nonwoven cloths, woven cloths or microporous films. Specifically, the material includes polypropylene, polyethylene, mixtures of polypropylene and polyethylene, mixtures of polypropylene and teflon and mixtures of polyethylene and teflon, preferably in the form of a microporous film with a pore diameter of 0.01 to 1 μm and a thickness of 5 to 50 μm.

The electrolytic solution is generally composed of a solvent and an electrolyte. Examples of the solvent include propylene carbonate, ethylene carbonate, butylene carbonate, dimethyl carbonate, diethyl carbonate, 1,2-dimethoxyethane, γ-butyrolactone, tetrahydrofuran, 2-methyltetrahydrofuran, dimethyl sulfoxide, dioxolan, 1,3-dioxolan, formamide, dimethylformamide, nitromethane, acetonitrile, methyl formate, methyl acetate, methyl propionate, phosphoric acid triesters, trimethoxymethane, dioxolan derivatives, sulforan, 3-methyl-2-oxazolidinone, propylene carbonate derivatives, tetrahydrofuran derivatives, diethyl ether, 1,3-propanesultone, etc. They can be used individually or in combination. Examples of the electrolyte are $LiClO_4$, $LiBF_4$, $LiPF_6$, $LiCF_3SO_6$, $LiCF_3CO_2$, $LiAsF_6$, $LiSbF_6$, $LiB_{10}Cl_{10}$, lithium lower aliphatic carboxylate, $LiAlCl_4$, LiCl, LiBr, LiI, chloroborane lithium, lithium tetraphenylborate, etc., which can be used individually or in combination. Above all, it is preferable to use an electrolyte comprising an electrolytic solution of a mixture of propylene carbonate or ethylene carbonate with 1,2-dimethoxyethane and/or diethyl carbonate, in which at least one of $LiCF_3SO_3$, $LiClO_4$, $LiBF_4$ and $LiPF_6$ is incorporated. In particular, it is preferable to incorporate at least ethylene carbonate and $LiPF_6$ The bottomed battery armoring can used in this embodiment is generally formed of the same material as described in the general illustration of the present invention.

The gasket used in this embodiment is generally formed of the same material as described in the general illustration of the present invention.

In this embodiment, the battery is optionally coated with an armoring material. This armoring material includes, for example, heat-shrinkable tubes, adhesive tapes, metallic films, papers, cloths, paints, plastic cases, etc., a part of which can be provided with a thermally-discolorable area to indicate a thermal hysteresis during using.

One or more of the battery of the present invention are assembled in series and/or in parallel in a battery pack in the same manner as described in the general illustration of the present invention.

Uses of the non-aqueous secondary battery according to this embodiment are, for example, video movies, video decks of monitor-built-in portable type, movie cameras of monitor-built-in type, cameras of compact type, single-lens reflex cameras, throwaway cameras, lens-fitted films, personal computers of note type, word processors of note type, electronic note book, pocket telephones, cordless telephones, electric shavers, electric tools, electric mixers, cars, etc.

In a non-aqueous secondary battery, as described above, the temperature of the battery rises when anything unusual such as short-circuiting or overcharging takes place. Consequently, in the case of a closed type, an electrolyte enclosed therein is evaporated to raise the inner pressure in the battery, if the overcharged or short-circuited state is continued. In the case of the overcharged state, in particular, decomposition of the electrolyte or active material rapidly begins from a certain point of time because of the high battery voltage, sometimes causing explosion of the battery. The non-aqueous secondary battery of closed type according to this embodiment has such a structure in order to prevent the worst state, breakage of the battery even under overcharged state that the electric current path can completely and precisely be cut off at the initial period of rising of the inner pressure of the battery. That is, an electric current cutoff element is arranged opposite to the current collector side of an explosion proof valve, so breakage of the battery due to ignition to the electrolyte vapor can be prevented at the cutoff part. Furthermore, a lead plate led out of a positive electrode or negative electrode of the current collector is not broken nor stripped when electric current is cut off, thus preventing the lead plate from such a state that it is floated and contacted with the inner wall of a battery armoring can to cause internal short-circuiting. Since the explosion-proof valve is not formed of a thin film and a projection part for operating the electric current cutoff element is formed in an integrated body with the explosion-proof valve, the number of parts can be reduced, the assembling workability can be improved and there occurs no damages such as cracks on the explosion-proof valve during assembling the battery or rising of the inner pressure of the battery. Accordingly, in this embodiment, there can be provided a high safety non-aqueous secondary battery of closed type, very resistant to abnormal conditions such as overcharge, short-circuiting, etc.

When the groove-shaped thin wall part is circumferentially formed, in particular, in the explosion-proof valve, there is a zone wherein a rapid deformation occurs by a slight rising of the inner pressure in the battery, as shown in FIG. 21, in the course of from an elastic deformation zone at a low inner pressure in the battery to a plastic deformation zone at a high low inner pressure in the battery. Therefore, the precision of cutting off electric current when the inner pressure of the battery rises can be improved by adjusting timing for operating the electric current cutoff element to the above described behavior of the explosion-proof valve in the rapid deformation zone. When the cross-sectional shape of the side wall of the recess part between the outer circumference of the dish-shaped valve and projected flat area is approximately Z-shaped, the side wall of the recess part is hardly deformed during rising of the inner pressure in the battery, so that the displacement behavior of the projected flat area be stabilized, fluctuation of the inner pressure in the battery at cutting off electric current be decreased, and the groove-shaped thin wall part be broken by a small diaplacement quantity. Consequently, the projection quantity of the projected flat area toward the current collector from the vicinity of the outer circumference can be decreased and further the thickness of the sealing structure, as a whole, can be reduced. When the explosion-proof valve is shaped by forging in such a manner that the above described thickness of the side wall of the recess is larger than that of the outer circumference and the projected flat area, moreover, the similar effects can be obtained to described above, and further, the shape and dimension of the side wall of the recess are more stable than dsecribed above, to further decrease the fluctuation of the inner pressure in the battery at cutting off electric current.

The present invention will now be described by way of non-limiting illustrative examples, with reference to tests which the inventors have conducted and with reference to the accompanying diagrammatic drawings.

SYNTHETIC EXAMPLE 1

13.5 g of stannous oxide (SnO), 4.8 g of silicon dioxide ($SiO_2$) and 0.64 g of magnesium oxide (MgO) were mixed by dry process, charged in an alumina crucible and subjected to temperature raising in argon atmosphere to 1000° C. at a rate of 15° C./min. The mixture was calcined at 1150° C. for 12 hours, after which the temperature was lowered to room temperature at a rate of 10° C./min, the product was then taken out of a calcining furnace, roughly pulverized and then further pulverized by means of a jet mill to obtain $SnSi_{0.8}Mg_{0.2}O_{2.8}$ with an average grain diameter of 4.5 μm (Compound 1-A).

In an X-ray diffraction method using CuKα line, this compound gave a broad pattern having a peak near 28° by 2θ value and there was found no crystalline diffraction pattern in a range of from 40° to 70° by 2θ value.

In the similar manner, raw materials in stoichiometric amounts were mixed, calcined and pulverized and the following compounds were synthesized. In the X-ray diffraction method using Cu-Kα line, these compounds gave broad scattering zones having peaks in a range of from 20° to 40° by 2θ value. When the diffraction intensity of the peak in the scattering zone appearing in a range of from 20° to 40° by 2θ value is A and the strongest intensity of those when there are found crystalline diffraction patterns in a range of from 40° to 70° by 2θ value is B (B=0 when there is no crystalline diffraction patterns), values of B/A are respectively shown with the number of Compounds as to the synthsized compounds. In the case of Compound 1-A, B/A=0.

| | | |
|---|---|---|
| $SnSi_{0.6}Mg_{0.2}O_{2.4}$ | (Compound 1-B) | B/A = 0 |
| $SnSi_{0.6}Al_{0.2}Mg_{0.2}O_{2.7}$ | (Compound 1-C) | B/A = 0 |
| $SnSi_{0.6}P_{0.2}Mg_{0.2}O_{2.6}$ | (Compound 1-D) | B/A = 0 |
| $SnSi_{0.6}Al_{0.1}B_{0.2}Mg_{0.1}O_{2.75}$ | (Compound 1-E) | B/A = 0 |
| $SnSi_{0.5}P_{0.1}B_{0.1}Ca_{0.3}O_{2.7}$ | (Compound 1-F) | B/A = 0 |
| $SnSiO_3$ | (Compound 1-X, for comparison) | B/A = 0 |

SYNTHETIC EXAMPLE 2

13.5 g of stannous oxide, 4.8 g of silicon dioxide and 0.64 g of magnesium oxide were mixed by dry process, charged in an alumina crucible and subjected to temperature raising in argon atmosphere to 1000° C. at a rate of 15° C./min. The mixture was calcined at 1200° C. for 4 hours, after which the product was allowed to flow on a stainless foil and quenched in argon atmosphere at a cooling rate of 200° C./min, the product was then taken out of a calcining furnace, and then pulverized by means of a vibration mill to obtain $SnSi_{0.8}Mg_{0.2}O_{2.8}$ with an average grain diameter of 3.5 μm (Compound 2-A). In the X-ray diffraction analysis of the product, B/A=0.

SYNTHETIC EXAMPLE 3

13.5 g of stannous oxide, 4.8 g of silicon dioxide and 0.64 g of magnesium oxide were mixed by dry process, charged in an alumina crucible and calcined in the air at 1200° C. for 10 hours. After the calcination, the calcined product was cooled to room temperature at a cooling rate of 4°/min, then taken out of a calcining furnace, and then pulverized by means of a jet mill to obtain $SnSi_{0.8}Mg_{0.2}O_{2.8}$ with an average grain diameter of 4 μm (Compound 3-A). In the X-ray diffraction analysis of the product, B/A=0.

In th similar manner, raw materials in stoichiometric amounts were mixed, calcined and pulverized and the following compoumds were synthesized.

| | |
|---|---|
| $SnSi_{0.5}B_{0.3}Mg_{0.2}O_{2.6}$ | (Compound 3-B, B/A = 2.8) |
| $SnSi_{0.7}P_{0.1}Mg_{0.2}O_{2.2}$ | (Compound 3-C, B/A = 6.4) |
| $SnSi_{0.5}B_{0.3}P_{0.1}Mg_{0.1}O_{2.6}$ | (Compound 3-D, B/A = 3.2) |

EXAMPLE 1

Using Compound 1-A synthesized in Synthetic Example 1 as a negative electrode material, 86 weight % of the same, 6 weight % of crystalline graphite and 3 weight % of acetylene black were mixed, to which 4 weight % of an aqueous dispersion of polyvinylidene fluoride and 1 weight % of carboxymethyl cellulose, as a binder, were added, and the mixture was kneaded in aqueous medium to prepare a slurry. The resulting slurry was coated onto both surfaces of a copper foil with a thickness of 18 μm by an extrusion method, dried, pressed and shaped by a calender press, and then cut in a predermined width and length to form a belt-shaped negative electrode sheet having a thickness of 124 μm.

As a positive electrode material, 87 weight % of $LiCoO_2$, 6 weight % of crystalline graphite and 3 weight % of acetylene black were mixed, to which 3 weight % of an aqueous dispersion of polytetrafluoroethylene and 1 weight % of sodium polyacrylate, as a binder, were added, and the mixture was kneaded in aqueous medium to prepare a slurry. The resulting slurry was coated onto both surfaces of an aluminum foil with a thickness of 20 μm, dried, pressed and then cut in the similar manner to described above to form a belt-shaped positive electrode sheet having a thickness of 220 μm.

To both the end parts of the above described negative electrode sheet and positive electrode sheet were respectively spot-welded nickel and aluminum lead plates and dehydrated and dried in dry air with a dew point of at most −40° C. for 2 hours at 150° C.

Referring to FIG. 1, showing a cross-section of a cylindrical battery, a dehydrated and dried positive electrode sheet 5, microporous polypropylene film separator 3 (Cellguard 2400-commercial name-), dehydrated and dried negative electrode sheet 4 and separator 3 were piled with each other in this order, and wound in a spiral form by a winding machine.

This wound body was charged in a bottomed cylindrical battery can 2 of nickel-plated iron, additionally acting as a negative terminal. An electrolyte consisting of a mixed solution of ethylene carbonate, butylene carbonate and dimethyl carbonate, as solvents, in a proportion of 2:2:6 by volume, containing 0.9 mol of $LiPF_6$ and 0.1 mol of $LiBF_4$ per 1 liter was poured in the battery can. A battery lid 8 was caulked via a gasket 1 to form a cylindrical battery. The positive electrode terminal 8 is previously connected to the positive electrode sheet 5 by a lead terminal, and similarly, the battery can 2 to the negative electrode sheet 4. 6 designates a non-aqueous electrolyte solution, 7, an electric current cutoff and 9, an explosion-proof valve.

Cylindrical type batteries were prepared in an analogous manner except using compounds described in Table 1 instead of Compound 1-A as the negative electrode material. The charge and discharge conditions were adjusted to 4.3 to 2.7 V and 1 mA/cm². The results are shown in Table 1, in which (a) represents Negative Electrode Material, (b) First Discharge Capacity (mAh per 1 g of Negative Electrode Material), (c) Charge and Discharge Cycle Life (number of cycles until reaching 85% of first capacity) and (d) Ratio of (First Discharge Capacity When Charge and Discharge Current=5 mA)/(First Discharge Capacity When Charge and Discharge Current=1 mA) (%).

TABLE 1

| Sample No. | (a) | (b) | (c) | (d) |
|---|---|---|---|---|
| 1 | 1-A | 510 | 380 | 90 |
| 2 | 1-B | 505 | 405 | 87 |
| 3 | 1-C | 512 | 390 | 88 |
| 4 | 1-D | 506 | 400 | 89 |
| 5 | 1-E | 500 | 410 | 92 |
| 6 | 1-F | 512 | 396 | 90 |
| 7 | 2-A | 518 | 430 | 95 |
| 8 | 3-A | 490 | 320 | 80 |
| 9 | 3-B | 490 | 300 | 79 |
| 10 | 3-C | 491 | 290 | 81 |
| 11 | 3-D | 490 | 295 | 77 |
| 12 | 1-X | 490 | 286 | 65 |

As is evident from the results of Table 1, Sample Nos. 1 to 11 are favorbly compared with Sample No. 12 for comparison. Namely, their results are at least equal concerning the capacity, more excellent concerning the charge and discharge cycle life and mor excellent concerning the charge and discharge property using high electric current.

SYNTHETIC EXAMPLE 4

① Synthesis of $SnO.SiO_2$ 13.5 g of stannous oxide and 6.0 g of silicon dioxide were mixed by dry process, charged in an alumina crucible and subjected to temperature raising in argon atmosphere to 1000° C. at a rate of 10° C./min. The mixture was calcined at 1000° C. for 12 hours, after which the temperature was lowered to room temperature at a rate of 6° C./min. The alumina crucible was then taken out of a calcining furnace, the resulting light-yellow, transparent glass in the crucible was roughly pulverized and then further pulverized by means of a jet mill (made by Seishin Kigyo KK) to obtain a powder with an average grain diameter of 5 μm (Compound 4-A).

Figure 2:
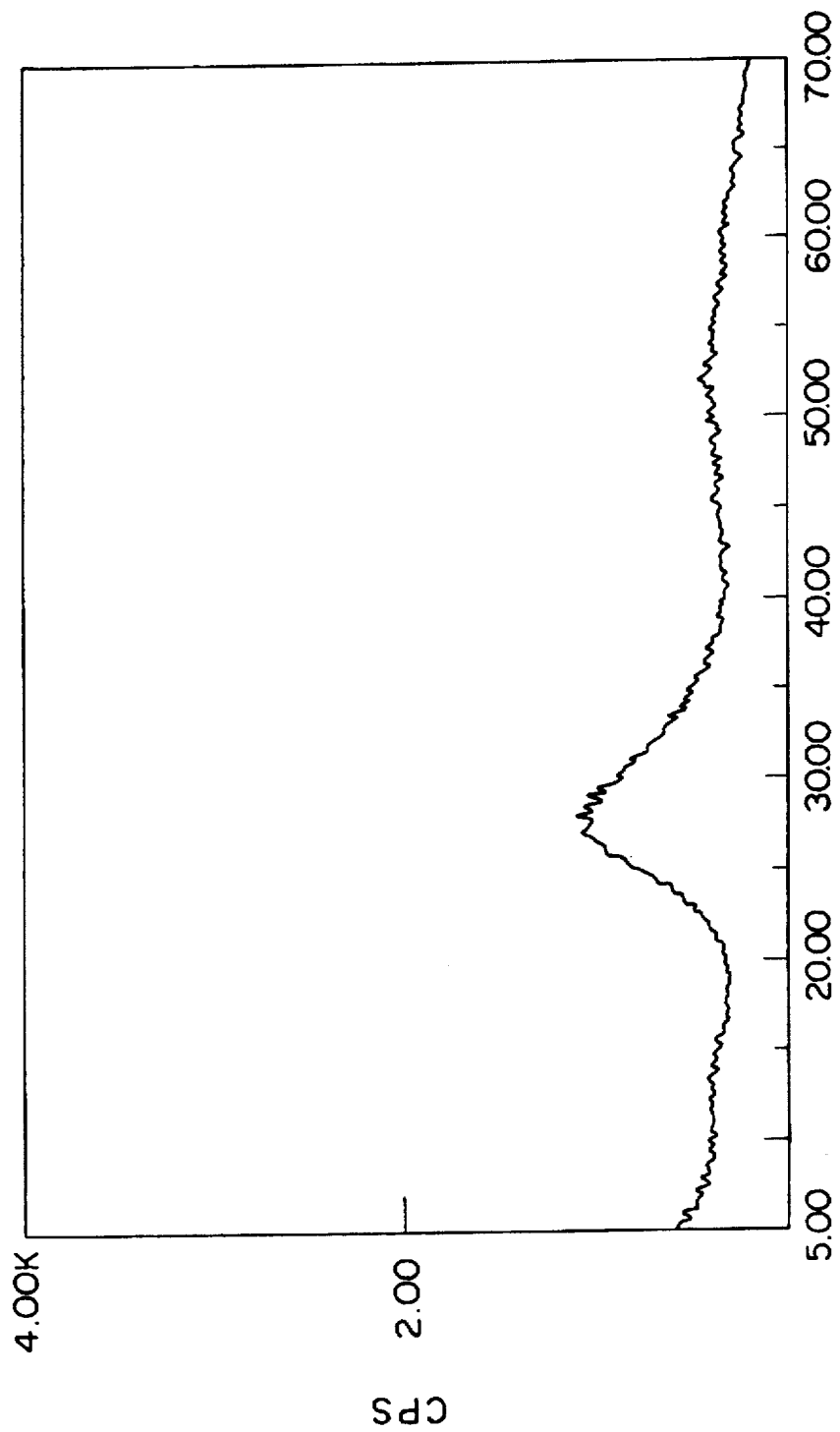
FIG. 2 is a graph showing an X-ray diffraction pattern of Compound 4-A ($SnO.SiO_2$).

The crystallinity of Compound 4-A was measured by an X-ray diffraction method using Cu-Kα line, it was confirmed that this compound was amorphous and exhibited a broad scattering zone having a peak in a range of 20° to 40° C. by 2θ value and there was found no crystalline diffraction pattern, as shown in FIG. 2.

In the chemical composition of Compound 4-A, the Si content was obtained by dissolving Compound 4-A in a weighed quantity in a mixture of 18N $H_2SO_4$/6N HCl ratio of ½ by volume, filtering to obtain an insoluble moiety and calculating based on the Si fraction obtained from the weight of the insoluble moiety and atomic absorption spectrometry thereof and the Sn content was obtained by diluting the above described acid-soluble moiety with distilled water by 20 times and subjecting the diluted sample to chelate titration with M/100 EDTA to substantially confirm Sn/Si=1/1.

② $SnO.0.6SiO_2.0.1Al_2O_3.0.1B_2O_3.0.2P_2O_5$ 13.5 g of SnO, 3.6 g of $SiO_2$, 1.0 g of $Al_2O_3$, 0.7 g of $B_2O_3$ and 2.8 g of $P_2O_5$ were mixed by dry process, charged in an alumina crucible and subjected to temperature raising in argon atmosphere to 1000° C. at a rate of 10° C./min. The mixture was calcined at 1000° C. for 12 hours, after which the temperature was lowered to room temperature at a rate of 6° C./min. The alumina crucible was then taken out of a calcining furnace, the resulting light-yellow, transparent glass in the crucible was roughly pulverized and then further pulverized by means of a jet mill (made by Seishin Kigyo KK) to obtain a powder with an average grain diameter of 5 μm (Compound 4-B).

The crystallinity of Compound 4-B was estimated by an X-ray diffraction method using Cu-Kα line, it was confirmed that this compound was amorphous similarly to Compound 4-A. Chemical composition of Compound 4-B was confirmed in an analogous manner to Compound 4-A except that the contents of Al, B and P was calculated from the atomic absorption spectrometry method. Further, it was found that the content of divalent Sn in Compound 4-B was at least 98% of Sn.

SYNTHETIC EXAMPLE 5

Heat Treatment of Amorphous Negative Electrode Material in Hydrogen Atmosphere

① Treatment of $SnO.SiO_2$

About 3 g of Compound 4-A ($SnO.SiO_2$) was charged in a porcelain crucible of boat type and further charged in a quartz reaction tube having about 40 mm in diameter at both the ends thereof and about 120 mm in diameter at the central part thereof and having an inner volume of about 2800 cm$^3$. From one end of the reaction tube, nitrogen gas was then flowed at a flow rate of 1 liter/min for 10 minutes to replace the air in the reaction tube by the nitrogen gas and the temperature was raised to 450° C. at a temperature raising rate of 25° C./min while flowing hydrogen gas at a rate of 0.5 liter/min. After maintaining the system at 450° C. for 4 hours, it was cooled and replaced by nitrogen gas and the sample was withdrawn. The thus prepared powder will hereinafter be referrd to as Compound 5-C.

Similarly, the temperature was raised to 500° C. at a temperature raising rate of 25° C./min, and the system was maintained at 500° C. for 1 hour and then cooled, followed by replacing by the nitrogen gas and withdrawing the sample therefrom. The thus prepared powder will hereinafter be referrd to as Compound 5-D.

② Treatment of $SnO.0.6SiO_2.0.1Al_{O3}.0.4B_2O_3.0.3P_2O_5$

Using Compound 4-B ($SnO.0.6SiO_2.0.1Al_2O_3.0.4B_2O_3.0.3P_2O_5$), the similar treatment to described above was carried out to obtain powders hereinafter referred to as Compounds 5-E and 5-F.

SYNTHETIC EXAMPLE 6

Heat Treatment of Amorphous Negative Electrode Material in Mixed Gases of $CO/CO_2$ Using Compound 4-A ($SnO.SiO_2$), the above described hydrogen gas treatment was repeated except using a mixed gas of CO and $CO_2$ in a proportion of 1:1 by voume in place of the hydrogen gas in the hydrogen gas treatmen at 450° C. The mixed gas of CO and $CO_2$ was prepared by a gas mixing apparatus (manufactured by Kojima Seisakujo KK). The thus prepared powder will hereinafter be referred to as Compound 6-G.

Using each of the thus prepared Compounds 4-A to 6-G as a negative electrode material and $LiCoO_2$ as a positive electrode active material, a coin-type battery was prepared by the following exemplified method and the ratio of lithium loss quantity (hereinafter referred to as "capacity loss ratio") due to the irreversible reaction of the negative electrode with lithium to the intercalation quantity of lithium in Compounds 4-A to 6-G in the first cycle was estimated. Using Compounds 5-C and 5-E as negative electrode materials, a coin type battery was then prepared by reducing the quantity of the positive electrode active material corresponding to reduction of the capacity loss from the former non-treated negative electrode materials, i.e. Compounds 4-A and 4-S in the first cycle and the capacities of the negative electrode were compared before and after the reduction of the quantity.

EXAMPLE 2

Figure 3:
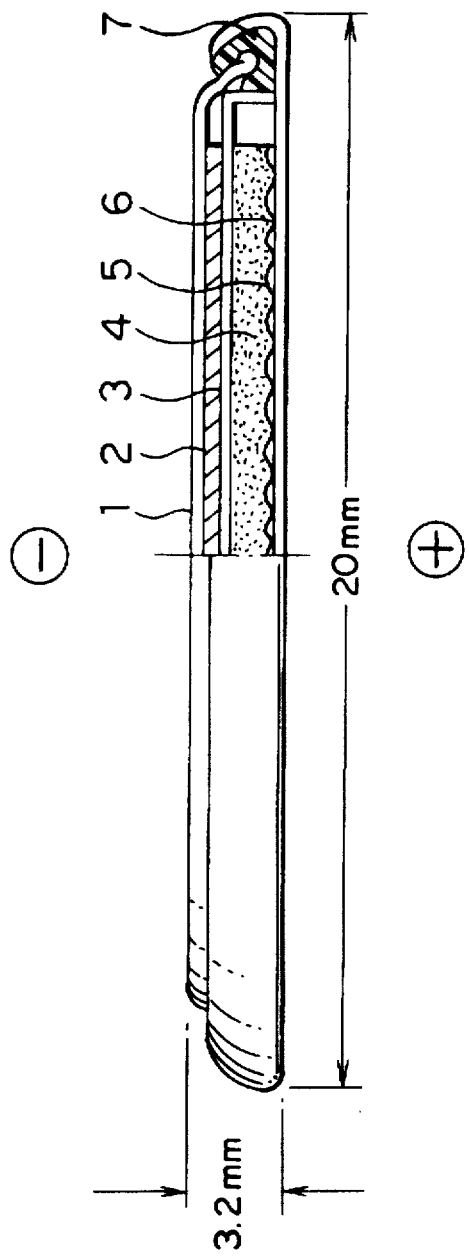
FIG. 3 is a vertically sectional view of a battery of a coin type, used in Example 2.

As a negative electrode material, there was used a pellet (13 mm diameter, 25 mg) obtained by mixing 84 weight % of Compound 5-C, 9 weight % of crystalline graphite and 3 weight % of acetylene black, as a conductive agent, and and 4 weight % of polyvinylidene fluoride as a binder to prepare a composition and compacting, shaping and drying the composition, and as a positive electrode material, there were used a pellet (13 mm diameter, 110 mg) obtained by mixing 94.5 weight % of $LiCoO_2$, 3.3 weight % of acetylene black as a conductive agent and 1.7 weight % of an acrylate type latex as a binder to prepare a composition and compacting, shaping and drying the composition. As an electrolyte, 1 mol/l of $LiPF_6$ in a mixed solution of propylene carbonate and 1,2-dimethoxyethane with a proportion of 1/1 by volume was used and as a separator, a microporous polypropylene sheet and nonwoven cloth were used. The electrolyte solution was impregnated in the nonwoven cloth. Thus, a coin type lithium battery 2-C as shwon in FIG. 3 was prepared, comprising a negative electrode sealing lid 1, negative electrode composition pellet 2, separator 3, positive electrode composition pellet 4, current collector 5, positive electrode case 6 and gasket 7.

Coin-shaped Batteries 2-D, 2-E, 2-F and 2-G were prepared in an analogous manner to Battery 2-C except using respectively Compounds 5-D, 5-E, 5-F and 6-G as a negative electrode active material instead of Compound 4-C.

For comparison, Coin-shaped Batteries 2-A and 2-B were prepared in an analogous manner to Example 2 except using respectively Compounds 4-A and 4-B as a negative electrode active material instead of Compound 5-C.

Using Batteries 2-C to 2-G and Batteries 2-A and 2-B for comparison, charging was carried out at a current density of 1 mA/cm$^2$ to to a final voltage of 4.3 V to allow the negative electrode active material to intercalate (absorb) lithium and then discharging was carried out at the same current density to deintercalate (release) lithium from the negative electrode active material upto a volatge of 2.7 V. From this result, the negative electrode capacity (deintercalating quantity of lithium) and capacity loss ratio in the first cycle (ratio of lithium loss quantity/lithium intercalation quantity in first cycle) were calculated to obtain results shown in Table 2. In contrast with the non-treated Compounds 4-A and 4-B, Compounds 5-C to 6-G treated according to the present invention showed the results that the lithium loss ratio was reduced without lowering of the negative electrode capacity.

pentaoxide were mixed by dry process, charged in an alumina crucible and subjected to temperature raising in argon atmosphere to 1000° C. at a rate of 15° C./min. The mixture was calcined at 1150° C. for 12 hours, after which the temperature was lowered to room temperature at a rate of 10° C./min, the product was then taken out of a calcining furnace, roughly pulverized and then further pulverized by means of a jet mill to obtain $SnSi_{0.8}Al_{0.2}B_{0.4}P_{0.2}O$, with an average grain diameter of 5.5 μm (Compound 7-A).

TABLE 2

| Battery No. | Negative Electrode Compound | Raw Materail Compound | Treating Conditions | Negative Electrode Capacity (mAh) | Capacity Loss Ratio (%) |
|---|---|---|---|---|---|
| 2-C | 5-C | 4-A | $H_2$, 450° C., 4 hours | 10.7 | 36.8 |
| 2-D | 5-D | 4-A | $H_2$, 500° C., 1 hour | 10.5 | 34.0 |
| 2-E | 5-E | 4-B | $H_2$, 450° C., 4 hours | 9.9 | 37.2 |
| 2-F | 5-F | 4-B | $H_2$, 500° C., 1 hour | 9.4 | 35.6 |
| 2-G (Comparison) | 6-G | 4-A | $CO/CO_2$, 450° C., 4 hour | 10.1 | 38.5 |
| 2-A | 4-A | — | — | 10.3 | 45.6 |
| 2-B | 4-B | — | — | 9.6 | 46.2 |

EXAMPLE 3

Example 2 was repeated except using Compound 5-D as a negative electrode active material and changing the weight of the pellet of the positive electrode active material in 85 mg, thus preparing a coin type lithium Battery 3-H.

Furthermore, the procedure of Example 2 was repeated except using Compound 5-F as a negative electrode active material and changing the weight of the pellet of the positive electrode active material in 86 mg, thus preparing a coin type lithium Battery 3-I. These batteries were subjected to estimation of the lithium deintercalating capacity, under the same conditions as in Example 2, thus obtaining results as shown in Table 3.

In each of Batteries 3-H and 3-I, the deintercalation quantity of lithium was not lowered in spite of that the quantity of the pellet of the positive electrode active material was reduced for the same quantity of each of Batteries 2-D and 2-F. Accordingly, the irreversible side reaction of lithium intercalated in the negative electrode during charging was suppressed by the treatment according to the present invention and correspondingly, reduction of the quantity of the positive electrode active material was rendered possible, whereby the object of increasing the capacity of the non-aqueous secondary battery could be achieved utilizing the reduction quantity as one factor.

TABLE 3

| Battery No. | Negative Electrode Compound | Raw Materail Compound | Negative Electrode Pellet Weight (mg) | Positive Electrode Pellet Weight (mg) | Negative Electrode Capacity (mAh) |
|---|---|---|---|---|---|
| 3-H | 5-D | 4-A | 25 | 90 | 10.4 |
| 3-I (Comparison) | 5-F | 4-A | 25 | 90 | 9.5 |
| 2-A | 4-A | — | 25 | 110 | 10.3 |
| 2-B | 4-B | — | 25 | 110 | 9.6 |

SYNTHETIC EXAMPLE 7

Predetermined amounts of stannous oxide, silicon dioxide, aluminum oxide, diboron trioxide and phosphorus In an X-ray diffraction method using Cu-Kα line, this compound gave a broad pattern having a peak near 27° by 2θ value and was found to be amorphous, since there was found no crystalline diffraction pattern in a range of from 40° to 70° by 2θ value.

In the similar manner to Compound 7-A, $SnS_{0.5}B_{0.3}P_{0.1}Mg_{0.1}O_{2.8}$ (Compound 7-B) and $SnSiO_3$ (Compound 7-C) were prepared and confirmed to be amorphous.

For comparison, predetermined amounts of silicon monoxide and stannous oxide were mixed and calcined to prepare $Sn_{0.67}Si_{0.33}O$ (Compound 7-D) and commercially available stannous oxide was used as Compound 7-E for comoarison.

These compounds were all crystalline.

As the separator, the following materials were used.

S-1: polyethylene film with a thickness of 50 μm and a porosity of 63%. S-2: ethylene-propylene copolymer film (ethylene content 50 weight %) with a thickness of 50 μm and a porosity of 62%. S-3: composite films of polyethylene film with a thickness of 25 μm and a porosity of 66% and polypropylene film with a thickness of 25 μm and a porosity of 62%.

S-4: nonwoven cloth consisting of polyethylene yarn with an average filament diameter of 1 μm and the same weight of polypropylene yarn with an average filament diameter of 1 μm and having a thickness of 50 μm.

S-5: nonwoven cloth consisting of 30 weight % of polyethylene yarn with an average filament diameter of 1 μm and 70 weight % of polypropylene yarn with an average filament diameter of 1 μm and having a thickness of 50 μm.

S-6: same as S-2 except that ethylene content was 20 weight %.

S-7: nonwoven cloth consisting of 20 weight % of polyethylene yarn with an average filament diameter of 1 μm and 80 weight % of polypropylene yarn with an average filament diameter of 1 μm and having a thickness of 50 μm.

On the other hand, other separators outside the present invention were prepared as follows:

SC-1: nonwoven cloth consisting of 10 weight % of polyethylene yarn with an average filament diameter of 1 μm and 90 weight % of polypropylene yarn with an average filament diameter of 1 μm and having a thickness of 50 μm.

SC-2: polypropylene film with a thickness of 50 μm and a porosity of 62%.

SC-3: same as S-2 except that ethylene content was 10 weight %.

EXAMPLE 4

As a negative electrode material, 86 weight % of Compound 7-A, 6 weight % of crystalline graphite and 3 weight % of acetylene black were mixed, to which 4 weight % of an aqueous dispersion of polyvinylidene fluoride and 1 weight % of carboxymethyl cellulose, as a binder, were added, and the mixture was kneaded in aqueous medium to prepare a slurry. The resulting slurry was coated onto both surfaces of a copper foil with a thickness of 18 μm by an extrusion method, dried, then pressed and shaped by a calender press, and then cut in a predermined width and length to form a belt-shaped negative electrode sheet having a thickness of 124 μm.

As a positive electrode material, 87 weight % of $LiCoO_2$, 6 weight % of crystalline graphite and 3 weight % of acetylene black were mixed, to which 3 weight % of an aqueous dispersion of polytetrafluoroethylene and 1 weight % of sodium polyacrylate, as a binder, were added, and the mixture was kneaded in aqueous medium to prepare a slurry. The resulting slurry was coated onto both surfaces of an aluminum foil with a thickness of 20 μm, dried, pressed, shaped and then cut in the similar manner to described above to form a belt-shaped positive electrode sheet having a thickness of 280 μm.

To both the end parts of the above described negative electrode sheet and positive electrode sheet were respectively spot-welded nickel and aluminum lead plates and dehydrated and dried in dry air with a dew point of at most −40° C. for 2 hours at 150° C.

Then, cylindrical Batteries D-1 to D-3 as shown in FIG. 1 were prepared in the similar manner to Example 1. Herein, a safety valve 9 was designed so that the valve be opened, the inner pressure in the battery exceeding 15 $kgf/cm^2$.

Batteries shown in the following Table 4 were prepared using Compounds 7-A to 7-E as a negative electrode material and S-1 to S-5 as a separator, as shown in Table 4.

A charging and dsicharging test was carried out at 4.3 to 2.7 V and 1 $mA/cm^2$. In addition, a battery charged to 4.5 V was subjected to external short-circuiting to examine the state at short-circuiting, thus obtaining results shown in Table 4, in which ① represents Battery No., ② Negative Electrode Material, ③ Separator, ④ Fifth Discharge Capacity (mAh per 1 g of Negative Electrode Material), ⑤ Charge and Discharge Cycle Life (number of cycles until reaching 85% of first capacity) and ⑥ Presence or Absence of Opening of Safety Valve at Outer Short-Circuiting

TABLE 4

| ① | ② | ③ | ④ | ⑤ | ⑥ |
|---|---|---|---|---|---|
| D-1 | 7-A | S-1 | 485 | 310 | no |
| D-2 | " | S-2 | 490 | 320 | no |
| D-3 | " | S-3 | 510 | 360 | no |
| D-4 | " | S-4 | 515 | 345 | no |

TABLE 4-continued

| ① | ② | ③ | ④ | ⑤ | ⑥ |
|---|---|---|---|---|---|
| D-5 | " | S-5 | 512 | 335 | no |
| D-6 | " | SC-1 | 475 | 295 | opened |
| D-7 | " | SC-2 | 480 | 330 | opened |

As is evident from the results of Table 4, the property of the battery using Compound 7-A as a negative electrode material according to the preferred embodiment is also somewhat dependent on the varieties of separators used, and in the case of the specified combination with the preferred separators, no abnormal phenomenon takes place. In contrast, when using the separators outside the preferred embodiment of the present invention, the valve is opened to spout the contents in the external short-circuiting test. In the separator according to this embodiment of the present invention, the use of the composite type separator S-3, in particular, results in better results. When using Compound 7-E as the negative electrode material, for comparison, outside of the present invention, there is no difference in the external short-circuiting test independently of the separators used.

EXAMPLE 5

The following results were obtained according to the similar procedures to Example 4 but under conditions shown in Table 5:

TABLE 5

| ① | ② | ③ | ④ | ⑤ | ⑥ |
|---|---|---|---|---|---|
| D-3 | 7-A | S-3 | 510 | 360 | no |
| D-7 | " | SC-2 | 480 | 330 | opened |
| D-13 | 7-B | S-3 | 520 | 370 | no |
| D-14 | " | SC-2 | 480 | 315 | opened |
| D-15 | 7-C | S-3 | 465 | 235 | no |
| D-16 | " | SC-2 | 450 | 240 | opened |
| D-17 | 7-D | S-3 | 520 | 35 | opened |
| D-18 | " | SC-2 | 505 | 40 | opened |
| D-19 | 7-E | S-3 | 570 | 15 | opened |
| D-20 | " | SC-2 | 545 | 15 | opened |

It is apparent from the results of Table 4 that the use, as a negative electrode material, of the material containing no silicon dioxide, outside the scope of the present invention, results in marked deterioration of the cycle life and no security of safety.

EXAMPLE 6

The following results were obtained according to the similar procedures to Example 4 but under conditions shown in Table 6:

TABLE 6

| ① | ② | ③ | ④ | ⑤ | ⑥ |
|---|---|---|---|---|---|
| D-1 | 7-A | S-1 | 485 | 310 | no |
| D-2 | " | S-2 | 490 | 320 | no |
| D-21 | " | S-6 | 485 | 315 | no |
| D-22 | " | SC-3 | 485 | 325 | opened |
| D-7 | " | SC-2 | 480 | 330 | opened |
| D-4 | " | S-4 | 515 | 345 | no |
| D-5 | " | S-5 | 512 | 335 | no |

TABLE 6-continued

| ① | ② | ③ | ④ | ⑤ | ⑥ |
|---|---|---|---|---|---|
| D-23 | " | S-7 | 500 | 315 | no |
| D-6 | " | SC-1 | 475 | 295 | opened |

It is apparent from these results that an ethylene content of at least 20 weight % of is preferable for the separator used in the preferred embodiment.

EXAMPLE 7

Separators S-8 to S-10 were prepared in the similar manner to dscribed above except changing the thickness of Separator S-2 in 100 μm, 125 μm and 150 μm. Using these separators, similar experiments to Example 6 were conducted to obtain the results that the batteries using S-9 and S-10 exhibited lowering of the discharge capacity. When a discharge experiment was conducted at a temperature of 0° C., furthermore, the batteries using S-9 and S-10 exhibited marked lowering of the discharge capacity, from which it was taught that the thickness of the separator was preferably specified in at most 100 μm.

SYNTHETIC EXAMPLE 8

Synthesis of $SnSi_{0.8}P_{0.2}Al_{3.4}$ 10.78 g of stannous oxide, 4.8 g of silicon dioxide and 4.11 g of stannous pyrophosphate were mixed by dry process in a ball mill, charged in an alumina crucible and subjected to temperature raising in argon atmosphere to 1100° C. at a rate of 10° C./min. The mixture was calcined at 1100° C. for 10 hours, after which the temperature was lowered in argon atmosphere to room temperature at a rate of 9.2° C./min to obtain a glassy object compound. This compound was crushed by a jaw crusher and further pulverized by dry process using a swirling gas stream type jet mills to obtain an object negative electrode material with a mean grain diameter of 6.5 μm.

In an X-ray diffraction method using Cu-Kα line, it was confirmed that this compound was amorphous and an inductively coupled plasma spectrometry taught that it had the object atomic composition. When the true density of the compound was measured by means of Multivolume Density Meter (No. 1305, manufactured by Shimazu Seisakujo KK,-commercial name-), it was 3.9. This measurement method corresponds to a liquid phase displacement method using water.

SYNTHETIC EXAMPLE 9

Synthesis of $SnSiAl_{0.1}O_{3.15}$ 13.5 g of stannous oxide and 6.0 g of silicon dioxide were mixed by dry process in a ball mill, then charged in an alumina crucible and subjected to temperature raising in argon atmosphere to 1000° C. at a rate of 15° C./min. The mixture was calcined at 1000° C. for 12 hours, after which the temperature was lowered to room temperature in argon atmosphere at a rate of 10° C./min to obtain a glassy object compound. This compound was crushed by a jaw crusher and further ball milled using water as a medium to obtain an object negative electrode material with a mean grain diameter of 11.3 μm. The resulting compound was identified in the similar manner to Synthetic Example 8. The true density was 4.3.

Other negative electrode materials used in the following Examples were synthesized by the same method.

Positive electrode active materials used in the following Examples were commercially available as described below:

(i) $LiCoO_2$, (ii) $LiNiO_2$, (iii) $LiMn_2O_4$

Electrolytic solutions used in the following Examples are described below:

(A) 1 mol/liter of $LiPF_6$ in mixed solution of ethylene carbonate/diethyl carbonate 5/5 by volume (B) 0.9 mol/liter of $LiPF_6$ and 0.1 mol/liter of LiBF4 in mixed solution of ethylene carbonate/diethyl carbonate 5/5 by volume (C) 1 mol/liter of $LiPF_6$ in mixed solution of ethylene carbonate/butylene carbonate/diethyl carbonate 2/2/6 by volume

EXAMPLE 8

84 weight parts of a negative electrode material, 3 weight parts of acetylene black and 8 weight parts of graphite were mixed, to which 4 weight parts of polyvinylidene fluoride and 1 weight parts of carboxymethyl cellulose, as a binder, were added, and the mixture was kneaded in aqueous medium to prepare a slurry. The resulting slurry was coated onto both surfaces of a copper foil with a thickness of 18 μm by a doctor blade coater, dried, pressed and shaped by a calender press, and further subjected to spot-welding of a lead plate at both ends and a heat treatment at 150° C. for 4 hours in dry air with a dew point of at most −40° C. to form a belt-shaped negative electrode sheet 4 as shown in FIG. 1

As a positive electrode active material, 92 weight parts of $LiCoO_2$ and 4 weight parts of acetylene black were mixed, to which 3 weight parts of polytetrafluoroethylene and 1 weight part of sodium polyacrylate, as a binder, were added, and the mixture was kneaded in aqueous medium to prepare a slurry. The resulting slurry was coated onto both surfaces of an current collector of an aluminum foil (support) with a thickness of 20 μm, dried, pressed and shaped by a calender press to form a belt-shaped positive electrode sheet 5. End parts of the above described positive electrode sheet 5 were respectively spot-welded with a lead plate and then heat treated in dry air with a dew point of at most −40° C. for 4 hours at 150° C.

Referring to FIG. 1, the thus prepared positive electrode sheet 5, microporous polypropylene film separator 3 (Cellguard 2400-commercial name-), negative electrode sheet 4 and separator 3 were piled with each other in this order, and wound in a spiral form.

This wound body was charged in a bottomed cylindrical battery can 2 of nickel-plated iron, additionally acting as a negative terminal. As an electrolytic solution, a mixed solution of ethylene carbonate and diethylcarbonate, as solvents, in a proportion of 5:5 by volume, containing 1 mol/l of $LiPF_6$ was poured in the battery can. The battery lid 8 having the positive electrode terminal was caulked via a gasket 1 to form a cylindrical battery. The positive electrode terminal 8 is previously connected to the positive electrode sheet 5 by a lead terminal, and similarly, the battery can 2 to the negative electrode sheet 4.

The thus prepared battery was subjected to a charge and discharge cycle test at a charge finishing volatge of 4.25 V, discharge finishing volatge of 2.8 V and current density of 3.0 mA/cm², the cycle test being started from charging, thus obtaining results as shown in Table 7 and 8. In these Tables, mWH represents an energy density (energy density per 1 ml of volume of cylindrical type battery) in the first cycle and Cycle Life represents number of cycles until reaching 80% of first capacity).

Comparative Example 1

Cylindrical batteries were prepared in an analogous manner to Example 8 except using Compounds 45 to 54, as shown in Table 8, as a negative electrode material and subjected to a charge and discharge test to thus obtain results shown in Table 8, with those of Examples of the present invention.

negative electrode materials whose true densities are outside the scope of this embodiment of the present invention.

EXAMPLE 9

Figure 4:
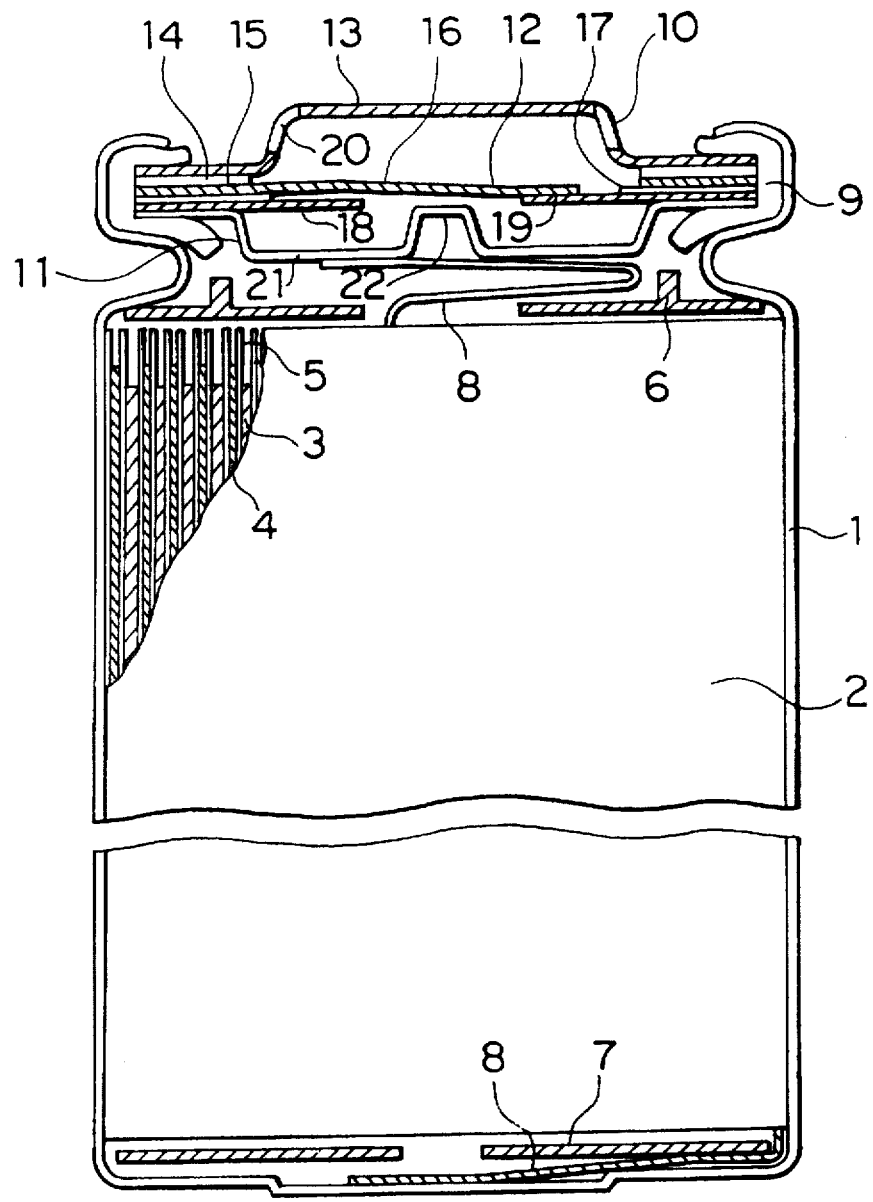
FIG. 4 is a partially sectional view of a non-aqueous secondary battery of a coin type, used in Example 9 (Battery 9-A) of the present invention.

In a non-aqueous secondary battery of closed type, as shown in FIG. 4, a current collector or electrode assembly composed of a positive electrode consisting of a positive electrode collector coated with a positive electrode compo-

TABLE 7

| Sample No. | Negative Electrode | True Density | Positive Electrode | Electrolyte | mWH | Cycle Life |
|---|---|---|---|---|---|---|
| 1 | $SnSi_{0.7}Al_{0.3}B_{0.3}P_{0.2}O_{3.8}$ | 3.9 | (i) | (A) | 244 | 295 |
| 2 | " | 3.9 | (ii) | (B) | 252 | 270 |
| 3 | $SnSi_{0.5}B_{0.2}P_{0.2}O_3$ | 4.4 | (i) | (A) | 275 | 225 |
| 4 | $SnSi_{0.6}Ge_{0.2}P_{0.2}O_{3.1}$ | 4.4 | (i) | (A) | 270 | 270 |
| 5 | $SnSi_{0.3}P_{0.7}Al_{0.1}O_{3.5}$ | 4.2 | (ii) | (A) | 305 | 235 |
| 6 | $SnSi_{0.6}Al_{0.3}B_{0.2}Mg_{0.1}O_{3.05}$ | 3.8 | (i) | (A) | 260 | 265 |
| 7 | " | 3.8 | (ii) | (A) | 265 | 244 |
| 8 | $SnSi_{0.6}P_{0.2}Ge_{0.1}Al_{0.1}O_{3.05}$ | 3.7 | (i) | (C) | 239 | 287 |
| 9 | $SnSi_{0.3}O_{1.6}$ | 5.5 | (i) | (C) | 298 | 219 |
| 10 | $SnSi_{0.1}O_{1.2}$ | 5.9 | (i) | (C) | 325 | 205 |
| 11 | $SnSi_{0.25}B_{0.2}P_{0.2}O_3$ | 4.6 | (ii) | (A) | 290 | 295 |
| 12 | $SnSi_{0.3}Al_{0.1}P_{0.7}O_{3.5}$ | 3.9 | (ii) | (C) | 271 | 300 |
| 13 | $SnSi_{0.01}O_{1.02}$ | 6.2 | (i) | (B) | 330 | 211 |
| 14 | $PbSiO_3$ | 4.5 | (iii) | (B) | 225 | 226 |
| 15 | $GeSi_{0.1}O_{2.2}$ | 4.0 | (iii) | (A) | 218 | 201 |
| 16 | $GeP_{0.5}O_{3.25}$ | 3.5 | (iii) | (A) | 229 | 238 |
| 17 | $GeBO_{2.5}$ | 3.3 | (iii) | (A) | 207 | 240 |
| 18 | $PbGe_2O_5$ | 4.9 | (iii) | (B) | 228 | 217 |
| 19 | $SnSi_{0.1}Ge_{0.1}Pb_{0.1}O_{2.6}$ | 5.8 | (ii) | (A) | 303 | 220 |
| 20 | $SnSi_{0.2}Ge_{0.1}O_{2.6}$ | 5.4 | (ii) | (A) | 286 | 234 |
| 21 | $SnP_{0.8}Ge_{0.2}O_{3.4}$ | 5.2 | (ii) | (A) | 254 | 250 |

TABLE 8

| Sample No. | Negative Electrode | True Density | Positive Electrode | Electrolyte | mWH | Cycle Life |
|---|---|---|---|---|---|---|
| 22 | $SnB_{0.9}Pb_{0.1}O_{2.55}$ | 4.0 | (i) | (B) | 220 | 295 |
| 23 | $SnSi_{0.5}Al_{0.05}O_{2.75}$ | 3.6 | (i) | (B) | 228 | 280 |
| 24 | $SnSi_{0.25}B_{0.2}P_{0.2}O_3$ | 4.9 | (i) | (A) | 210 | 290 |
| 25 | $SnSi_{0.1}Ge_{0.1}P_{0.9}O_{3.65}$ | 4.8 | (i) | (C) | 301 | 280 |
| 26 | $SnSi_{0.6}Ge_{0.4}P_{0.1}O_{3.25}$ | 4.2 | (iii) | (C) | 275 | 245 |
| 27 | $SnSi_{0.8}Al_{0.3}B_{0.2}Mg_{0.1}O_{3.45}$ | 4.0 | (iii) | (C) | 228 | 240 |
| 28 | $SnSi_{0.7}Al_{0.3}B_{0.2}Mg_{0.1}O_{3.25}$ | 4.1 | (i) | (A) | 250 | 252 |
| 29 | $SnSi_{0.8}Ge_{0.1}In_{0.1}O_{2.95}$ | 4.1 | (ii) | (A) | 249 | 278 |
| 30 | $SnSi_{0.5}P_{0.05}O_{2.75}$ | 4.7 | (i) | (A) | 270 | 281 |
| 31 | $SnSiPbO_{0.2}O_{3.3}$ | 3.8 | (i) | (C) | 250 | 245 |
| 32 | $SnO$ | 6.4 | (i) | (A) | 305 | 190 |
| 33 | " | " | (ii) | (C) | 310 | 201 |
| 34 | $SnO_2$ | 6.9 | (i) | (A) | 225 | 198 |
| 35 | " | " | (i) | (B) | 210 | 193 |
| 36 | $LiSiO$ | 1.9 | (i) | (B) | 175 | 190 |
| 37 | $Li_2SiO$ | 1.6 | (i) | (A) | 160 | 215 |
| 38 | $LiSiO_{1.8}$ | 2.2 | (i) | (A) | 170 | 220 |
| 39 | $Sn_{0.5}SiBP_{0.6}O_{5.5}$ | 2.4 | (i) | (B) | 155 | 245 |
| 40 | $Sn_{0.6}SiAl_{1.5}P_{1.1}O_{7.6}$ | 2.6 | (ii) | (C) | 170 | 225 |
| 41 | $Sn_{0.8}B_{1.5}PAl_{1.5}O_{7.8}$ | 2.6 | (iii) | (A) | 181 | 201 |
| 42 | $Li_2SiO_{1.8}$ | 1.8 | (i) | (A) | 149 | 198 |
| 43 | $Sn_{0.5}Ge_{0.5}Pb_{0.5}AlP_{0.8}B_{0.8}O_{6.2}$ | 2.3 | (iii) | (B) | 135 | 205 |
| 44 | $SnSi_2P_{0.5}B_{0.8}O_{7.45}$ | 2.0 | (ii) | (A) | 140 | 228 |
| 45 | $SnPb_{0.5}Cu_{0.5}Sb_{0.4}O_{2.60}$ | 2.7 | (i) | (C) | 128 | 145 |

As apparent from comparison of Example 8 and Comparative Example 1, a battery using a negative electrode material consisting of a chalcogen compound or oxide containing at least one element selected from Group 13, 14, 15 and 2 atoms of Periodic Table and having a true density in a range of $2.8 < \rho < 7.5$ has a larger energy density and more excellent cycle property as compared with batteries using sition containing a positive electrode active material and a negative electrode consisting of a negative electrode collector coated with a negative electrode composition containing a negative electrode active material, being wound through a separator, is charged in a battery armoring can under such a state that insulators are arranged at lower and upper positions and further, a sealing structure is arranged at the opening part of the armoring can through an insulating gasket to tightly seal it, during which the sealing structure is electrically connected with a lead plate led from the positive electrode and another lead plate led from the negative electrode is electrically connected with the battery armoring can, so that the sealing structure and the battery armoring can respectively function as positive electrode and negative electrode terminals.

A positive electrode was prepared by mixing 87 weight parts of $LiCoO_2$ as an active material, 9 weight parts of graphite as a conductive agent and 1 weight part of sodium polyacrylate and 3 weight parts of polytetrafluoroethylene, as a binder, kneading the resulting mixture in aqueous medium to prepare a slurry, coating the slurry onto both surfaces of an an aluminum foil (electrode collector, thickness 20 μm), drying the coated one and then pressing and shaping it by a calender press to form a belt-shaped positive electrode with a thickness of 250 μm.

A negative electrode was prepared by mixing 86 weight parts of $SnSiO_3$ as an active material, 3 weight parts of acetylene black and 6 weight parts of graphite, as a conductive agent, and 4 weight parts of polyvinylidene fluoride and 1 weight part of carboxymethyl cellulose, as a binder, kneading the mixture in aqueous medium to prepare a slurry, coating the slurry onto both surfaces of an a copper foil (current collector, thickness 10 μm), drying the coated one and then pressing and shaping it by a calender press to form a belt-shaped negative electrode with a thickness of 80 μm.

The positive electrode and negative electrode obtained in this way were dehydrated and dried at 150° C. for 2 hours by an infrared heater in a low humidity atmosphere (dew point: −50° C.), cut in predermined dimensions, to both the ends of which lead plates of aluminum and nickel were respectively fitted, and the positive electrode and negative electrode were wound through a microporous film separator of polypropylene (Cellguard No. 2400 made by Hoechst Celanese Co.,-commercial name-) to form an electrode assembly. Further, this electrode assembly was charged in a bottomed battery armoring can of true cylinder type (formed of nickel-plated steel plate) with an electrolyte solution containing 0.9 mol/liter of $LIPF_6$ and 0.1 mol/liter of $LiBF_4$ in a mixed solvent of ethylene carbonate and diethyl carbonate in a proportion of 2:8 by volume, followed by sealing the opening part of the armoring can using the sealing structure together with a gasket of a copolymer of propylene and ethylene, to form a cylindrical battery of 18 mm in dimater and 65 mm in height.

(Battery 9-A)

As shown in FIG. 4, a sealing structure 10 is composed of a vent hole-fitted terminal cap 13, electric current cutoff means 12 and explosion-proof valve 11, from the outside of the battery. The electric current cutoff means 12 is composed of, from the side of the terminal cap 13 fitted with the vent hole 20, a ring-shaped PTC element 14, ring-shaped first lead element 15 having a central penetration hole and projection 16 toward the center of the penetration hole from the outer circumference, ring-shaped insulating plate 17 and ring-shaped second lead element 18, the projection 16 of the first lead element 15 being welded to a part of the second lead element 18 at a welded point 19 through the central penetration hole of the insulating plate 17. As the explosion-proof valve 11, there is used a dish-shaped body having a flat area 21 projected toward the electrode assembly from the vicinity of the outer circumference thereof, provided with circular thin wall parts 23 or transversely groove-shaped and linear four thin wall parts 23 and provided with, at the central part thereof, a projection part 22 projected toward the opposite side to the electrode assembly, in the form of one integrated unit. A battery using the thus composed sealing structure 10 is designated as Battery 9-A.

In the above described electric current cutoff means 12, the first lead element 15 was preworked so that after the welded connection with the second lead element 18 was broken, the projection 16 sprang up toward the side of the terminal cap 13 and composed so that when the explosion-proof valve 11 was deformed by rising of the inner pressure in the battery, the end of the central projection part 22 of the explosion-proof valve 11 was brought into contact with the lower surface of the projection 16 through the central penetration hole of the second lead element 18 and insulating plate 17.

In the above described battery, there were used "Polyswitch"-commercial name-manufactured by Raychem Co. as the PTC element 14, a phosphor bronze plate with a thickness of 0.15 mm as the first lead member 15, a phosphor bronze plate with a thickness of 0.3 mm as the second lead element 18, a polyester film with a thickness of 0.125 mm as the insulating plate 17 and the structural body of the explosion-proof valve 11 consisting of pure aluminum material (JIS Standard A 1100P-H24) having a thickness of 0.3 mm, and comprising the projected flat area 21 with an outer diameter of 12 mm and projected height of 1.3 mm, the groove-shaped thin wall parts with a thickness of 0.1 mm and width of 0.5 mm or the circular thin wall parts with an outer diameter of 5 mm and the central projection part 22 with an outer diameter of 2 mm and height of 1 mm, such that the inner pressure in the battery be 12 $kgf/cm^2$ at the time of cutting-off of electric current.

(Battery 9-B)

Figure 5:
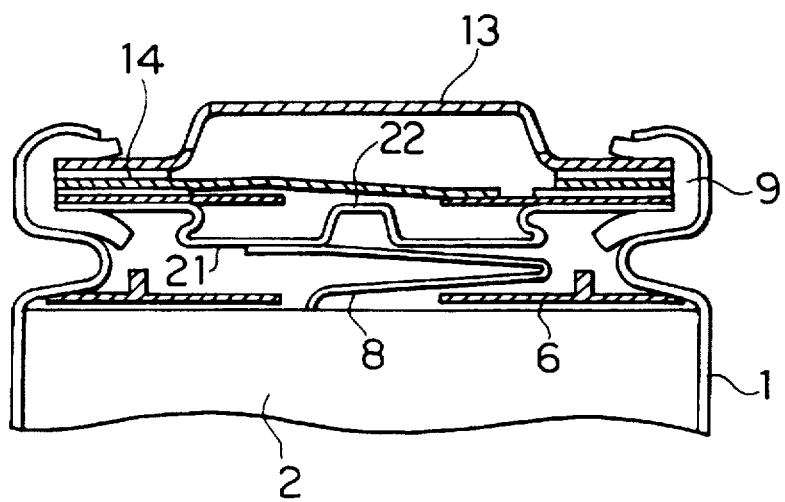
FIG. 5 is a partially sectional view of one embodiment of a non-aqueous secondary battery of a closed type (Battery 9-B) according to the present invention.

Battery 9-B was formed in the same manner as Battery 9-A except using, as the above described explosion-proof valve, one having such a structure that the cross-sectional shape of the side wall of the recess part between the outer circumference and projected flat area is substantially Z-shaped, the projected flat area has a projected height of 1 mm and the central projection part has a height of 0.8 mm and outer diameter of 2 mm, as shown in FIG. 5.

Figure 6:
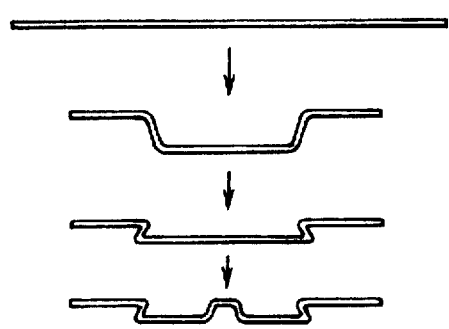
FIG. 6 is a schematic view of one embodiment of a process for preparing an explosion-proof valve in the battery shown in FIG. 5.

The above described explosion-proof valve was prepared as shown in FIG. 6, by firstly forming a dish-shaped body from a plate-shaped material by press working, then arranging dimension regulators at the inner diameter part and the outer diameter part of the projected part and compressing to crush the dish-shaped projected part. Thus, the cross-sectional shape of the side wall of the recess part between the outer circumference and projected flat area was formed in substantial Z-shape. Then, a projection part was formed by press working the dish-shaped body from the lower side of the above described projected flat area and groove-shaped thin wall parts were further formed by press working the upper surface of the projected flat area.

Figure 7:
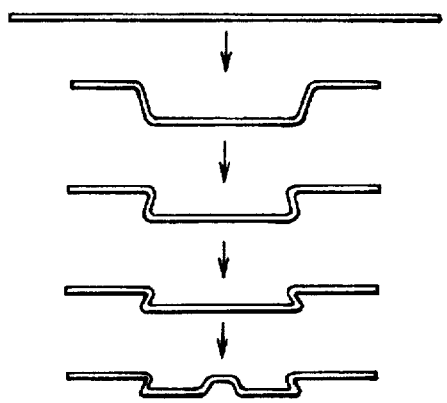
FIG. 7 is a schematic view of another embodiment of a process for preparing an explosion-proof valve in the battery shown in FIG. 5.

As shown in FIG. 7, before the crushing of the dish-shaped projected flat area, the root portion of thereof can additionally be subjected to reduction of the diameter from the outer circumference of the projected part.

(Battery 9-C)

Figure 8:
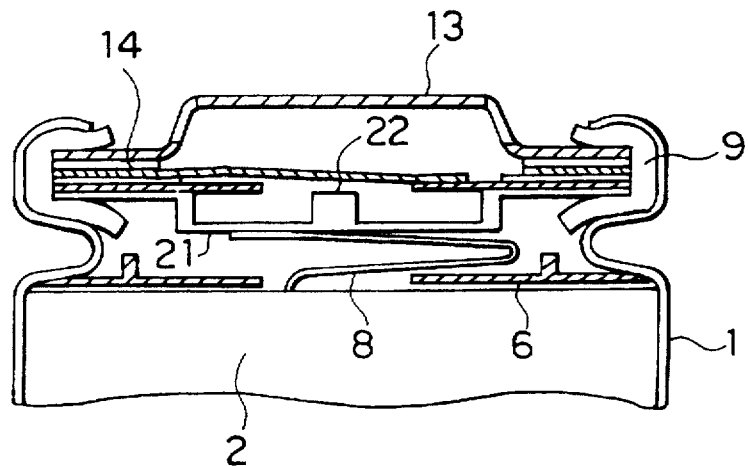
FIG. 8 is a partially sectional view of one embodiment of a sealing structure in a non-aqueous secondary battery of a closed type (Battery 9-C) according to the present invention.

Battery 9-C was formed in the same manner as Battery 9-B except using, as the above described explosion-proof valve, such a structure consisting of the same material as that of Battery 9-A formed by forging that the cross-section of the side wall of the recess part between the outer circumference and projected flat area had a thickness of 0.5 mm, the outer circumference and projected flat area had a thickness of 0.3 mm and the side all of the recess part formed an angle of about 90 degrees with the outer circumference, as shown in FIG. 8.

(Batteries 9-D and 9-E)

Batteries 9-D and 9-E were formed in the same manner as Battery 9-A except using, as the material of the above described explosion-proof valve, an alloy of aluminum and manganese (JIS Standard A 3003 P-H24) for Battery 9-D and an alloy of aluminum and magnesium (JIS Standard A 5052 P-H34) for Battery 9-E.

(Batteries 9-F and 9-G)

Batteries 9-F and 9-G were formed in the same manner as Battery 9-B except using, as the material of the above described explosion-proof valve, an alloy of aluminum and manganese (JIS Standard A 3003 P-H24) for Battery 9-F and an alloy of aluminum and magnesium (JIS Standard A 5052 P-H34) for Battery 9-G.

(Batteries 9-H and 9-I)

Batteries 9-H and 9-I were formed in the same manner as Battery 9-C except using, as the material of the above described explosion-proof valve, an alloy of aluminum and manganese (JIS Standard A 3003 P-H24) for Battery 9-H and an alloy of aluminum and magnesium (JIS Standard A 5052 P-H34) for Battery 9-I.

(Batteries 9-J, 9-K, 9-L and 9-M)

Batteries 9-J, 9-K, 9-L and 9-M were respectively formed in the same manner as Battery 9-C except using, as the above described explosion-proof valve, such a structure that the side wall of the recess part between the outer circumference and projected flat area had a thickness of 0.3 mm in the case of Battery 9-J, 0.4 mm in the case of Battery 9-K, 0.6 mm in the case of Battery 9-L and 0.7 mm in the case of Battery 9-M.

(Battery 9-N)

Figure 9:
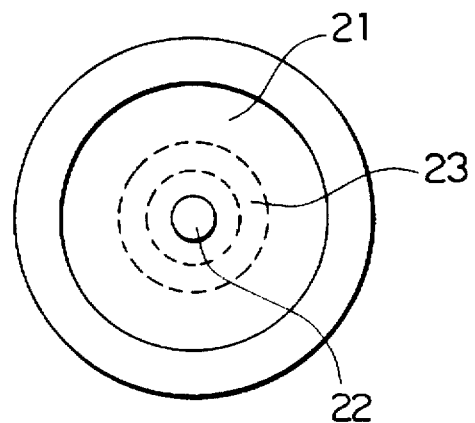
FIG. 9 is a plan view of one embodiment of an explosion-proof valve in a non-aqueous secondary battery of a closed type (Battery 9-N) according to the present invention.

Battery 9-N was formed in the same manner as Battery 9-B except using, as the above described explosion-proof valve, one having such a structure that a ring-shaped thin wall part was provided on the projected flat area, as shown in FIG. 9. The thin wall part had a thickness of 0.08 mm and a width of 2 mm.

(Battery 9-O)

Figure 10:
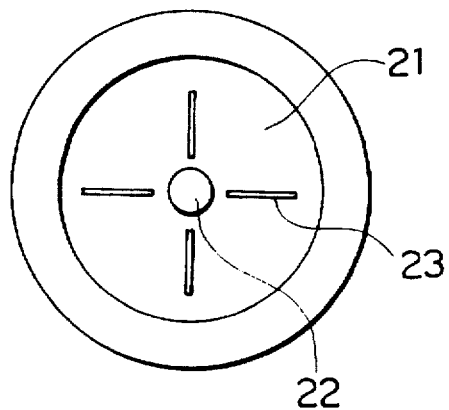
FIG. 10 is a plan view of another embodiment of an explosion-proof valve in a non-aqueous secondary battery of a closed type (Battery 9-O) according to the present invention.

Battery 9-O was formed in the same manner as Battery 9-B except using, as the above described explosion-proof valve, one having such a structure that a plurality of groove-shaped thin wall parts radially formed from the center were provided on the projected flat area, as shown in FIG. 10. The thin wall parts each had a thickness of 0.1 mm, a width of 0.5 mm and a length of 2.5 mm.

(Battery 9-P)

Figure 11:
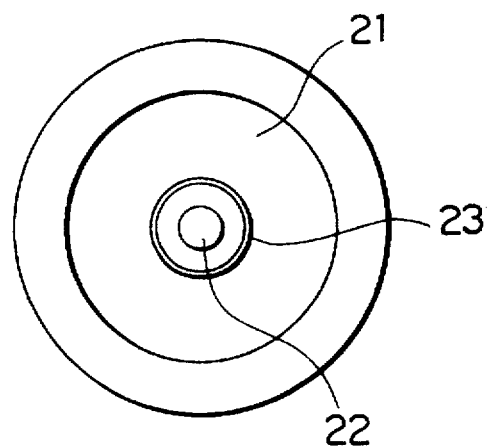
FIG. 11 is a plan view of a further embodiment of an explosion-proof valve in an aqueous secondary battery of a closed type (Battery 9-P) according to the present invention.

Battery 9-P was formed in the same manner as Battery 9-B except using, as the above described explosion-proof valve, one having such a structure that a circumferentially groove-shaped thin wall part was provided on the projected flat area, as shown in FIG. 11. The thin wall part had a thickness of 0.1 mm, a width of 0.5 mm and a circumferential outer diameter of 5 mm.

(Batteries 9-Q and 9-R)

Figure 16:
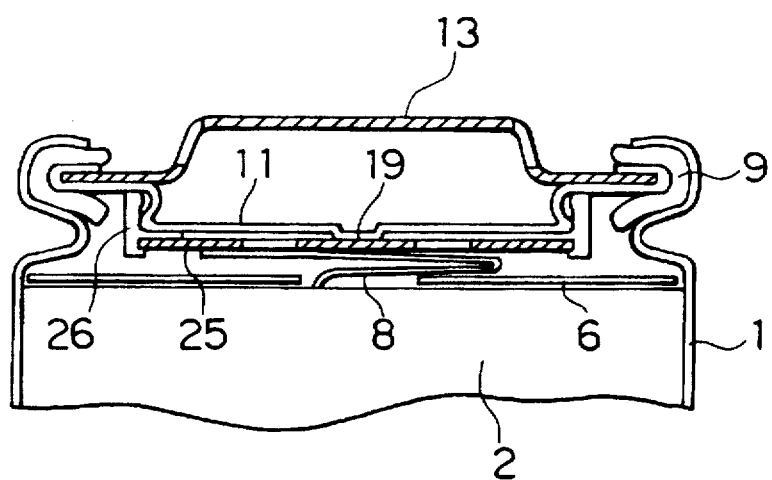
Figure 17:
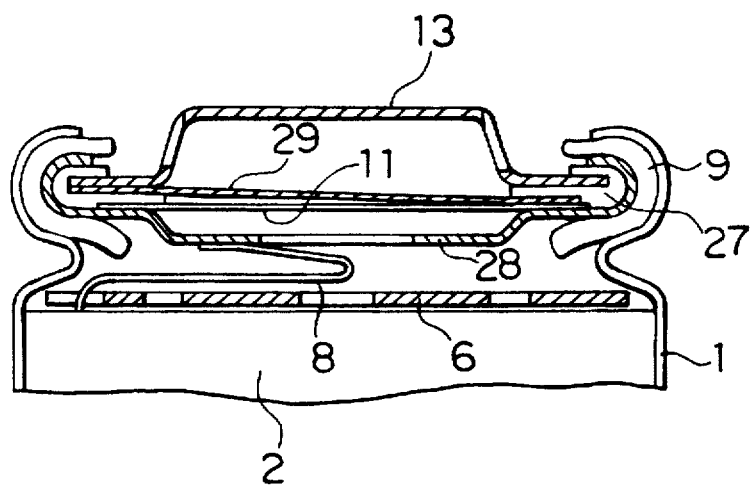
Figure 18:
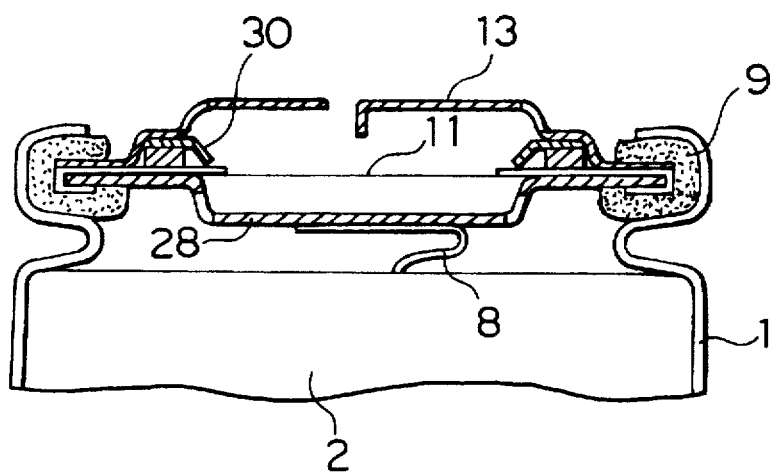

As shown in FIG. 16 and FIG. 17, Batteries 9-Q and 9-R were formed in the same manner as Battery 9-A except using, as the sealing structure, respectively one described in Japanese Patent Laid-Open Publication No. 343043/1993 for Battery 9-Q and one described in Japanese Patent Laid-Open Publication No. 215760/1994 for Battery 9-R. For comparison with the batteries of the other Examples, the inner pressure in the battery at the time of cutting off electric current was also adjusted to be equal to Battery 9-A in this Example.

(Batteries 9-S and 9-T)

Figure 19:
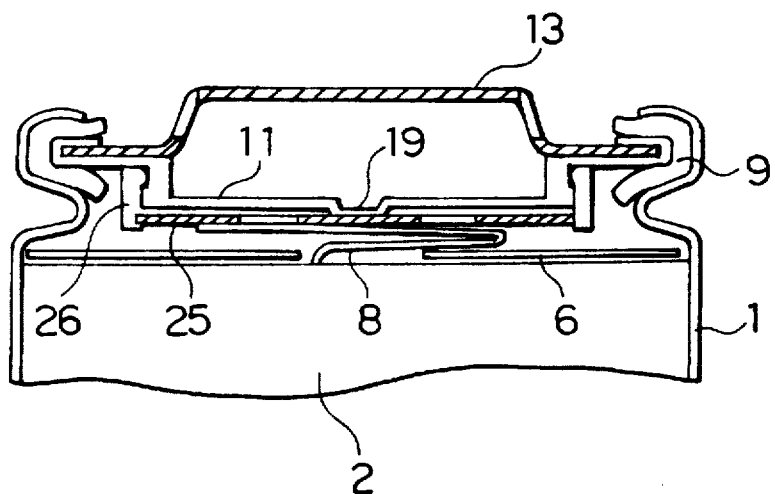
FIG. 19 is a partially sectional view of a still further embodiment of a sealing part in a non-aqueous secondary battery of a closed type (Battery 9-S) according to the present invention.
Figure 20:
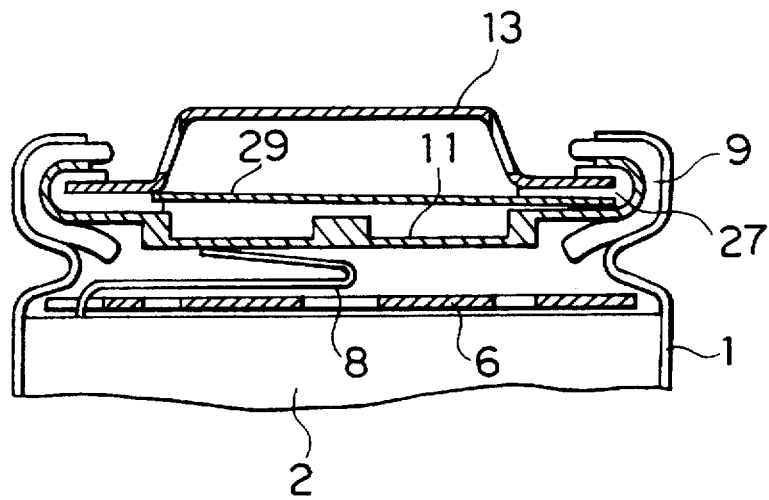
FIG. 20 is a partially sectional view of a still further embodiment of a sealing part in a non-aqueous secondary battery of a closed type (Battery 9-T) according to the present invention.

Batteries 9-S and 9-T were formed in the same manner as Batteries 9-Q and 9-R except using, as the the above described explosion-proof valve, respectively those formed by the forging method used in the case of Battery 9-C, as shown in FIG. 19 and FIG. 20. In each of these batteries, the material was aluminum according to JIS Standard A 1100 P-H24, the projected flat area had a thickness of 0.3 mm and a projected height of 1 mm, the side wall of the recess part had a thickness of 0.5 mm and the thin wall part was similar to Battery 9-A. In the case of Battery 9-T, the central projection part had a height of 1 mm and an outer diameter of 2 mm.

The batteries of Examples of the present invention and Comparative Examples, composed as described above, were subjected to a dropping test from a height of 1 m on a concrete surface five times and then to a continuously charging test with an electric current of 3 A (ampere) at room temperature (samples: 200 samples in the dropping test and 50 samples in the continuously charging test).

The number of disconnection (breakage of wire) in the batteries in the dropping test, the number of breakage in the continuously charging test and the inner pressure in the battery when cutting off electric current as to batteries whose electric current cutoff mechanism is normally operated are shown in Table 9.

TABLE 9

| Sample of Battery | Number of Disconnection | Number of Breakage | Inner Pressure of Battery (Fluctuation Width) (kgf/cm$^2$) |
| --- | --- | --- | --- |
| Battery 9-A | 0 | 0 | 9–15 (6) |
| Battery 9-B | 0 | 0 | 10–14 (4) |
| Battery 9-C | 0 | 0 | 11–13 (2) |
| Battery 9-D | 0 | 0 | 9–15 (6) |
| Battery 9-E | 0 | 0 | 8–14 (6) |
| Battery 9-F | 0 | 0 | 9–14 (5) |
| Battery 9-G | 0 | 0 | 10–14 (4) |
| Battery 9-H | 0 | 0 | 11–14 (3) |
| Battery 9-I | 0 | 0 | 11–13 (2) |
| Battery 9-J | 0 | 0 | 9–14 (5) |
| Battery 9-K | 0 | 0 | 10–14 (4) |
| Battery 9-L | 0 | 0 | 11–13 (2) |
| Battery 9-M | 0 | 0 | 11–13 (2) |
| Battery 9-N | 0 | 0 | 10–16 (6) |
| Battery 9-O | 0 | 0 | 10–15 (5) |
| Battery 9-P | 0 | 0 | 10–14 (4) |
| Battery 9-Q | 4 | 5 | 11–13 (2) |
| Battery 9-R | 0 | 3 | 10–15 (5) |
| Battery 9-S | 0 | 0 | 11–13 (2) |
| Battery 9-T | 0 | 0 | 11–13 (2) |

In the above described results as shown in Table 9, it can be assumed that the breakage of Battery 9-Q occurs due to that the inner pressure of the battery is not increased because of presence of cracks in the explosion-proof valve as to three samples and that generation of spark at the time of cutting off electric current causes ignition of vapor of the electrolytic solution as to two samples. Furthermore, it can be assumed that the breakage of Battery 9-R occurs due to cracking of the explosion-proof valve in view of that the inner pressure in the battery did not reach the predetermined value as to three samples.

In the other batteries of the present invention, the electric current cutoff elements operate in normal and precise manner and there occurs no breakage of the batteries. As to samples each provided with the explosion-proof valve having a circumferentially groove-shaped thin walled part, having the cross section of the side wall of the projected flat area shaped in Z-type, and having the thickness of the side wall of the projected flat area renderd larger than that of the projected flat area by forging working, fluctuation of the inner pressure in the battery at the time of cutting off electric current is small and the current cutoff function is exhibited with a very high precision. In the case of the samples worked by forging, in particular, the lead plate from the current collector can be connected to the lower surfcace of the central thick-walled projection part by welding, resulting in batteries having high safety and reliability without any problem on generation of cracks during welding.

As in the case of Batteries 9-S and 9-T in which the current cutoff element is operated by a certain deformation of the explosion-proof valve, the use of the explosion-proof valve by forging working according to the present invention results in a battery having high safety and reliability.

Figure 12:
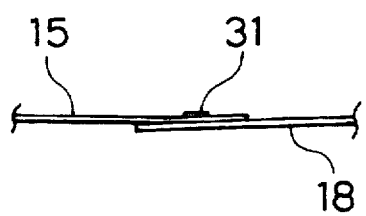
FIG. 12 is a schematic view of one embodiment of a current cutoff switch in a non-aqueous secondary battery of a closed type according to the present invention.
Figure 13:
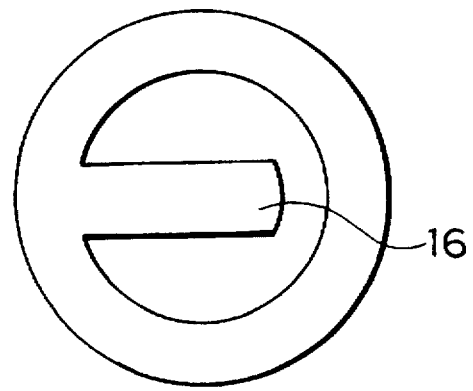
FIG. 13 is a plan view of a first lead member of a current cutoff switch in FIG. 4.
Figure 14:
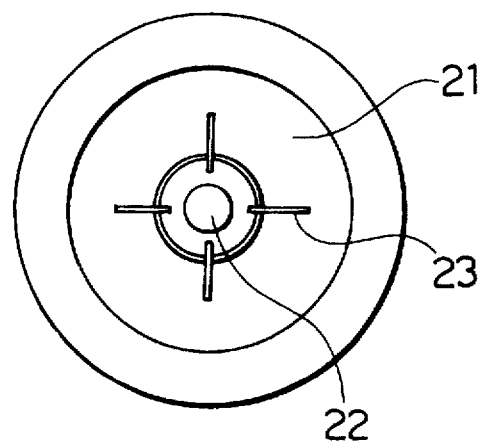
FIG. 14 is a plan view of an explosion-proof valve in FIG. 4.
Figure 15:
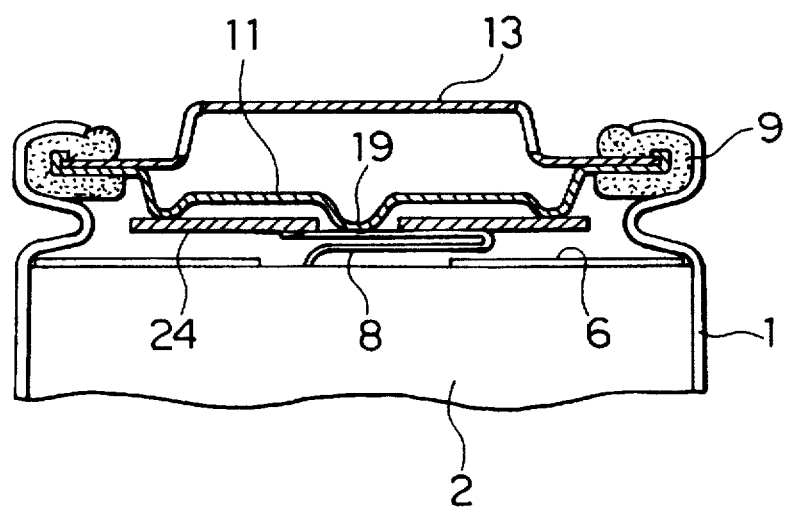
FIGS. 15–18 are partially sectional views of sealing parts of closed type batteries of the prior art.

In the batteries in Examples of the present invention, there was used the electric current cutoff mechanism having such a structure that the welded part of the first lead element and second lead element is broken, but it is possible to employ another electric cutoff mechanism with the similar advantage, the mechanism comprising a second lead element having a projection part at a connection part and a first lead element having a small hole at the corresponding part to the projection part, which are connected by engagement of the projection and small hole and crushing and caulking a part projected from the small hole, as shown in FIG. 12.

Advantages of Present Invention (1) According to the present invention, there can be provided a non-aqueous secondary battery having an improved charge and discharge cycle property and high discharge voltage, high energy density, high capacity and increased stability as well as an excellent high electric current atitude by using a lithium-containing transition metal oxide as a positive electrode material and at least one of the specfified composite oxides as a negative electrode material.

(2) There can be provided a non-aqueoussecondary battery having an improved capacity loss based on a negative electrode active material and thus a high capacity by subjecting the amorphous negative electrode material to a heat treatment in a reducing atmosphere.

(3) There can be provided a non-aqueous secondary battery having a high discharge capacity, excellent charge and discharge cycle property and excellent safety by joint use of a separator containing at least 20 weight % of ethylene with the amorphous oxides as a negative electrode material.

(4) There can be provided a non-aqueous secondary battery having a high energy density, excellent charge and discharge cycle property and excellent safety by the use of the specified chalcogen compounds and oxides having a true density in the range of 2.8 to 7.5.

(5) There can be provided a non-aqueous secondary battery of closed type, capable of completely cutting off continuity in the interior of the battery at the initial period even if the inner pressure of the battery is abnormally increased by overcharging or short-circuiting by providing a current cutoff element between an explosion-proof valve and terminal cap and providing the explosion-proof valve itself with a projection part for operating the current cutoff element as an integrated body. The electric current cutoff element can be composed independently of the explosion-proof valve, so the function of cutting off electric current can be confirmed before assembling it in the battery and there can be a non-aqueous secondary battery having a high reliability as well as high safety.

What is claimed is:

1. A sealed non-aqueous secondary battery, comprising an assembly composed of a positive electrode and a negative electrode, capable of intercalating and deintercalating a light metal, and a separator, the assembly being held by a bottomed battery can with a non-aqueous electrolyte, an insulating gasket provided on an inner circumference of an opening part of the can and a sealing structure fitted to and supported by the gasket, wherein said can additionally functions as a positive electrode or negative electrode terminal cap, the opening part of the can being sealed, and wherein the sealing structure comprises an explosion-proof valve being deformable in the opposite direction to the assembly with an increase in inner pressure of the battery, a sealing structure terminal cap having formed thereon a vent hole arranged at the opposite side to the assembly and an electric current cutoff element arranged between the explosion-proof valve and the sealing structure terminal cap, the explosion-proof valve being a dish-shaped body having a flat area projected toward the assembly from the vicinity of the outer circumference thereof, having groove-shaped thin wall parts and provided with, at the central part thereof, a projection part projected toward the opposite side to the assembly, in the form of one integrated unit; wherein the groove-shaped thin wall parts are portions of the dish-shaped body which break to permit gas to be released.

2. The sealed non-aqueous secondary battery as claimed in claim 1, wherein the dish-shaped body of the explosion-proof valve is one that deforms
   (a) at a first rate during an initial period of increasing inner pressure,
   (b) at a second rate, which is higher than the first rate, during a period of increasing inner pressure which immediately follows the initial period, and
   (c) at a third rate, which is lower that the second rate, during a final period of increasing inner pressure.

3. The sealed non-aqueous secondary battery as claimed in claim 1, wherein said explosion-proof valve consists of an aluminum or its alloy and at least a part of said groove-shaped thin wall parts is formed in a circumferential form.

4. The sealed non-aqueous secondary battery as claimed in claim 1, wherein the cross-section of the side wall of the recess part between the outer circumference and projected flat area is substantially Z-shaped.

5. The sealed non-aqueous secondary battery as claimed in claim 1, wherein said explosion-proof valve is formed by forging working.

6. The sealed non-aqueous secondary battery as claimed in claim 1, wherein the thickness of the side wall of the recess part between the outer circumference and projected flat area is larger than that of the projected flat area.

7. The sealed non-aqueous secondary battery as claimed in claim 1, wherein the negative electrode is formed of a material comprising an amorphous chalcogen compound or an amorphous oxide containing at least three atoms selected from the elements of Group 13, 14, 15 and 2 of the Periodic Table.

8. The sealed non-aqueous secondary battery as claimed in claim 1, wherein the negative electrode is formed of a material comprising an amorphous material capable of intercalating and deintercalating a light metal ion and is heat treated in a reducing atmosphere.

9. The sealed non-aqueous secondary battery as claimed in claim 1, wherein the negative electrode is formed of a negative electrode material comprising an amorphous material obtained by mixing and calcining an oxide or chalcogenide and silicon dioxide.

10. The sealed non-aqueous secondary battery as claimed in claim 1, wherein said negative electrode material is heat treated in a reducing atmosphere.

11. The sealed non-aqueous secondary battery as claimed in claim 1, wherein the negative electrode is formed of a material obtained by mixing and calcining an oxide or chalcogenide and silicon dioxide.

12. The sealed non-aqueous secondary battery as claimed in claim 1, wherein the thin wall parts have a thickness of from at least 0.05 mm to at most ⅓ of the thickness of the flat area projected toward the assembly.

13. The sealed non-aqueous secondary battery as claimed in claim 1, wherein the negative electrode is formed of a negative electrode material comprising a true density $\rho$ in a range of $2.5<\rho<7.5$.

14. The sealed non-aqueous secondary battery as claimed in claim 1, wherein the negative electrode is formed of a negative electrode material comprising at least one member selected from the group consisting of chalcogen compounds and oxides containing at least one atom selected from the group consisting of Group 13, 14, 15 and 2 metals of the Periodic Table, which are capable of intercalating and deintercalating a light metal and have a true density $\rho$ in a range of $2.5<\rho<7.5$.

15. The sealed non-aqueous secondary battery as claimed in claim 2, wherein said explosion-proof valve consists of an aluminum or its alloy and at least a part of said groove-shaped thin wall parts is formed in a circumferential form.

* * * * *